United States Patent
Cargnoni et al.

(10) Patent No.: US 8,347,036 B2
(45) Date of Patent: Jan. 1, 2013

(54) EMPIRICALLY BASED DYNAMIC CONTROL OF TRANSMISSION OF VICTIM CACHE LATERAL CASTOUTS

(75) Inventors: Robert A. Cargnoni, Austin, TX (US); Guy L. Guthrie, Austin, TX (US); Harmony L. Helterhoff, Austin, TX (US); William J. Starke, Round Rock, TX (US); Jeffrey A. Stuecheli, Austin, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 12/421,180

(22) Filed: Apr. 9, 2009

(65) Prior Publication Data
US 2010/0262778 A1 Oct. 14, 2010

(51) Int. Cl.
*G06F 12/08* (2006.01)

(52) U.S. Cl. .............. 711/118; 711/141; 711/E12.017; 711/122; 711/133

(58) Field of Classification Search ............. 711/122, 711/133, 118, 141, E12.017
See application file for complete search history.

(56) References Cited

U.S. PATENT DOCUMENTS

| | | |
|---|---|---|
| 4,797,814 A | 1/1989 | Brenza |
| 5,615,350 A | 3/1997 | Hesson et al. |
| 5,666,506 A | 9/1997 | Hesson et al. |
| 5,721,921 A | 2/1998 | Kessler et al. |
| 5,764,946 A | 6/1998 | Tran et al. |
| 5,802,571 A | 9/1998 | Konigsburg et al. |
| 5,835,946 A | 11/1998 | Allen et al. |
| 5,848,433 A | 12/1998 | Tran et al. |
| 5,895,495 A | 4/1999 | Arimilli et al. |
| 5,970,232 A | 10/1999 | Passint et al. |
| 6,059,835 A | 5/2000 | Bose |
| 6,085,303 A | 7/2000 | Thorson et al. |

(Continued)

FOREIGN PATENT DOCUMENTS

JP 09050401 2/1997

(Continued)

OTHER PUBLICATIONS

U.S. Appl. No. 12/335,809, "Victim Cache Line Selection," Notice of Allowance dated Oct. 5, 2010.

(Continued)

*Primary Examiner* — Yong Choe
(74) *Attorney, Agent, or Firm* — Yudell Isidore Ng Russell PLLC

(57) ABSTRACT

In response to a data request, a victim cache line is selected for castout from a lower level cache, and a target lower level cache of one of the plurality of processing units is selected. A determination is made whether the selected target lower level cache has provided more than a threshold number of retry responses to lateral castout (LCO) commands of the first lower level cache, and if so, a different target lower level cache is selected. The first processing unit thereafter issues a LCO command on the interconnect fabric. The LCO command identifies the victim cache line to be castout and indicates that the target lower level cache is an intended destination of the victim cache line. In response to a successful coherence response to the LCO command, the victim cache line is removed from the first lower level cache and held in the second lower level cache.

44 Claims, 24 Drawing Sheets

U.S. PATENT DOCUMENTS

| | | | |
|---|---|---|---|
| 6,088,771 A | 7/2000 | Steely et al. | |
| 6,131,145 A | 10/2000 | Matsubara et al. | |
| 6,216,174 B1 | 4/2001 | Scott et al. | |
| 6,226,713 B1 | 5/2001 | Mehrotra | |
| 6,230,252 B1 | 5/2001 | Passint et al. | |
| 6,230,260 B1 | 5/2001 | Luick | |
| 6,240,490 B1 | 5/2001 | Lyles, Jr. | |
| 6,272,598 B1 | 8/2001 | Arlitt et al. | |
| 6,275,909 B1 | 8/2001 | Arimilli et al. | |
| 6,282,615 B1 | 8/2001 | Arimilli et al. | |
| 6,343,347 B1 | 1/2002 | Arimilli et al. | |
| 6,343,348 B1 | 1/2002 | Tremblay et al. | |
| 6,356,980 B1 | 3/2002 | Arimilli et al. | |
| 6,397,296 B1 | 5/2002 | Werner | |
| 6,408,345 B1 | 6/2002 | Fuoco et al. | |
| 6,446,167 B1 | 9/2002 | Mayfield et al. | |
| 6,453,389 B1 | 9/2002 | Weinberger et al. | |
| 6,460,115 B1 | 10/2002 | Kahle et al. | |
| 6,502,171 B1 * | 12/2002 | Arimilli et al. | 711/146 |
| 6,532,521 B1 | 3/2003 | Arimilli et al. | |
| 6,542,861 B1 | 4/2003 | Lyles, Jr. | |
| 6,546,429 B1 * | 4/2003 | Baumgartner et al. | 709/253 |
| 6,587,924 B2 | 7/2003 | Arimilli et al. | |
| 6,643,763 B1 | 11/2003 | Starke et al. | |
| 6,647,466 B2 | 11/2003 | Steely | |
| 6,654,946 B1 | 11/2003 | Eneboe et al. | |
| 6,675,253 B1 | 1/2004 | Brinkmann et al. | |
| 6,691,220 B1 | 2/2004 | Guthrie et al. | |
| 6,748,501 B2 | 6/2004 | Arimilli et al. | |
| 6,748,518 B1 | 6/2004 | Guthrie et al. | |
| 6,751,698 B1 | 6/2004 | Deneroff et al. | |
| 6,757,294 B1 | 6/2004 | Maruyama | |
| 6,810,466 B2 | 10/2004 | Henry et al. | |
| 6,963,967 B1 | 11/2005 | Guthrie et al. | |
| 6,990,559 B2 | 1/2006 | Van Doren et al. | |
| 7,028,159 B2 | 4/2006 | Matsubara et al. | |
| 7,047,362 B2 | 5/2006 | Kim et al. | |
| 7,047,394 B1 | 5/2006 | Van Dyke et al. | |
| 7,065,672 B2 | 6/2006 | Long et al. | |
| 7,100,021 B1 | 8/2006 | Marshall et al. | |
| 7,146,468 B2 | 12/2006 | Hardage, Jr. | |
| 7,155,572 B2 | 12/2006 | Hughes et al. | |
| 7,174,431 B2 | 2/2007 | Van Doren et al. | |
| 7,228,385 B2 | 6/2007 | Guthrie et al. | |
| 7,254,678 B2 | 8/2007 | Alexander et al. | |
| 7,281,092 B2 * | 10/2007 | Rajamony et al. | 711/122 |
| 7,305,522 B2 | 12/2007 | Clark et al. | |
| 7,305,523 B2 | 12/2007 | Guthrie et al. | |
| 7,305,524 B2 | 12/2007 | Hoover | |
| 7,406,086 B2 | 7/2008 | Deneroff et al. | |
| 7,437,521 B1 | 10/2008 | Scott et al. | |
| 7,454,573 B2 | 11/2008 | Buyuktosunoglu et al. | |
| 7,461,147 B1 | 12/2008 | Mowat et al. | |
| 7,475,191 B2 | 1/2009 | Guthrie et al. | |
| 7,533,227 B2 | 5/2009 | Guthrie et al. | |
| 7,536,513 B2 | 5/2009 | Guthrie et al. | |
| 7,584,329 B2 | 9/2009 | Fields, Jr. | |
| 7,613,883 B2 | 11/2009 | Bellow et al. | |
| 7,716,424 B2 | 5/2010 | Franaszek et al. | |
| 7,788,468 B1 | 8/2010 | Nickolls et al. | |
| 7,797,496 B2 | 9/2010 | Gruber et al. | |
| 7,827,354 B2 | 11/2010 | Clark et al. | |
| 8,225,045 B2 | 7/2012 | Guthrie et al. | |
| 2002/0046324 A1 | 4/2002 | Barroso et al. | |
| 2004/0034744 A1 | 2/2004 | Karlsson et al. | |
| 2004/0103251 A1 | 5/2004 | Alsup | |
| 2005/0120185 A1 | 6/2005 | Yamazaki et al. | |
| 2005/0246499 A1 | 11/2005 | Salida et al. | |
| 2006/0039612 A1 | 2/2006 | Sakuma et al. | |
| 2006/0064549 A1 | 3/2006 | Wintergerst | |
| 2006/0101249 A1 | 5/2006 | Bacon et al. | |
| 2006/0112228 A1 * | 5/2006 | Shen | 711/133 |
| 2006/0155792 A1 | 7/2006 | Inoue et al. | |
| 2006/0179234 A1 * | 8/2006 | Bell et al. | 711/136 |
| 2006/0184742 A1 | 8/2006 | Clark et al. | |
| 2006/0225074 A1 | 10/2006 | Vaid et al. | |
| 2006/0277366 A1 | 12/2006 | Rajamony et al. | |
| 2007/0073974 A1 | 3/2007 | Averill et al. | |
| 2007/0094450 A1 | 4/2007 | VanderWiel | |
| 2007/0136535 A1 | 6/2007 | Rajamony et al. | |
| 2007/0204110 A1 | 8/2007 | Guthrie et al. | |
| 2007/0294481 A1 | 12/2007 | Hoover | |
| 2008/0046651 A1 | 2/2008 | Clark et al. | |
| 2008/0046736 A1 | 2/2008 | Arimilli et al. | |
| 2008/0071994 A1 | 3/2008 | Fields, Jr. | |
| 2008/0086602 A1 | 4/2008 | Guthrie et al. | |
| 2008/0177953 A1 | 7/2008 | Bell et al. | |
| 2009/0177844 A1 | 7/2009 | Naylor et al. | |
| 2010/0100682 A1 | 4/2010 | Guthrie et al. | |
| 2010/0100683 A1 | 4/2010 | Guthrie et al. | |
| 2010/0122031 A1 | 5/2010 | Strumpen et al. | |
| 2010/0146216 A1 | 6/2010 | Conway | |
| 2010/0153647 A1 | 6/2010 | Guthrie et al. | |
| 2010/0153649 A1 | 6/2010 | Li et al. | |
| 2010/0153650 A1 | 6/2010 | Guthrie et al. | |
| 2010/0235576 A1 | 9/2010 | Guthrie et al. | |
| 2010/0235577 A1 | 9/2010 | Guthrie et al. | |
| 2010/0235584 A1 | 9/2010 | Guthrie et al. | |
| 2010/0257316 A1 | 10/2010 | Arimilli et al. | |
| 2010/0257317 A1 | 10/2010 | Arimilli et al. | |
| 2010/0262782 A1 | 10/2010 | Guthrie et al. | |
| 2010/0262783 A1 | 10/2010 | Guthrie et al. | |
| 2010/0262784 A1 | 10/2010 | Guthrie et al. | |
| 2011/0161589 A1 | 6/2011 | Guthrie et al. | |

FOREIGN PATENT DOCUMENTS

| | | |
|---|---|---|
| JP | 2000207283 | 7/2000 |
| JP | 2000242558 | 9/2000 |
| JP | 2000298618 | 10/2000 |
| JP | 2002236616 | 8/2002 |

OTHER PUBLICATIONS

Raghavachari, M. et al; Ace: A Language for Parallel Programming With Customizable Protocols; ACM Transactions on Computer Systems, vol. 17, No. 3, Aug. 1999, pp. 202-248.

Fang, Z. et al; Active Memory Operations; ICS-2007, Seattle, WA, pp. 232-241.

Sampson,J. et al.; Exploiting Fine-Grained Data Parallelism with Chip Multiprocessors and Fast Barriers; The 39th Annual IEEE/ACM International Symposium on Microarchitecture (MICRO '06); 2006.

Yeung,D. et al; Multigrain Shared Memory; ACM Transactions on Computer Systems, vol. 18, No. 2, May 2000, pp. 154-196.

U.S. Appl. No. 12/420,933,"Mode-Based Castout Destination Selection," Non-Final Office Action dated Jul. 14, 2011.

Fei et al., "Artemis: Practical Runtime Monitoring of Applications for Execution Anomalies." Purdue University, 12 pp.; PLDI'06, Jun. 10-16, 2006, Ottawa, Ontario Canada.

Rhea et al., "Value-Based Web Caching," University of California, Berkeley, 10 pp.; WWW2003, May 20-24, 2003, Budapest, Hungary.

Shin et al., "A Proactive Wearout Recovery Approach for Exploiting Microarchitectural Redundancy to Extend Cache SRAM Lifetime." IBM T.J. Watson Research Center, Yorktown Heights, NY, 10 pp.; International Symposium on Computer Architecture—2008 IEEE.

Richardson, Nicholas,"Bus interface unit having multipurpose transaction buffer," 1 pp.; CSA Technology Research Database, Dialog File No. 23 Accession No. 8552866.

U.S. Appl. No. 12/336,048, "Handling Castout Cache Lines in a Victim Cache," Non-Final Office Action dated Nov. 30, 2011.

U.S. Appl. No. 12/402,025, "Lateral Castout (LCO) of Victim Cache Line in Data-Invalid State," Non-Final Office Action dated Jun. 30, 2011.

"Optimizing Memory-Resident Decision Support System Workloads for Cache Memories", Trancoso. PPM. 1998.

"Cache-Conscious Frequent Pattern Mining on Modern and Emerging Processors", Chen. Y-K. et al. ; 2007.

"Effective Management of Multiple Configurable Units Using Dynamic Optimization", Hu, S. et al. ; Dec. 2006.

U.S. Appl. No. 12/420,379, "Lateral Castout Target Selection," Non-Final Office Action dated Jul. 1, 2011.

"Deferring Cast-Outs n Store-In Caches", Emma, PG. et al.; Apr. 1, 1998.

"Value-Based Web Caching", Rhea, SC. et al.; 2003.

U.S. Appl. No. 12/340,511, "Victim Cache Lateral Castout Targeting," Non-Final Office Action dated Jun. 13, 2011.

US Patent No. 7827354, "Victim Cache Using Direct Intervention," Notice of Allowance dated Jun. 30, 2010.

US Patent No. 7305522, "Victim Cache Using Direct Intervention," Notice of Allowance dated Jul. 30, 2007.

US Patent No. 7827354, "Victim Cache Using Direct Intervention," Non-Final Office Action dated Dec. 15, 2009.

US Patent No. 7305523, "Cache Memory Direct Intervention," Notice of Allowance dated Jul. 30, 2007.

US Patent No. 7827354, "Victim Cache Using Direct Intervention," Final Office Action dated Feb. 3, 2009.

Steiner et al.—"A Characterization of a Java Based Commercial Workload on a High-End Enterprise Server"; ACM Digital Library; pp. 379-380; Jun. 2006.

Wang et al.—"Parallization of IBM Mambo System Simulator in Functional Modes"; ACM Digital Library; pp. 71-76; 2007-2008.

Dybdahl, H. et al; An LRU-based Replacement Algorithm Augmented with Frequency of Access in Shared Chip-Multiprocessor Caches; ACM; 2006; pp. 45-52.

U.S. Appl. No. 12/421,017, "Empirically Based Dynamic Control of Acceptance of Victim Cache Lateral Castouts," Non-Final Office Action dated Jul. 27, 2011.

U.S. Appl. No. 12/177,912, "Victim Cache Replacement," Non-Final Office Action dated Dec. 9, 2010.

U.S. Appl. No. 12/177,912, "Victim Cache Replacement," Final Office Action dated May 24, 2011.

Ko et al, Characterization and Design of a Low-Power, High-Performance Cache Architecture, Proceedings of Technical Papers, International Symposium on VLSI Technology, Systems and Applications, 1995, pp. 235-238, May-Jun. 1995.

Yang et al, Lightweight Set Buffer: Low Power Data Cache for Multimedia Application, Aug. 2003.

Chang et al, Value-Conscious Cache: Simple Technique for Reducing Cache Access Power, Proceedings of the Design, Automation, and Test in Europe Conference and Exhibition, 2004.

U.S. Appl. No. 12/256,064, "Victim Cache Prefetching," Non-Final Office Action Jun. 8, 2011.

U.S. Appl. No. 12/335,975, "Cache-To-Cache Cast-In," Non-Final Office Action dated Jul. 1, 2011.

U.S. Appl. No. 12/256,002, "Victim Cache Replacement," Non-Final Office Action dated Jun. 15, 2011.

US Patent No. 7305522, "Victim Cache Using Direct Intervention," Non-Final Office Action dated Mar. 8, 2007.

US Patent No. 7305523, "Cache Memory Direct Intervention," Non-Final Office Action dated Mar. 9, 2007.

US Patent No. 7827354, "Victim Cache Using Direct Intervention," Non-Final Office Action dated Aug. 20, 2008.

Sarkar, P. et al; Hint-Based Cooperative Caching; Acm Transactions on Computer Systems, vol. 18, No. 4, Nov. 2000, pp. 387-419.

Kampe, M. et al; Self-Correcting LRU Replacement Policies; ACM; 2004; pp. 181-191.

Mellor-Crummey, J. et al; Algorithms for Scalable Synchronization on Shared-Memory Multiprocessors; ACM Transactions on Computer Systems, vol. 9, No. 1, Feb. 1991, pp. 21-65.

U.S. Appl. No. 12/420,379, "Lateral Castout Target Selection," Final Office Action dated Nov. 22, 2011.

U.S. Appl. No. 12/402,025, "Lateral Castout (LCO) of Victim Cache Line in Data-Invalid State," Final Office Action dated Nov. 10, 2011.

U.S. Appl. No. 12/340,511, "Victim Cache Lateral Castout Targeting," Final Office Action dated Nov. 7, 2011.

U.S. Appl. No. 12/335,975, "Cache-To-Cache Cast-In, " Final Office Action Dated Nov. 22, 2011.

U.S. Appl. No. 12/419,343, "Virtual Barrier Synchronization Cache Castout Election," Notice of Allowance dated Sep. 2, 2011.

Berekovic et al; A Scalable, Clustered SMT Processor for Digital Signal Processing; ACM SIGARCH Computer Architecture News; vol. 32, No. 3, Jun. 2004, pp. 62-69.

Prabhu, M., et al; Using Thread-Level Speculation to Simply Manual Parallelization; ACM; 2003; pp. 1-12.

U.S. Appl. No. 12/419,364, "Virtual Barrier Synchronization Cache," Notice of Allowance dated Aug. 25, 2011.

U.S. Appl. No. 12/419,364, "Virtual Barrier Synchronization Cache," Notice of Allowance dated Oct. 21, 2011.

U.S. Appl. No. 12/420,379 entitled "Lateral Castout Target Selection", Notice of Allowance dated Jun. 4, 2012.

U.S. Appl. No. 12/420,933 entitled "Mode-Based Cast Out Destination Selection", Notice of Allowance dated Jul. 5, 2012.

U.S. Appl. No. 12/256,064 entitled "Victim Cache Prefetching", Notice of Allowance dated Feb. 17, 2012.

U.S. Appl. No. 12/256,002 entitled "Victim Cache Replacement", Final Office action dated Dec. 6, 2011.

U.S. Appl. No. 12/256,002 entitled "Victim Cache Replacement", Non-Final Office action dated Mar. 15, 2012.

U.S. Appl. No. 13/445,646 entitled "Selective Cache-To-Cache Lateral Castouts", Non-Final Office action dated Jul. 9, 2012.

U.S. Appl. No. 12/650,018 entitled "Selective Cache-To-Cache Lateral Castouts", Non-Final Office action dated Apr. 18, 2012.

U.S. Appl. No. 12/335,975 entitled "Lateral Cache-To-Cache Cast-In", Notice of Allowance dated Mar. 7, 2012, now Issued Patent 8225045 Jul. 17, 2012.

U.S. Appl. No. 12/340,511 entitled "Victim Cache Lateral Castout Targeting", Non-Final Office action dated Apr. 24, 2012.

U.S. Appl. No. 12/177,912 entitled "Victim Cache Replacement", Non-Final Office action dated Mar. 2, 2012.

U.S. Appl. No. 12/421,017 entitled "Empirically Based Dynamic Control of Acceptance of Victim Cache Lateral Castouts"; Notice of Allowance dated Jul. 20, 2012.

* cited by examiner

EMPIRICALLY BASED DYNAMIC CONTROL OF TRANSMISSION OF VICTIM CACHE LATERAL CASTOUTS

This invention was made with United States Government support under Agreement No. HR0011-07-9-0002 awarded by DARPA. THE GOVERNMENT HAS CERTAIN RIGHTS IN THE INVENTION.

BACKGROUND OF THE INVENTION

1. Technical Field

The present invention relates in general to data processing and more particularly to data caching in data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of cache states stored in association with the cache lines stored at each level of the cache hierarchy, as well as a set of coherency messages utilized to communicate the cache state information between cache hierarchies. In a typical implementation, the cache state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access request. The MESI protocol allows a cache line of data to be tagged with one of four states: "M" (Modified), "E" (Exclusive), "S" (Shared), or "I" (Invalid). The Modified state indicates that a memory block is valid only in the cache holding the Modified memory block and that the memory block is not consistent with system memory. When a coherency granule is indicated as Exclusive, then, of all caches at that level of the memory hierarchy, only that cache holds the memory block. The data of the Exclusive memory block is consistent with that of the corresponding location in system memory, however. If a memory block is marked as Shared in a cache directory, the memory block is resident in the associated cache and in at least one other cache at the same level of the memory hierarchy, and all of the copies of the coherency granule are consistent with system memory. Finally, the Invalid state indicates that the data and address tag associated with a coherency granule are both invalid.

The state to which each memory block (e.g., cache line or sector) is set is dependent upon both a previous state of the data within the cache line and the type of memory access request received from a requesting device (e.g., the processor). Accordingly, maintaining memory coherency in the system requires that the processors communicate messages via the system interconnect indicating their intention to read or write memory locations. For example, when a processor desires to write data to a memory location, the processor may first inform all other processing elements of its intention to write data to the memory location and receive permission from all other processing elements to carry out the write operation. The permission messages received by the requesting processor indicate that all other cached copies of the contents of the memory location have been invalidated, thereby guaranteeing that the other processors will not access their stale local data.

In some systems, the cache hierarchy includes multiple levels, with each lower level generally having a successively longer access latency. Thus, a level one (L1) cache generally has a lower access latency than a level two (L2) cache, which in turn has a lower access latency than a level three (L3) cache.

The level one (L1) or upper-level cache is usually a private cache associated with a particular processor core in an MP system. Because of the low access latencies of L1 caches, a processor core first attempts to service memory access requests in its L1 cache. If the requested data is not present in the L1 cache or is not associated with a coherency state permitting the memory access request to be serviced without further communication, the processor core then transmits the memory access request to one or more lower-level caches (e.g., level two (L2) or level three (L3) caches) for the requested data.

Typically, when a congruence class of an upper-level cache becomes full, cache lines are removed ("evicted") and may be written to a lower-level cache or to system memory for storage. In some cases, a lower level cache (e.g., an L3 cache) is configured as a "victim" cache, which conventionally means that the lower level cache is entirely populated with cache lines evicted from one or more higher level caches in the cache hierarchy rather than by memory blocks retrieved by an associated processor. Conventional victim caches generally are exclusive, meaning that a given memory block does not reside in a higher level cache and its associated victim cache simultaneously.

SUMMARY OF THE INVENTION

In one embodiment, in response to a data request, a victim cache line is selected for castout from a lower level cache, and a target lower level cache of one of the plurality of processing units is selected. A determination is made whether the selected target lower level cache has provided more than a threshold number of retry responses to lateral castout (LCO) commands of the first lower level cache, and if so, a different target lower level cache is selected. The first processing unit thereafter issues a LCO command on the interconnect fabric. The LCO command identifies the victim cache line to be castout and indicates that the target lower level cache is an intended destination of the victim cache line. In response to a successful coherence response to the LCO command, the victim cache line is removed from the first lower level cache and held in the second lower level cache.

In one embodiment, in response to a data request of the processor core of a first processing unit among the plurality of processing units, a victim cache line to be removed from the lower level cache of the first processing unit is selected. In addition, a selection is made among a lateral castout (LCO) from the lower level cache of the first processing unit to another lower level cache and a castout (CO) from the lower level cache of the first processing unit to the system memory, where the selection includes selecting either an LCO or CO based upon empirical success of the upper level cache of the first processing unit in obtaining requested data by intervention from cache memories of other of the plurality of processing units rather than the system memory. In response to selecting an LCO, an LCO of the victim cache line to a lower level cache of one of the plurality of processing units is performed by issuing a LCO command on the interconnect fabric. If, on the other hand, a CO is selected, a CO of the victim cache line to the system memory is performed.

DETAILED DESCRIPTION OF ILLUSTRATIVE EMBODIMENT

Figure 1:
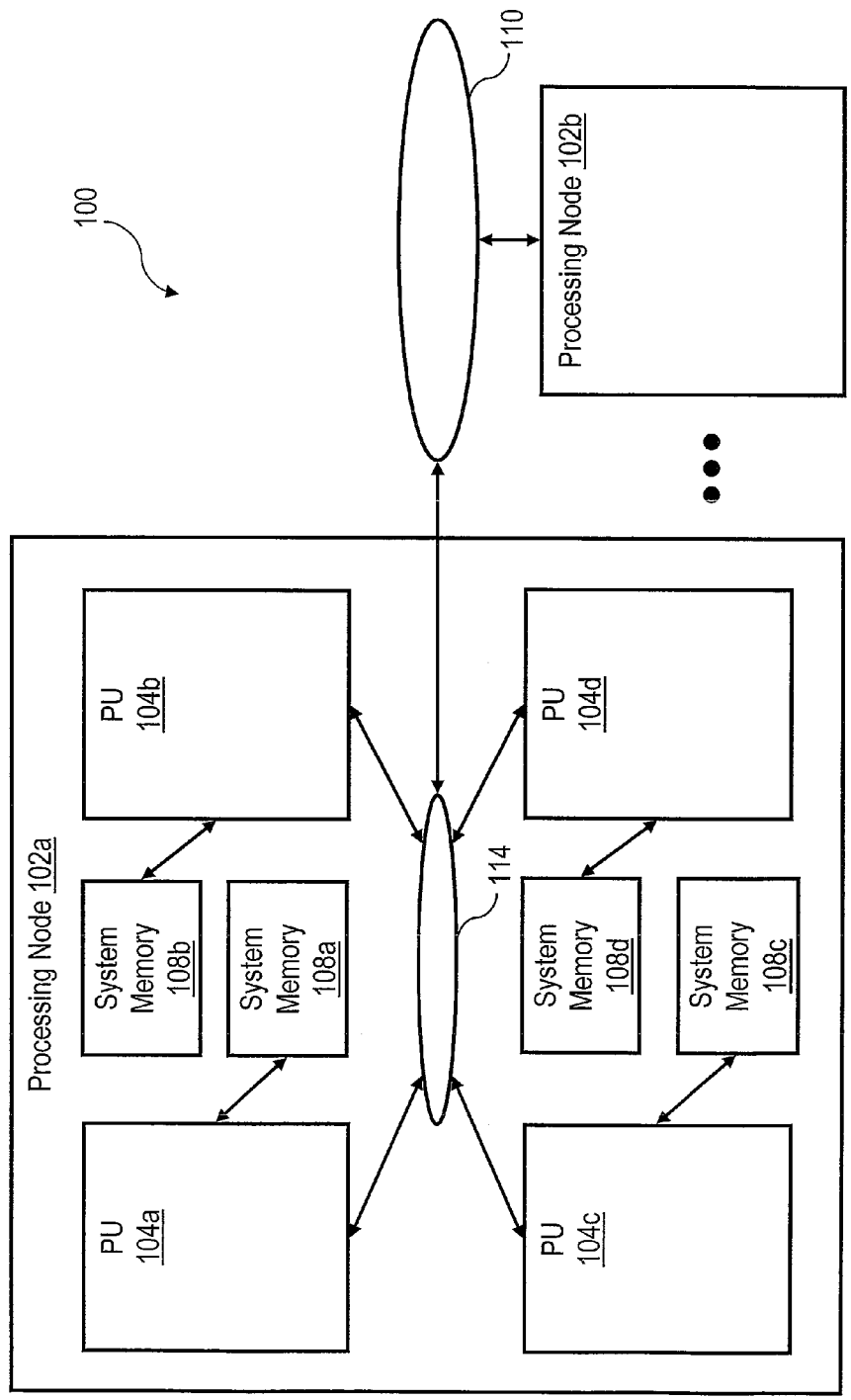
FIG. 1 is high level block diagram of an exemplary data processing system in accordance with the present invention.

With reference now to the figures and, in particular, with reference to FIG. 1, there is illustrated a high level block diagram of an exemplary embodiment of a multiprocessor data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches. Local interconnects 114 and system interconnect 110 together form an interconnect fabric, which preferably supports concurrent communication of operations of differing broadcast scopes. For example, the interconnect fabric preferably supports concurrent communication of operations limited in scope to a single processing node 102 and operations broadcast to multiple processing nodes 102.

The devices coupled to each local interconnect 114 include not only processing units 104, but also one or more system memories 108a-108d (e.g., formed of dynamic random access memory (DRAM), static RAM (SRAM), flash memory or other memory technology), which collectively represent the lowest level of data storage in data processing system 100 addressable via real addressing. Data and instructions residing in system memories 108 can generally be accessed and modified via real addresses by a processor core (FIG. 2A) in any processing unit 104 in any processing node 102 of data processing system 100. In alternative embodiments of the invention, one or more system memories 108 can be coupled to system interconnect 110 rather than a local interconnect 114.

Those skilled in the art will appreciate that data processing system 100 can include many additional unillustrated components, such as peripheral devices, interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of diverse architectures and are in no way limited to the generalized data processing system architecture illustrated in FIG. 1.

Figure 2A:
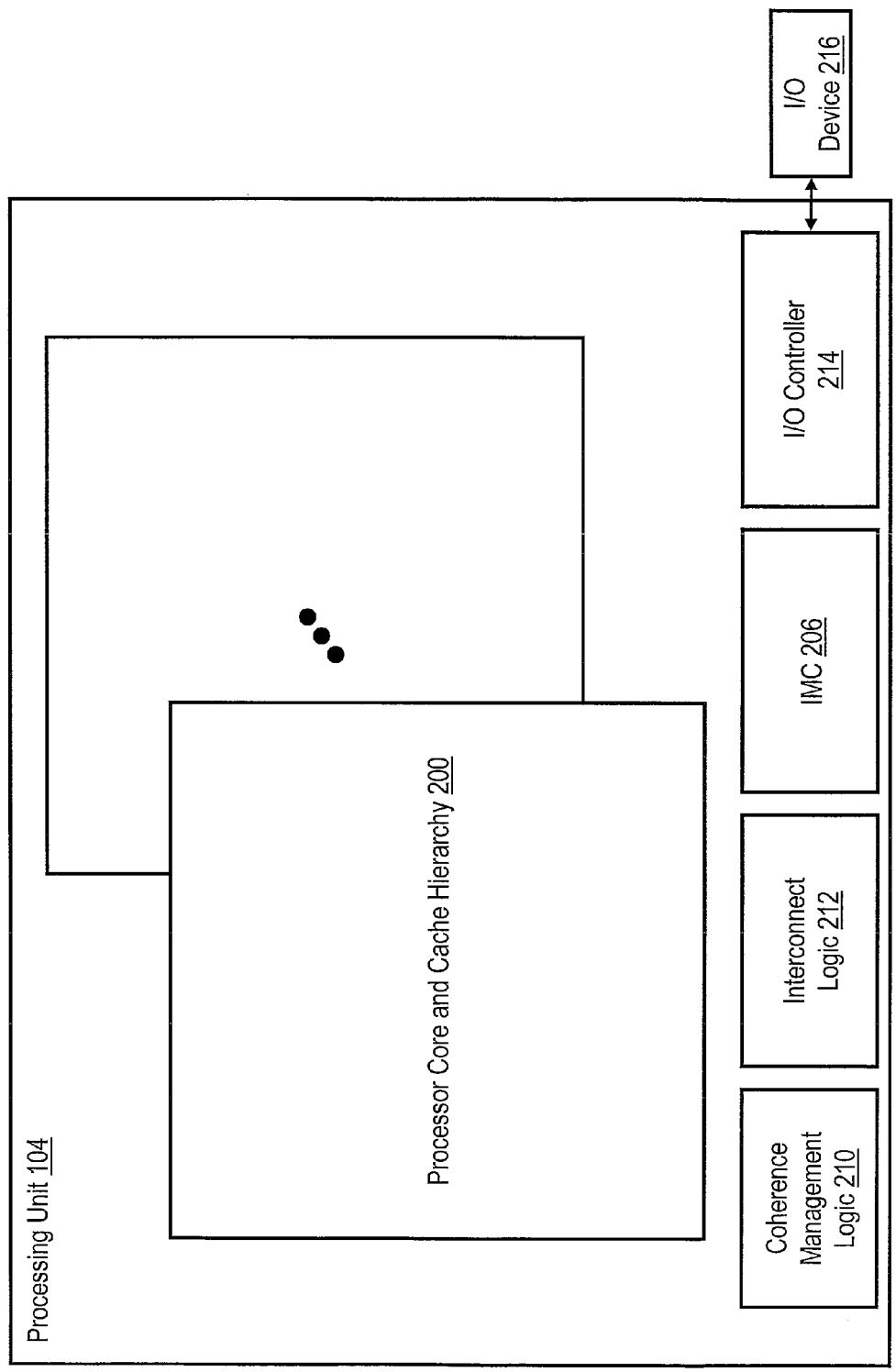
FIG. 2A is a high level block diagram of a processing unit from FIG. 1.

Referring now to FIG. 2A, there is depicted a more detailed block diagram of an exemplary processing unit 104 in accordance with the present invention. In the depicted embodiment, each processing unit 104 includes multiple instances of a processor core and associated cache hierarchy, which are collectively identified by reference numeral 200. In the depicted embodiment, each processing unit 104 also includes an integrated memory controller (IMC) 206 that controls read and write access to one or more of the system memories 108a-108d within its processing node 102 in response to requests received from processor cores and operations snooped on the local interconnect 114.

Still referring to FIG. 2A, each processing unit 104 also includes an instance of coherence management logic 210, which implements a portion of the distributed snoop-based coherency signaling mechanism that maintains cache coherency within data processing system 100. In addition, each processing unit 104 includes an instance of forwarding logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 2B:
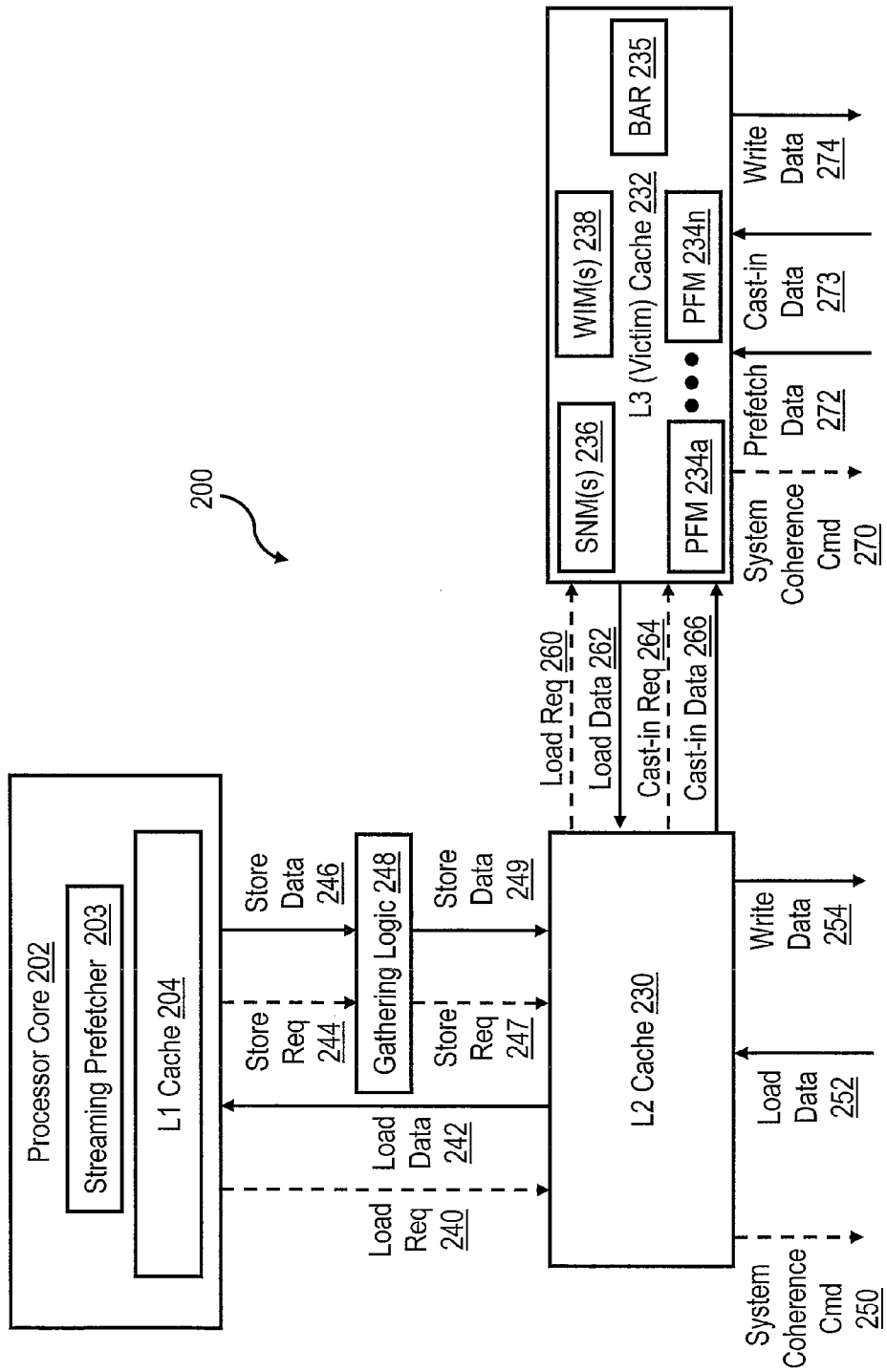
FIG. 2B is a more detailed block diagram of an exemplary embodiment of a processor core and associated cache hierarchy from FIG. 2A.

With reference now to FIG. 2B is a more detailed block diagram of an exemplary embodiment of a processor core and associated cache hierarchy 200 from FIG. 2A. Processor core 202 includes circuitry for processing instructions and data. In the course of such processing, the circuitry of processor core 202 generates various memory access requests, such as load and store requests.

The operation of processor core 202 is supported by a cache memory hierarchy including a store-through level one (L1) cache 204 within each processor core 202, a store-in level two (L2) cache 230, and a lookaside L3 cache 232 that is utilized as a victim cache for L2 cache 230 and accordingly is filled by cache lines evicted from L2 cache 230. In contrast to many conventional victim cache arrangements, the contents of L3 cache 232 are not exclusive of the contents of L2 cache 230, meaning that a given memory block may be held concurrently in L2 cache 230 and L3 cache 232.

In at least some embodiments, processor core 202 further includes a streaming prefetcher 203 that generates and transmits to the memory hierarchy prefetch requests requesting data to be staged into its cache memory hierarchy in advance of need (e.g., prior to a demand load or store). In preferred embodiments, streaming prefetcher 203 supports multiple concurrent prefetching streams, and in at least some cases, supports multiple concurrent prefetching stream types having differing behaviors. For example, in one exemplary embodiment, streaming prefetcher 203 includes a load prefetch stream to prefetch memory blocks that may be the target of load requests, a store prefetch stream to prefetch memory blocks that may be targets of store requests, and a load/store prefetch stream to prefetch memory blocks that may be target of load and/or store requests. These different prefetch streams may have different associated strides, stream depths, caching rules, etc., as discussed further below. In other embodiments, processor core 202 may implement prefetching without streaming, that is, without fetching from a sequence of addresses linked by a common stride.

In order to support prefetching while limiting the associated cost and latency impact on the cache memory hierarchy, L3 cache 232 includes at least one and preferably many prefetch machines (PFMs) 234a-234n that, in response to prefetch requests issued by streaming prefetcher 203 that miss in the cache memory hierarchy, manage the transmission of the prefetch requests to the system for service and the installation of prefetch data in the cache memory hierarchy, as discussed further below with reference to FIGS. 3B-3E. In one embodiment, prefetch machines 234a-234n can be implemented within master 284 (see FIG. 3) as special-purpose prefetch machines dedicated to handling prefetch requests, as disclosed in greater detail in U.S. patent application Ser. No. 11/45,333, which was filed Jul. 13, 2006, and is incorporated herein by reference in its entirety.

L3 cache 232 further includes at least one and preferably a plurality of snoop machines (SNM(s)) 236 and at least one and preferably a plurality of write inject machine(s) (WIM(s)) 238 within snooper 286 (see FIG. 3). As discussed further below, SNM(s) 236 and WIM(s) 238 handle the cast-in of cache lines into L3 cache 232 in response to lateral castout (LCO) commands received from other L3 caches 232. In the described embodiment, SNM(s) 236 are used to handle cast-ins that require no data movement and thus preferably do not include the inbound data management constructs, while WIM(s) 238 are employed to handle LCO commands requiring data movement and accordingly include inbound data management constructs (making them more costly than SNM(s) 236). L3 cache 232 also includes a base address register (BAR) facility 235 that is programmed (e.g., during system initialization) to indicate the system memory 108 (referred to herein as the 'home system memory") to which each range of real addresses in the real address space utilized by the volatile memory of data processing system 100 is assigned. In a preferred embodiment, BAR facility 235 additionally indicates which processing node 102 contains the home system memory 108 and the processing unit 104 containing the IMC 206 for the home system memory 108.

FIG. 2B also illustrates an exemplary flow of requests, data and coherence communication within the cache memory hierarchy of processor core 202. In the depicted arrangement, dashed lines represent the flow of requests and coherence commands, and solid lines represent data flow.

As shown, processor core 202 transmits load requests 240 to, and receives load data 242 from L2 cache 230. Processor core 202 also transmits store requests 244 and associated store data 246 to gathering logic 248, which gathers the store data associated with multiple requests into one cache line of data and transmits the gathered store data 249 to L2 cache 230 in conjunction with one gathered store request 247. Although illustrated separately for clarity, gathering logic 248 may be incorporated within processor core 202 and/or L2 cache 230.

L2 cache 230 transmits system coherence commands 250 to coherence management logic 210 of FIG. 2A for compilation and/or transmission on the interconnect fabric. L2 cache 230 also transmits write data 254 to, and receives load data 252 from IMC 206 and/or interconnect logic 212. L2 cache 230 may also request load data from L3 cache 232 via a load request 260 and receive load data 262 from L3 cache 232. To remove a cache line from L2 cache 230, L2 cache 230 may issue a cast-in request to L3 cache 232, which in turn receives the cache line as cast-in data 266. Similar to L2 cache 230, L3 cache 232 may interact with IMCs 206 and/or cache memories in other cache hierarchies by issuing system coherence commands 270, receiving prefetch data 272 and/or cast-in data 273, and/or transmitting write data 274.

Although the illustrated cache hierarchy includes only three levels of cache, those skilled in the art will appreciate that alternative embodiments may include additional levels (L4, L5, etc.) of on-chip or off-chip in-line or lookaside cache, which may be fully inclusive, partially inclusive, or non-inclusive of the contents the upper levels of cache. Further, any of the various levels of the cache hierarchy may be private to a particular processor core 202 or shared by multiple processor cores 202. For example, in some implementations, the cache hierarchy includes an L2 cache 230 for each processor core 202, with multiple of the L2 caches 230 sharing a common L3 victim cache 232.

Figure 2C:
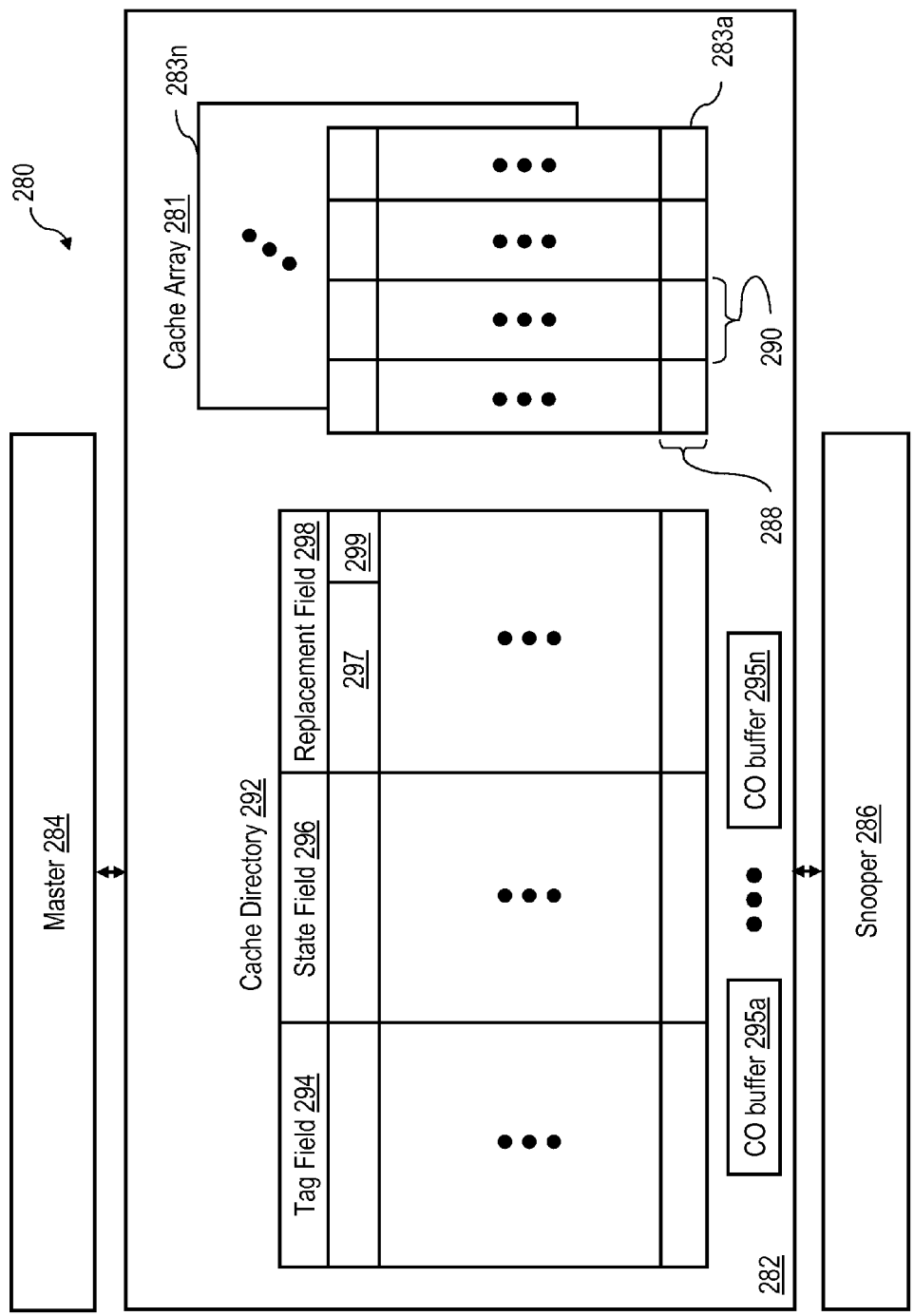
FIG. 2C is an exemplary embodiment of a cache memory from FIG. 2B.

Referring now to FIG. 2C, there is depicted an exemplary embodiment of a cache memory 280 that may be utilized to implement L2 cache 230 or L3 cache 232 from FIG. 2B. As shown, cache memory 280 includes an array and directory 282, as well as a cache controller comprising a master 284 and a snooper 286. Snooper 286 snoops operations from local interconnect 114, provides appropriate responses, and performs any accesses to array and directory 282 required by the operations. Master 284 initiates transactions on local interconnect 114 and system interconnect 110 and accesses array and directory 282 in response to memory access (and other) requests originating within the processor core and cache hierarchy 200. In at least some embodiments, master 284 also handles casting out data to lower levels of the memory hierarchy (e.g., L3 victim cache 232 or system memory 108).

Array and directory 282 includes a set associative cache array 281 including multiple ways 286a-286n. Each way 286 includes multiple entries 288, which in the depicted embodiment each provide temporary storage for up to a full memory block of data, e.g., 128 bytes. Each cache line or memory block of data is logically formed of multiple sub-blocks 290 (in this example, four sub-blocks of 32 bytes each) that may correspond in size, for example, to the smallest allowable access to system memories 108a-108d. In at least some embodiments, sub-blocks 290 may be individually accessed and cached in cache array 281.

Array and directory 282 includes a set associative cache array 281 including multiple ways 283a-283n. Each way 283 includes multiple entries 288, which in the depicted embodiment each provide temporary storage for up to a full memory block of data, e.g., 128 bytes. Each cache line or memory block of data is logically formed of multiple sub-blocks 290 (in this example, four sub-blocks of 32 bytes each) that may correspond in size, for example, to the smallest allowable access to system memories 108a-108d. In at least some embodiments, sub-blocks 290 may be individually accessed and cached in cache array 281.

In the depicted embodiment, each replacement field 298 includes a chronology vector 297 indicating an access chronology (or rank) of the associated cache line with respect to all other cache lines belonging to the same congruence class. In addition, in the depicted embodiment, replacement fields 298 of at least L3 caches 232 include a class subfield 299 indentifying to which of multiple classes each of the cache lines of the congruence class belongs. For example, if two classes are implemented, class membership can be indicated in an encoded format by a single bit for each cache line in the congruence class. (Of course, other encodings of class subfield 299 are possible.) As described further below, the classes of cache lines are utilized when selecting victim cache lines for eviction so that cache lines more likely to be accessed by the associated processor core 202 are preferentially retained in cache array 281. For example, in an embodiment in which two classes are implemented (as assumed hereafter), the first class can be used to designate cache lines more likely to be accessed from the cache by the associated processor core 202, and the second class can be used to designate cache lines less likely to be accessed from the cache by the associated processor core 202.

Although the exemplary embodiment illustrates that each state field 296 provides state information for a respective associated cache line in cache array 281, those skilled in the art will appreciate that in alternative embodiments a cache directory 292 can include a respective state field for each sub-block 290. Regardless of which implementation is selected, the quantum of data associated with a coherence state is referred to herein as a coherence granule.

To support the transfer of castout cache lines, array and directory 282 includes at least one and preferably multiple castout (CO) buffers 295a-295n, which are each preferably identified with a unique respective CO buffer ID. While a CO buffer 295 is allocated to master 284 for a castout operation, the CO buffer 295 has a "busy" state, and when the CO buffer is released or deallocated by master 284, then the CO 295 buffer has a "done" state.

In a preferred embodiment, data processing system 100 maintains coherency with a non-blocking, broadcast-based coherence protocol that utilizes a set of predefined coherence states in state fields 296 and a robust set of associated request, response, and notification types. Coherence requests are broadcast with a selected scope to cache memories, as well as IMCs 206 and I/O controllers 214. As discussed further below, the selected scope of broadcast can be "global", that is, inclusive of all participants (e.g., IMCs 206, IOCs 214, L2 caches 230 and L3 caches 232) in data processing system 100 or have a more restricted scope excluding at least some participants. In response to snooping the coherence requests, the participants provide partial responses (PRESPs), which are aggregated (preferably at coherence management logic 210 of the requesting processing unit 104) to form the basis for a coherence transfer decision. Notification of the decision is subsequently broadcast to the participants in a combined response (CRESP) indicating the final action to be taken. Thus, the coherence protocol employs distributed management.

In a preferred embodiment, global and local (or scope-limited) broadcast transport mechanisms are both integrated. Thus, a given request can be broadcast globally or locally, where a local scope may correspond, for example, to a single processing node 102. If all information necessary to resolve a coherence request exists within the local broadcast scope, then no global broadcast is necessary. If a determination cannot be made that all information necessary to resolve the coherence request is present within the local broadcast scope, the coherence request is broadcast globally (or at least with an increased scope including at least one additional participant).

To ensure a reasonable likelihood of a successful local resolution of coherence requests, a mechanism indicative of the distribution of cached copies of memory blocks within the cache hierarchies is useful. In a preferred embodiment, the mechanism includes inclusion of a scope-state indication per memory block (e.g., 128 bytes) in system memory 108 and an appropriate set of coherence states for state fields 296 in L2 and L3 caches 230, 232. In one embodiment, the scope-state indication for each memory block is a single bit integrated into the redundant content for error correction stored in system memory 108. For each memory block, the scope-state indicator indicates whether the memory block might be in use outside of the local scope where the system memory 108 resides. Since the scope-state indicator is stored with the data bits, the scope-state bit is automatically read or written whenever the data is read or written.

Coherence states that may be utilized in state field 296 to indicate state information may include those set forth in Table I below. Table I lists the name of various coherence states in association with a description of the state, an indication of the authority conveyed by the coherence state to read and/or update (which includes the authority to read) the associated cache line, an indication of whether the coherence state permits other cache hierarchies to concurrent hold the associated cache line, an indication of whether the associated cache line is castout upon deallocation, and an indication of if and when the associated cache line is to be sourced in response to snooping a request for the cache line. A further description of the implementation of at least some of these coherence states is described in detail in U.S. patent application Ser. No. 11/055,305, which is incorporated herein by reference.

TABLE I

| State | Description | Authority | Sharers | Data Castout | Source data |
|---|---|---|---|---|---|
| I | Invalid | None | N/A | N/A | N/A |
| Id | Deleted, do not allocate | None | N/A | N/A | N/A |
| Ig | Invalid, cached scope-state | None | N/A | N/A | N/A |
| In | Invalid, scope predictor | None | N/A | N/A | N/A |
| S | Shared | Read | Yes | No | No |
| Sl | Shared, local data source | Read | Yes | No | At request |
| T | Formerly MU, now shared | Update | Yes | Yes | At CRESP |
| Te | Formerly ME, now shared | Update | Yes | No | At CRESP |
| Tn | Formerly MU, now shared | Update | Yes | Yes | At CRESP |
| Ten | Formerly ME, now shared | Update | Yes | No | At CRESP |
| M | Modified, avoid sharing | Update | No | Yes | At request |
| Me | Exclusive | Update | No | No | At request |
| Mu | Modified, bias toward sharing | Update | No | Yes | At request |

As shown in Table II below, a number of the coherence states set forth in Table I provide low-latency access to high-usage scope states while protecting system memories 108 from increased traffic due to scope-state queries and updates. Note that when a cached scope state is deallocated, it is typically cast out (i.e., written back) to memory. For cases in which the implied scope state might be global, the castout is functionally required to ensure that coherence is maintained. For cases in which the implied scope state is known to be local, the castout is optional, as it is desirable but not necessary to localize the broadcast scope for subsequent operations.

TABLE II

| State | Implied scope state | Scope-state castout |
|---|---|---|
| I | None | None |
| Id | None | None |
| Ig | Existing copies probably global | Required, global |
| In | Existing copies probably local | None |
| S | Unknown | None |
| Sl | Unknown | None |
| T | Shared copies probably global | Required, global |
| Te | Shared copies probably global | Required, global |
| Tn | Shared copies all local | Optional, local |
| Ten | Shared copies all local | None |
| M | Local | Optional, local |
| Me | Local | None |
| Mu | Local | Optional, local |

The combination of the scope-state bits in system memory 108 and the coherence states described herein provides a low-cost alternative to a directory-based approach and integrates cleanly into the non-blocking, broadcast-based distributed coherence protocol. Because some workloads localize well and others do not, processing unit 104 may also incorporate a number of predictors to determine whether a given coherence request should be initially broadcast with a local scope or should be broadcast globally immediately. For workloads that exhibit a high degree of processor-to-memory localization, and for workloads that have varying mixtures of locally resolvable traffic, laboratory results show that scope-limited speculative snoop resolution is highly effective.

Figure 3A:
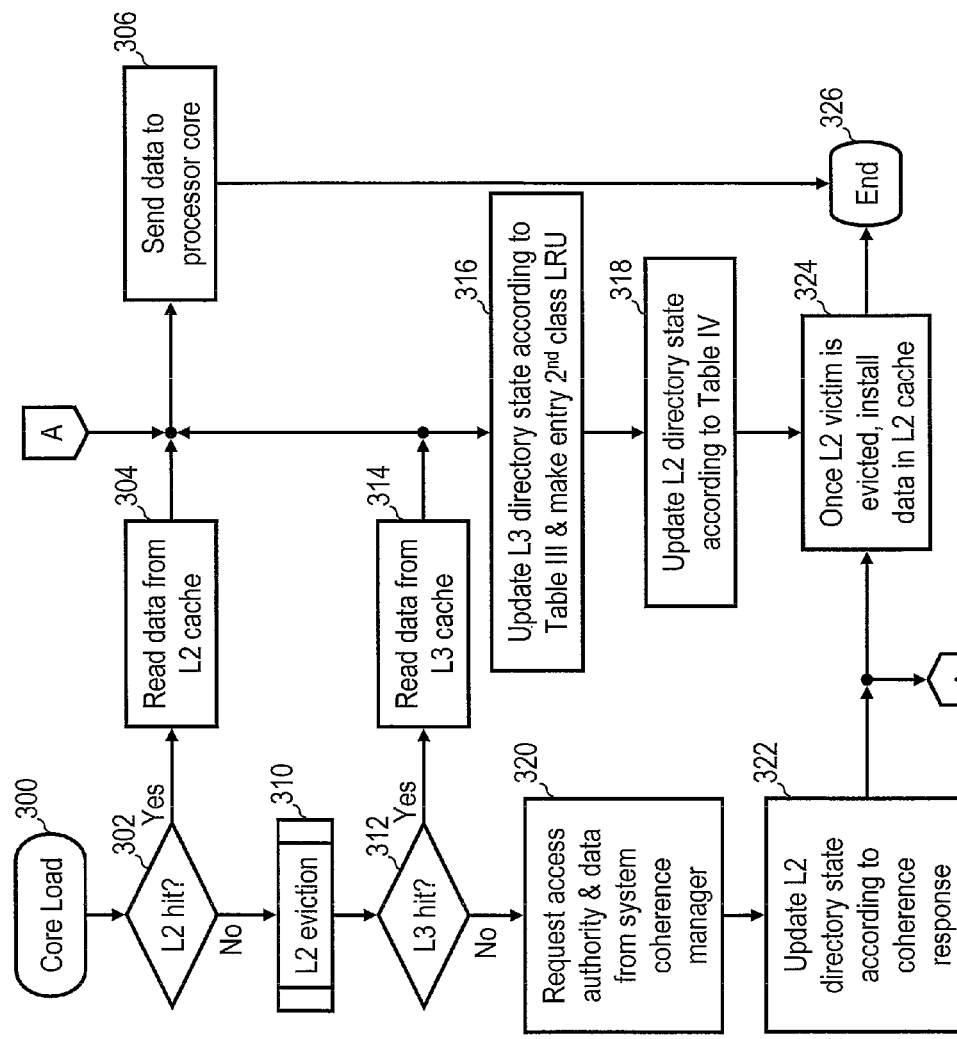
FIG. 3A is a high level logical flowchart of an exemplary method of performing a processor load in accordance with one embodiment.

With reference now to FIG. 3A, there is illustrated a high level logical flowchart of an exemplary method of performing a load of a processor core in accordance with one embodiment. The illustrated process begins at block 300 in response to receipt by L2 cache 230 of a load request 240 from its associated processor core 202 following a miss in the L1 cache 204. In response to the load request 240, master 284 of L2 cache 230 accesses its cache directory 292 to determine whether or not the target address specified by load request 240 hits in cache directory 292 (block 302). If so, the process then proceeds to blocks 304 and 306, which depict master 284 of L2 cache 230 reading the requested cache line of data from its cache array 281 and then sending the cache line of data to the requesting processor core 202. Thereafter, the process terminates at block 326.

Returning to block 302, in response to an L2 miss, the process proceeds to block 310, which illustrates L2 cache 230 selecting and initiating eviction of a victim cache line, as discussed further below with reference to FIGS. 5-6. In addition, L2 cache 230 transmits the load request to L3 cache 232 as a load request 260. Consequently, master 284 of L3 cache 232 accesses its cache directory 292 to determine whether or not the target address specified by load request 260 hits in cache directory 292 of L3 cache 232 (block 312). If not, the process passes to block 320, which is described below. If, however, load request 260 hits in cache directory 292 of L3 cache 232, the process proceeds to block 314, which depict master 284 of L3 cache 232 reading the requested cache line of data from cache array 281 of L3 cache 232 and providing the requested cache line to L2 cache 230. The process then bifurcates and proceeds to blocks 306 and 316.

As noted above, block 306 depicts L3 cache 232 sending the requested cache line of data to the requesting processor core 202. Thereafter, the first branch of the process ends at block 326. Block 316 illustrates master 284 of L3 cache 232 updating the coherence state of the requested cache line of data in cache directory 292 of L3 cache 232 in accordance with Table III, below.

TABLE III

| | Final L3 State | | | | | | |
|---|---|---|---|---|---|---|---|
| Initial L3 State | Load | Ifetch | Xlate | Prefetch (Load) | Load (Lock) | Prefetch (Store) | Prefetch (Ld/St) |
| M | SL | SL | SL | SL | I | I | I |
| Mu | SL | SL | SL | SL | I | I | I |
| Me | SL | SL | SL | SL | I | I | I |
| T | S | S | S | S | S | S | S |
| Te | S | S | S | S | S | S | S |
| Tn | S | S | S | S | S | S | S |
| Ten | S | S | S | S | S | S | S |
| SL | S | S | S | S | S | S | S |
| S | S | S | S | S | S | S | S |
| Ig | (n/a) | (n/a) | (n/a) | (n/a) | (n/a) | (n/a) | (n/a) |
| In | (n/a) | (n/a) | (n/a) | (n/a) | (n/a) | (n/a) | (n/a) |
| I | (n/a) | (n/a) | (n/a) | (n/a) | (n/a) | (n/a) | (n/a) |

In contrast with conventional implementations in which any fetch that hit in an L3 victim cache in a data-valid coherency state (e.g., M, Mu, Me, T, Te, Tn, Ten, Sl or S) resulted in the invalidation of the matching cache line in the L3 directory, Table III discloses that a fetch hit in the Tx or Sx states (where the "x" refers to any variant of the base coherence state) preserves the matching cache line in L3 cache 232 in the S state. In this way, the likelihood of a castout hit in L3 cache 232 is increased, which as discussed further below, reduces data movement and thus power dissipation in the event of an L2 eviction.

As further indicated at block 316, in each case in which an update to cache directory 292 is made, the class of the matching cache line in L3 cache 232 is set to (or retained as) second class in class subfield 299. As indicated above, the designation of the matching cache line as second class indicates that the matching cache line is not likely to be accessed from L3 cache 232 by the associated processor core 202, in the case of block 316 because the matching cache line already resides at a higher level of the cache hierarchy. Consequently, the matching cache line will be preferred in the selection of a victim cache line for eviction from L3 cache 232 relative to cache lines belonging to the first class. The preference of the matching cache line as a victim cache line is further enhanced by setting the associated chronology vector 297 to indicate a replacement order or rank for the matching cache line as other than Most Recently Used (MRU), such as LRU or (LRU+1).

Further, for a hit in an Mx (e.g., M, Mu or Me) state, the coherency state is updated to either SL or I, depending upon the type of memory access requested. For core loads, as depicted in FIG. 3A, as well as for instruction fetches (Ifetch), fetches of page table entries containing information utilized for address translation (Xlate), and prefetches for load prefetch streams, the matching entry is preferably updated with a coherency state of SL and a replacement order other than Most Recently Used (e.g., LRU or LRU-1). Atomic loads, prefetches generated within a store prefetch stream and prefetches generated within a load/store prefetch stream preferably cause the matching entry is to be invalidated (i.e., set to I). The distinction in the final L3 cache states is made based upon different expectations as to whether a store to the memory block will subsequently be made. For instruction fetches, fetches of page table entries, and prefetches for load prefetch streams, no store operation is likely. Thus, it is helpful if the target memory block is retained in L3 cache 232. However, for atomic loads, prefetches generated within a store prefetch stream and prefetches generated within a load/store prefetch stream, a subsequent store to the target memory block is extremely likely, and leaving a copy of the memory block in L3 cache 232 would require a background kill bus operation to invalidate the L3 copy when a subsequent store to the memory block is made. The additional background kill bus operation would not only dissipate additional power, but also prolong the duration of the store operation must be managed by master 284 of L2 230.

As illustrated at block 318, master 284 of L2 cache 230 also updates the state of the requested cache line of data in cache directory 292 of L2 cache 230 in accordance with Table IV, below. In the depicted exemplary embodiment, the coherency state is updated in cache directory 292 of L2 cache 230 to the initial state of the cache line in L3 cache 232 if the initial coherence state of the target memory block in cache directory 292 of L3 cache 232 is other than Mx (e.g., M, Mu or Me). For core loads, as depicted in FIG. 3A, as well as for instruction fetches (Ifetch), fetches of page table entries containing information utilized to perform address translation (Xlate), and prefetches for load prefetch streams, the matching entry is preferably updated in L2 cache 230 to Tn if the initial state in L3 cache 232 is M or Mu, and is updated to Ten in L2 cache 230 if the initial state in L3 cache 232 is Me. An L2 coherence state with less authority than the initial L3 coherence state is employed for these types of memory access requests because of the low likelihood of a subsequent store and the desire to avoid data movement in the event of a subsequent L2 castout. However, it is preferable if L2 cache 230 is updated to the initial coherence state in L3 cache 232 if the requested memory access is an atomic load, prefetch generated within a store prefetch stream, or prefetch generated within a load/store prefetch stream that hits in L3 cache 232 in an Mx coherence state because of the high likelihood that these operations will be followed by a store operation.

TABLE IV

|  | Final L2 State | | | | | | |
| --- | --- | --- | --- | --- | --- | --- | --- |
| Initial L3 State | Load | Ifetch | Xlate | Prefetch (load) | Load (Lock) | Prefetch (Store) | Prefetch (Ld/St) |
| M | Tn | Tn | Tn | Tn | M | M | M |
| Mu | Tn | Tn | Tn | Tn | Mu | Mu | Mu |
| Me | Ten | Ten | Ten | Ten | Me | Me | Me |
| T | T | T | T | T | T | T | T |
| Te | Te | Te | Te | Te | Te | Te | Te |
| Tn | Tn | Tn | Tn | Tn | Tn | Tn | Tn |
| Ten | Ten | Ten | Ten | Ten | Ten | Ten | Ten |
| SL | SL | SL | SL | SL | SL | SL | SL |
| S | S | S | S | S | S | S | S |
| Ig | (n/a) | (n/a) | (n/a) | (n/a) | (n/a) | (n/a) | (n/a) |
| In | (n/a) | (n/a) | (n/a) | (n/a) | (n/a) | (n/a) | (n/a) |
| I | (n/a) | (n/a) | (n/a) | (n/a) | (n/a) | (n/a) | (n/a) |

As shown at block 324, once the victim cache line has been evicted from L2 cache 230, the cache line of data supplied to processor core 202 is also installed in L2 cache 230 (block 324). Thereafter, the process terminates at block 326.

Referring now to block 320, in response to the load requests 240, 260 missing in L2 cache 230 and L3 cache 232, master 284 of L2 cache 230 requests access authority and the target memory block from the system coherence manager (e.g., the distributed coherence management system described above) by transmitting an appropriate command 250 to the local instance of interconnect logic 212. Master 284 then updates the coherence state for the target memory block in its cache directory 292 in accordance with the coherence response (also referred to as combined response (CRESP)) for its request (block 322). Master 284 also supplies the target memory block to the requesting processor core, as indicated by the process passing through page connector A to block 306. In addition, once eviction of the L2 victim is complete and load data 252 is received, master 284 updates cache array 281 with the target memory block (block 324). Thereafter, the process ends at block 326.

Figure 3B:
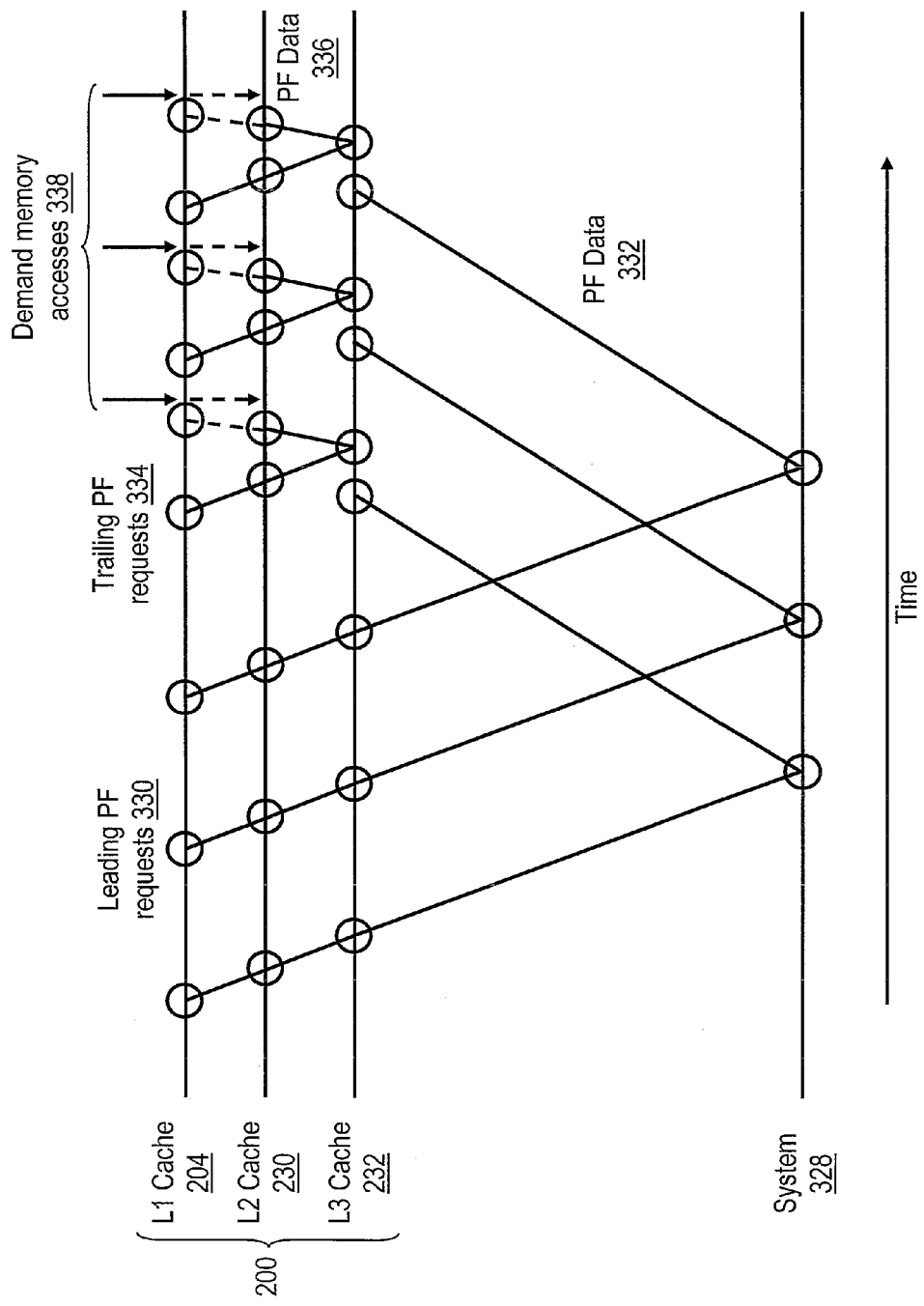
FIG. 3B is a time-space diagram of a sequence of leading and trailing prefetches in accordance with one embodiment.

With reference now to FIG. 3B, there is depicted a time-space diagram of an exemplary prefetching sequence in accordance with one embodiment. In the diagram, a particular processor core and cache hierarchy 200 is depicted as containing an L1 cache 204, L2 cache 230 and L3 cache 232, and the remainder of data processing system 100 is collectively represented as system 328.

In the depicted exemplary prefetching sequence, a stream of leading prefetch (PF) requests 330 is generated by the streaming prefetcher 203 in the processor core 202 and then passed to the cache memory hierarchy. Thus, in contrast to demand load requests, the leading prefetch requests (as well as other prefetch requests) are not generated through the execution of an ISA instruction by the instruction execution circuitry of processor core 202, but rather generated by streaming prefetcher 203 in anticipation of execution of one or more ISA instructions that implicitly or explicitly indicate a memory access. Although the leading prefetch requests 330 accesses each level of the cache memory hierarchy, as shown in FIG. 3B by circles, it is generally the case that the target memory blocks of leading prefetch requests 330 do not initially reside in the cache memory hierarchy. Accordingly, a prefetch machine (PFM) 234 within L3 cache 232 generally issues leading prefetch requests 330 to system 328, which supplies the target memory blocks of leading prefetch requests as prefetch data 332. In contrast to conventional prefetching schemes, prefetch data 332 responsive to leading prefetch requests 330 are installed in L3 (victim) cache 232 rather than directly in L2 cache 230.

In some operating scenarios, for purposes of local optimization, leading prefetch requests 330 are discarded at some level of the cache memory hierarchy and not forwarded to a lower level of the cache memory hierarchy or system 328. Because leading prefetch requests 330 are speculative in nature and are generated to reduce latency rather than in response to a demand memory access, the discarding of a leading prefetch request will not affect correctness.

Subsequent to a leading prefetch request 330 and nearer in time to an anticipated demand memory access request (e.g., demand load or store request), streaming prefetcher 203 issues a corresponding trailing prefetch request 334 targeting the same target memory block. Although trailing prefetch requests 334 access each level of the cache memory hierarchy, as shown in FIG. 3B by circles, it is generally the case that the target memory block of a trailing prefetch request 334 initially resides only in L3 cache memory 232 as a result of the earlier corresponding leading prefetch request 330. Accordingly, L3 cache 232 generally services a trailing prefetch request 334 by supplying the target memory block of the trailing prefetch request to one or more higher levels of cache memory as prefetch data 336. For example, in an embodiment described below, prefetch data 336 of load or load/store prefetch streams are installed in both L1 cache 204 and L2 cache 230, while prefetch data 336 of store prefetch streams are installed in L2 cache 230, but not L1 cache 204. This distinction is made because in the preferred embodiment, L1 cache 230 is a store-through cache and L2 cache 230 is a store-in cache, meaning that all store requests are resolved at L2 cache 230.

With the prefetch data staged within the cache memory hierarchy in the manner described above, a demand memory access 338 (e.g., a demand load or store request) subsequent to a leading prefetch request 330 and a trailing prefetch request 334 is serviced with an optimal access latency.

Figure 3C:
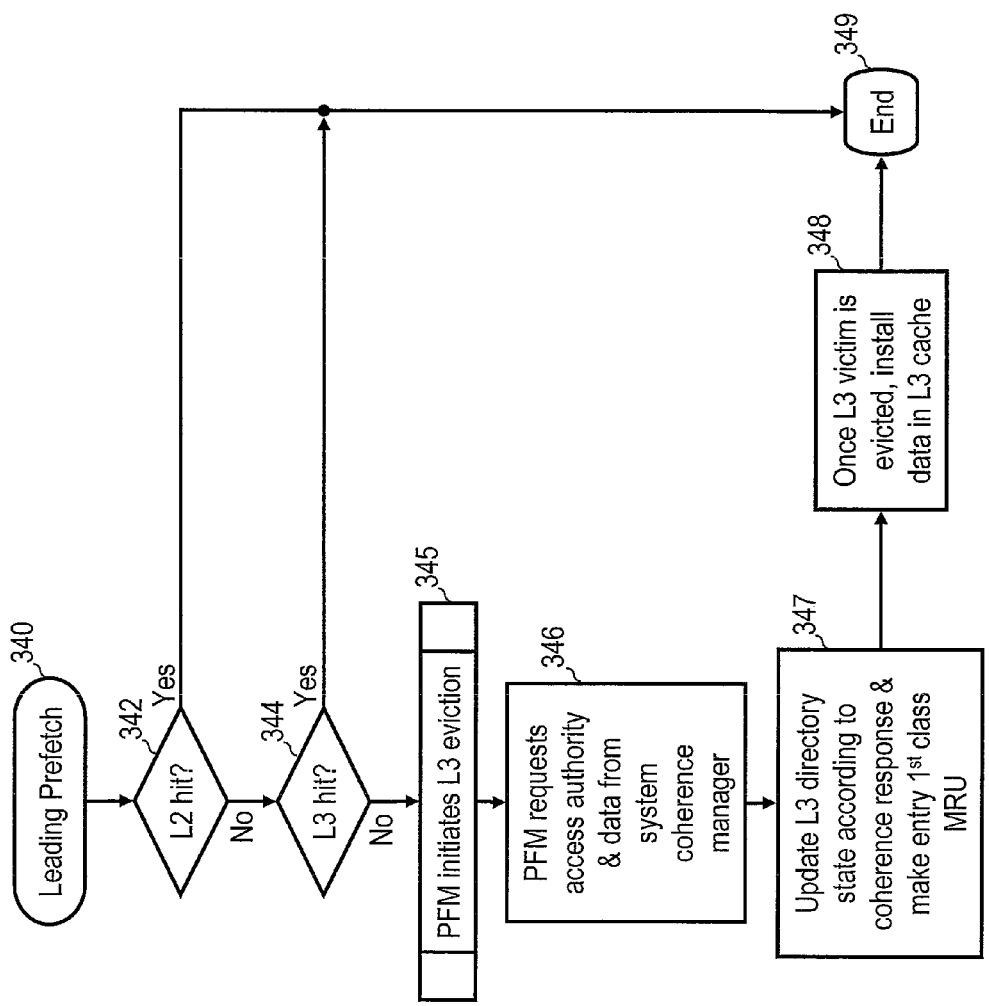
FIG. 3C is a high level logical flowchart of an exemplary method of performing a leading prefetch in accordance with one embodiment.

Referring now to FIG. 3C, there is depicted a high level logical flowchart of an exemplary method of performing a leading prefetch in accordance with one embodiment. The illustrated process begins at block 340 following a miss of leading prefetch request in the L1 cache 204 and then proceeds to block 342, which depicts a determination by L2 cache 230 whether or not the leading prefetch request hits in cache directory 292 of L2 cache 230. If so, the leading prefetch request is aborted, and the process terminates at block 349. If, however, the leading prefetch request misses in L2 cache 230, the process proceeds to block 344.

Block 344 depicts a determination by L3 cache 232 whether or not the leading prefetch request hits in cache directory 292 of L3 cache 232. If so, the leading prefetch request is aborted, and the process terminates at block 349. If, however, the leading prefetch request misses in L3 cache 232, the process proceeds to block 345. Block 345 illustrates L3 cache 232 allocating a prefetch machine 234 to manage the leading prefetch request, which in turn initiates the process of evicting a victim entry from L3 cache 232 in preparation for receiving the prefetch data requested by the leading prefetch request.

Next, at block 346, the prefetch machine 234 allocated to the leading prefetch request requests access authority and the target memory block from the system coherence manager (e.g., the distributed coherence management system described above) by transmitting an appropriate command 250 to the local instance of interconnect logic 212. Prefetch machine 234 then updates the coherence state for the target memory block in its cache directory 292 in accordance with the coherence response (also referred to as combined response (CRESP)) for its request and sets the class and rank indicated by the replacement field 298 of the target memory block to first class MRU (block 347). The designation of the target memory block of the leading prefetch request as first class indicates that the target memory block is likely to again be the target of a memory access request by the associated processor core 202. In addition, once eviction of the L3 victim entry is complete and prefetch data 332 is received, prefetch machine 234 updates cache array 281 of L3 cache 232 with the target memory block (block 348). Thereafter, the process ends at block 349.

Figure 3D:
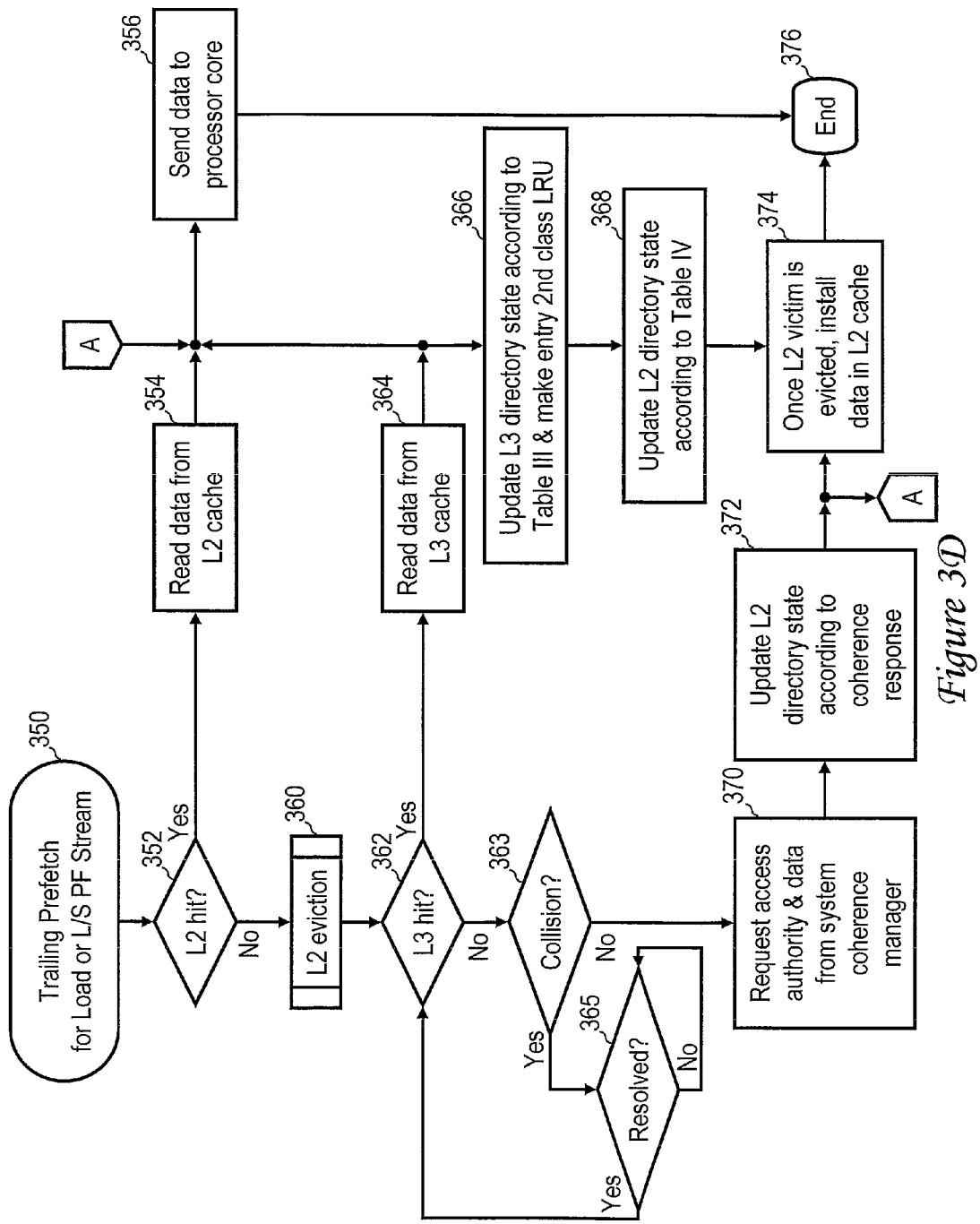
FIG. 3D is a high level logical flowchart of an exemplary method of performing a trailing prefetch for a load or load/store prefetch stream in accordance with one embodiment.

With reference now to FIG. 3D, there is illustrated a high level logical flowchart of an exemplary method of performing a trailing prefetch for a load or load/store prefetch stream in accordance with one embodiment. The process depicted in FIG. 3D begins at block 350 following a miss of trailing prefetch request of a load or load/store prefetch stream in an L1 cache 204 and then proceeds to block 352. At block 352, master 284 of L2 cache 230 accesses its cache directory 292 to determine whether or not the target address specified by the trailing prefetch request hits in cache directory 292 of L2 cache 230. If so, the process then proceeds to blocks 354 and 356, which depict master 284 of L2 cache 230 reading the requested cache line of data from its cache array 281 and then sending the target cache line of data to the requesting processor core 202. Thereafter, the process terminates at block 376.

Returning to block 352, in response to an L2 miss, the process proceeds to block 360, which illustrates L2 cache 230 selecting and initiating eviction of a victim cache line, as discussed further below with reference to FIGS. 5-6. In addition, L2 cache 230 transmits the trailing prefetch request to L3 cache 232. Consequently, L3 cache 232 accesses its cache directory 292 to determine whether or not the target address specified by the trailing prefetch request hits in cache directory 292 of L3 cache 232 (block 362). If not, the process passes to block 363, which is described below. If, however, the trailing prefetch request hits in cache directory 292 of L3 cache 232, the process proceeds to block 364, which depicts L3 cache 232 reading the requested cache line of data from cache array 281 of L3 cache 232 and providing the requested cache line to L2 cache 230. The process then bifurcates and proceeds to blocks 356 and 366.

As noted above, block 356 depicts L3 cache 232 sending the requested cache line of data to the requesting processor core 202. Thereafter, the first branch of the process ends at block 376. Block 366 illustrates L3 cache 232 updating the coherence state of the requested cache line of data in cache directory 292 of L3 cache 232 in accordance with Table III, above. In addition, L3 cache 232 updates replacement field 298 for the requested cache line to indicate second class LRU, meaning that the requested cache line is not likely to again be accessed by the associated processor core 202 and is preferred for replacement in the event of an L3 eviction. As illustrated at block 368, master 284 of L2 cache 230 also updates the state of the requested cache line of data in cache directory 292 of L2 cache 230, if necessary, in accordance with Table IV, above. As shown at block 374, once the victim cache line has been evicted from L2 cache 230, the cache line of data supplied to processor core 202 is also installed in L2 cache 230 (block 374). Thereafter, the process terminates at block 376.

Referring now to block 363, if a trailing prefetch request misses in L3 cache 232, master 284 within L2 cache 230 does not immediately transmit the trailing prefetch request to the broader system for service. Instead, at block 363 master 284 first checks whether the trailing prefetch request collides (i.e., has a matching target address) with another memory access request currently being serviced by master 284 of L3 cache 232 (i.e., a leading prefetch request being handled by a prefetch machine 234). If not, the process passes directly to block 370, which is described below. If, however, the trailing prefetch request collides with another memory access request currently being serviced by master 284 of L3 cache 232, then master 284 of L2 cache 230 waits until the other memory access request is resolved, as shown at block 365, and thereafter again checks whether the trailing memory access request hits in cache directory 292 of L3 cache 232, as shown at block 362 and as described above. In this manner, bandwidth on the system interconnects is not unnecessarily consumed by the address and data tenures of prefetch requests, which are necessarily speculative.

Referring now to block 370, master 284 of L2 cache 230 requests access authority and the target memory block from the system coherence manager (e.g., the distributed coherence management system described above) by transmitting an appropriate command 250 to the local instance of interconnect logic 212. In response to receipt of the coherence response (also referred to as combined response (CRESP)) and prefetch data for the trailing prefetch request, master 284 of L2 cache 230 updates the coherence state for the target memory block in its cache directory 292 in accordance with the coherence response (block 372). Master 284 of L2 cache 230 also supplies the target memory block to the requesting processor core 202, as indicated by the process passing through page connector A to block 306. In addition, once eviction of the L2 victim is complete and the prefetch data is received, master 284 of L2 cache 230 updates the cache array 281 of L2 cache 230 with the target memory block (block 374). Thereafter, the process ends at block 376.

It should be noted that in the case of a miss of a trailing prefetch in L3 cache 232, the prefetch data is not installed in L3 cache 232. L3 cache 232 is "skipped" for purposes of data installation because, in most cases, a subsequent demand memory access will be serviced by a higher level of the cache memory hierarchy.

Figure 3E:
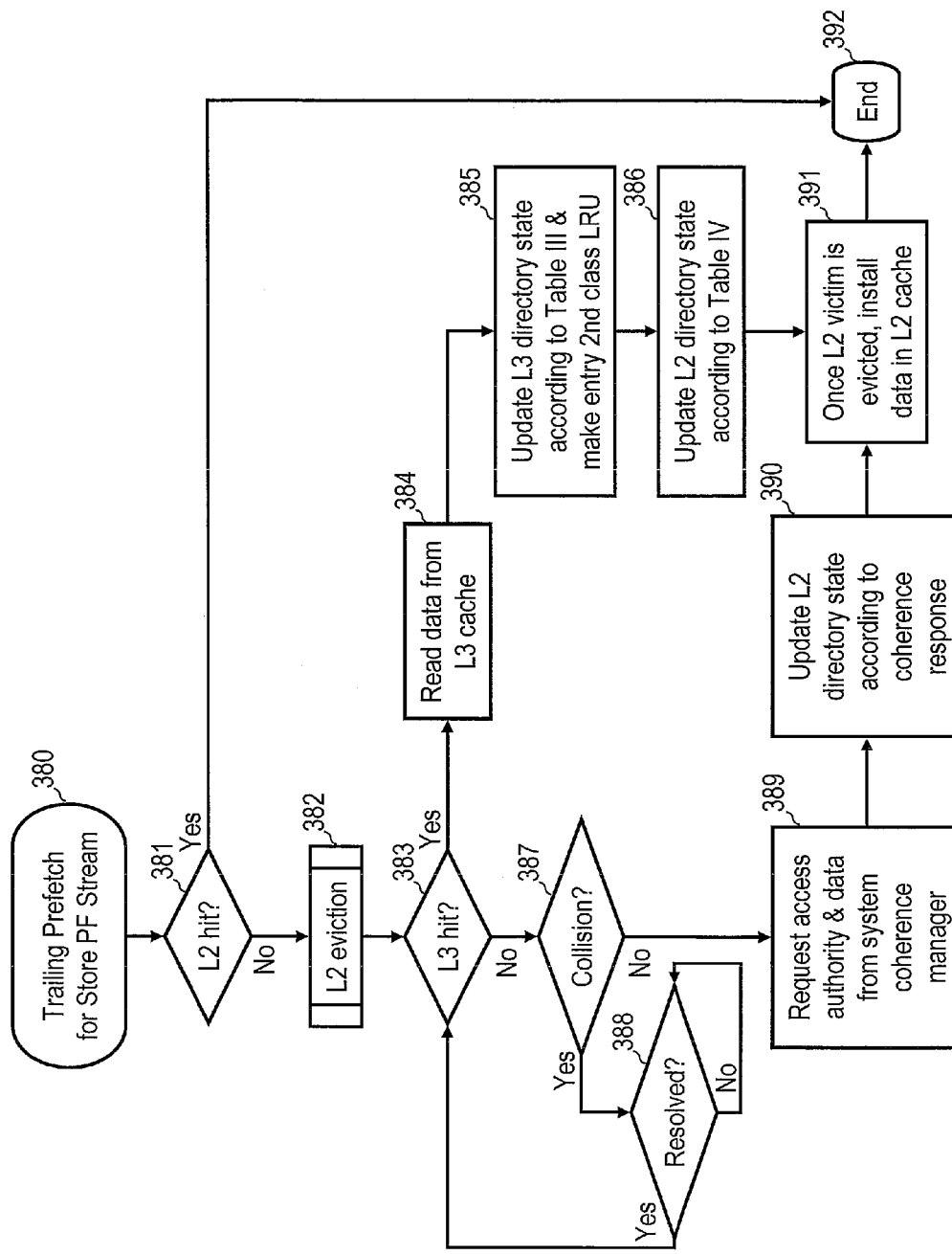
FIG. 3E is a high level logical flowchart of an exemplary method of performing a trailing prefetch for a store prefetch stream in accordance with one embodiment.

Referring now to FIG. 3E, there is depicted a high level logical flowchart of an exemplary method of performing a trailing prefetch for a store prefetch stream in accordance with one embodiment. The process depicted in FIG. 3E begins at block 380 following receipt at an L2 cache 230 of a trailing prefetch request of a store prefetch stream from the associated processor core 202. The process then proceeds to block 381, which illustrates master 284 of L2 cache 230 accessing its cache directory 292 to determine whether or not the target address specified by the trailing prefetch request hits in cache directory 292 of L2 cache 230. If so, the target memory block is already staged to store-in L2 cache 230, meaning that no prefetching is required. Accordingly, the process terminates at block 392.

Returning to block 381, in response to an L2 miss, the process proceeds to block 382, which illustrates L2 cache 230 selecting and initiating eviction of a victim cache line, as discussed further below with reference to FIG. 6. In addition, L2 cache 230 transmits the trailing prefetch request to L3 cache 232. Consequently, L3 cache 232 accesses its cache directory 292 to determine whether or not the target address specified by the trailing prefetch request hits in cache directory 292 of L3 cache 232 (block 383). If not, the process passes to block 387, which is described below. If, however, the trailing prefetch request hits in cache directory 292 of L3 cache 232, the process proceeds to block 384, which depicts L3 cache 232 reading the requested cache line of data from cache array 281 of L3 cache 232 and sending the requested cache line of data to L2 cache 230. The process then proceeds to block 385.

Block 385 illustrates L3 cache 232 updating the coherence state of the requested cache line of data in cache directory 292 of L3 cache 232 in accordance with Table III, above. In addition, L3 cache 232 updates replacement field 298 for the requested cache line to indicate second class LRU, meaning that the requested cache line is unlikely to again be accessed by the associated processor core 202 and is preferred for replacement in the event of an L3 eviction. Master 284 of L2 cache 230 also updates the state of the requested cache line of data in cache directory 292 of L2 cache 230 in accordance with Table IV, above (block 386). As shown at block 391, once the victim cache line has been evicted from L2 cache 230, the cache line of prefetch data is installed in L2 cache 230 (block 391). Thereafter, the process terminates at block 392.

Referring now to block 387, if a trailing prefetch request misses in L3 cache 232, master 284 of L2 cache 230 does not immediately transmit the trailing prefetch request to the broader system for service. Instead, at block 387 master 284 of L2 cache 230 first checks whether the trailing prefetch request collides (i.e., has a matching target address) with another memory access request currently being serviced by master 284 of L3 cache 232 (i.e., a leading prefetch request being handled by a prefetch machine 234). If not, the process passes directly to block 389, which is described below. If, however, the trailing prefetch request collides with another memory access request currently being serviced by master 284 of L3 cache 232, then master 284 of L2 cache 230 waits until the other memory access request is resolved, as shown at block 388, and thereafter again checks whether the trailing memory access request hits in cache directory 292 of L3 cache 232, as shown at block 383 and as described above. In this manner, bandwidth on the system interconnects is not unnecessarily consumed by the address and data tenures of prefetch requests.

Referring now to block 389, master 284 of L2 cache 230 requests access authority and the target memory block from the system coherence manager (e.g., the distributed coherence management system described above) by transmitting an appropriate command 250 to the local instance of interconnect logic 212. In response to receipt of the coherence response and prefetch data for the trailing prefetch request, master 284 of L2 cache 230 updates the coherence state for the target memory block in its cache directory 292 in accordance with the coherence response (block 390). In addition, once eviction of the L2 victim is complete and the prefetch data is received, master 284 of L2 cache 230 updates the cache array 281 of L2 cache 230 with the target memory block of the trailing prefetch request (block 391). Thereafter, the process ends at block 392.

Figure 4:
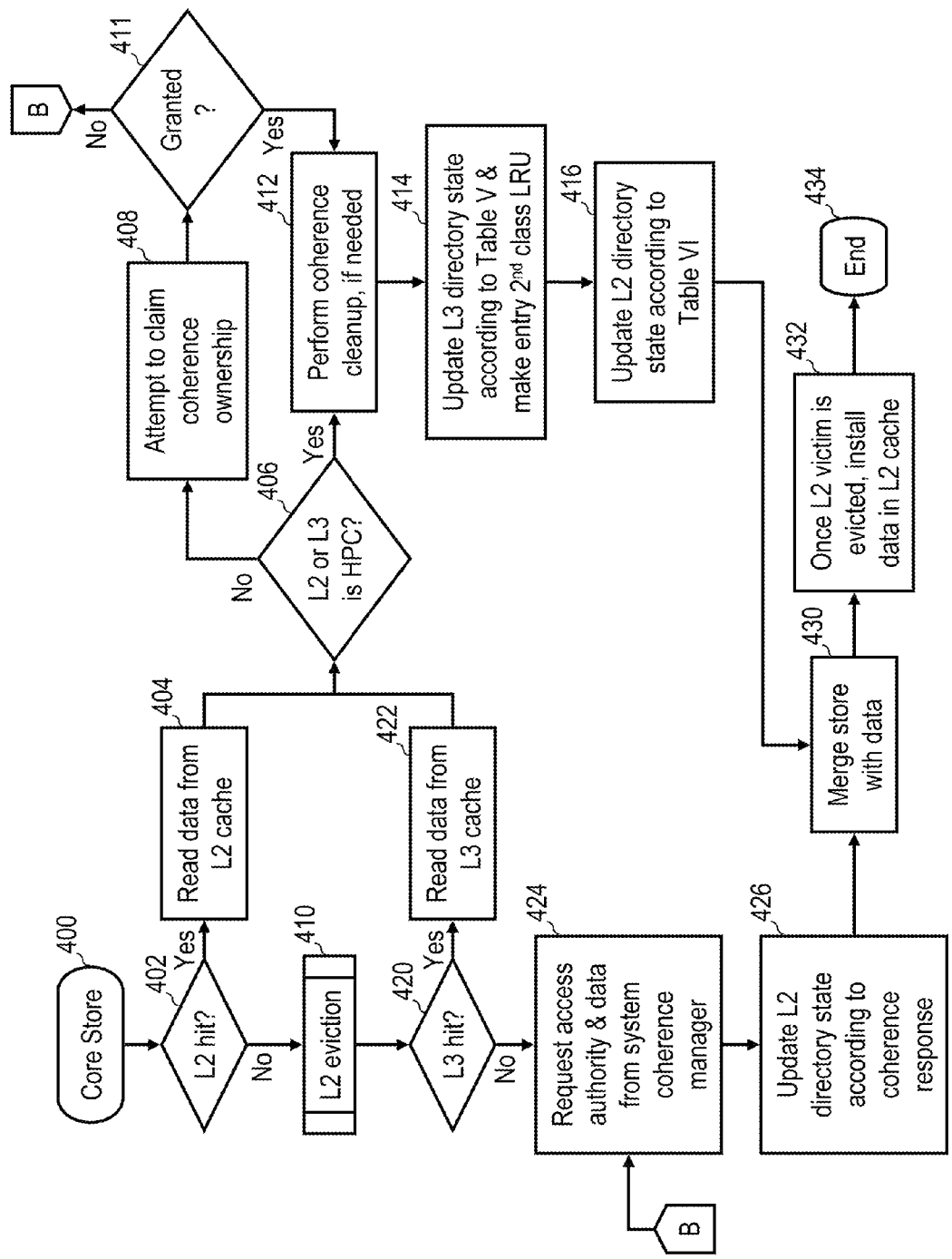
FIG. 4 is a high level logical flowchart of an exemplary method of performing a processor store in accordance with one embodiment.

Referring now to FIG. 4, there is depicted a high level logical flowchart of an exemplary method of performing a processor store in accordance with one embodiment. The illustrated process begins at block 400 in response to receipt by L2 cache 230 of a store request 247 from its associated processor core 202. In response to store request 247, master 284 of L2 cache 230 accesses its cache directory 292 to determine whether or not the target address specified by load request 240 hits in cache directory 292 (block 402). If so, the process then proceeds to block 404, which depicts master 284 of L2 cache 230 reading the requested cache line of data from cache array 281 of L2 cache 230. The process then passes to block 406, which is described below.

Returning to block 402, in response to a determination that the target address of the store request 247 missed in cache directory 292 of L2 cache 230, master 284 initiates eviction of a victim cache line from L2 cache 230, as shown at block 410 and as described further below with reference to FIG. 5. Master 284 also forwards the target address of store request 247 to L3 cache 232. In response to receipt of the target address of store request 247, master 284 of L3 cache 232 accesses its cache directory 292 to determine whether or not the target address specified by load request 240 hits in cache directory 292 (block 420). If not, the process passes to block 424 and following blocks, which are described below. If, however, the target address of store request 247 hits in cache directory 292 of L3 cache 232, the process proceeds to block 422, which depicts master 284 of L3 cache 232 reading the requested cache line of data from cache array 281 of L3 cache 232. The process then passes to block 406.

Block 406 determines the master 284 of the L2 or L3 cache memory in which the target address hit determining whether or not it is the highest point of coherency (HPC) for the target memory block associated with the target address. An HPC is defined herein as a uniquely identified device that caches a true image of the memory block (which may or may not be consistent with the corresponding memory block in system memory 108) and has the authority to grant or deny a request to modify the memory block. Descriptively, the HPC may also provide a copy of the memory block to a requestor in response to an operation that does not modify the memory block. Although other indicators may be utilized to designate an HPC for a memory block, a preferred embodiment of the present invention designates the HPC, if any, for a memory block utilizing selected cache coherence state(s). Thus, assuming the coherence states set forth in Tables I and II, above, an L2 cache 230 or L3 cache 232 is designated as an HPC by holding the target memory block in any of the T, Te, Tn, Ten, M, Me or Mu states.

If the master 284 determines at block 406 that its cache 230 or 232 is the HPC for the target memory block, the process passes to block 412, which is described below. If, however, the master 284 determines that its cache is not the HPC for the target memory block, for example, because the target address hit in the S or Sl coherence state, then master 284 attempts to claim coherence ownership of the target memory block and assume the designation of HPC by transmitting a DClaim (data claim) operation on the interconnect fabric via interconnect logic 212 (block 408). Master 284 determines whether the attempt to claim coherence ownership is granted at block 411 by reference to the system coherence response (CRESP) to the DClaim. If the attempt to claim coherence ownership is not granted, which typically means that master 284 has been forced to invalidate its copy of the target memory block by a competing master 284 in another cache hierarchy, the process passes through page connector B to block 424, which is described below. If, however, the master 284 determines at block 411 that the attempt to claim coherence ownership is successful, master 284 performs any coherence "cleanup" necessary to ensure that it alone has a valid cached copy of the target cache line, as shown at block 412. The coherence "cleanup" typically entails issuing one or more kill requests on local interconnect 114 and/or system interconnect 110 via interconnect logic 212 to invalidate other cached copies of the target memory block.

Next, at block 414 master 284 of L3 cache 232 updates the coherence state of the target memory block in cache directory 292 of L3 cache 232 in accordance with Table V, below. Although the final L3 coherence state in each case is Invalid (I), the class and rank reflected by replacement field 298 are preferably updated to second class LRU in order to avoid the need to implement "special case" logic to handle the case of cache lines in the I coherence state.

TABLE V

| Initial L3 State | Final L3 State |
| --- | --- |
| M | I |
| Mu | I |
| Me | I |
| T | I |
| Te | I |
| Tn | I |
| Ten | I |
| SL | I |
| S | I |
| Ig | n/a |
| In | n/a |
| I | n/a |

As illustrated at block 416, master 284 of L2 cache 230 also updates the state of the target memory block in cache directory 292 of L2 cache 230 in accordance with Table VI, below. As indicated, the target memory block will have an M or Mu coherency state, depending upon whether sharing of the target memory block should be encouraged. This determination can be made on a number of factors, including the type of store access that updated the target memory block. Further details can be found, for example, in U.S. Pat. No. 6,345,343 and U.S. patent application Ser. No. 11/423,717, which are incorporated herein by reference.

TABLE VI

| Initial L2 or L3 State | Final L2 State |
| --- | --- |
| M | M or Mu |
| Mu | M or Mu |
| Me | M or Mu |
| T | M or Mu |
| Te | M or Mu |
| Tn | M or Mu |
| Ten | M or Mu |
| Sl | M or Mu |
| S | M or Mu |
| Ig | n/a |
| In | n/a |
| I | n/a |

The process proceeds from block 416 to block 430, which is described below.

Referring now to block 424, master 284 of L2 cache 230 requests the target memory block and permission to modify the target memory block from the distributed system coherence manager by transmitting an appropriate command (e.g., Read-with-intent-to-modify (RWITM)) to the local instance of interconnect logic 212. Master 284 then updates the coherence state for the target memory block in its cache directory 292 in accordance with the coherence response for its request (block 426). Assuming the request was successful, master 284 of L2 cache 230 merges the store data 249 received from processor core 202 with the target memory block (block 430). Thus, master 284 may update one or more granules 290 of the target memory block. In addition, once eviction of the L2 victim is complete, master 284 of L2 cache 230 updates cache array 281 with the target memory block (block 432). Thereafter, the process ends at block 434.

Figure 5:
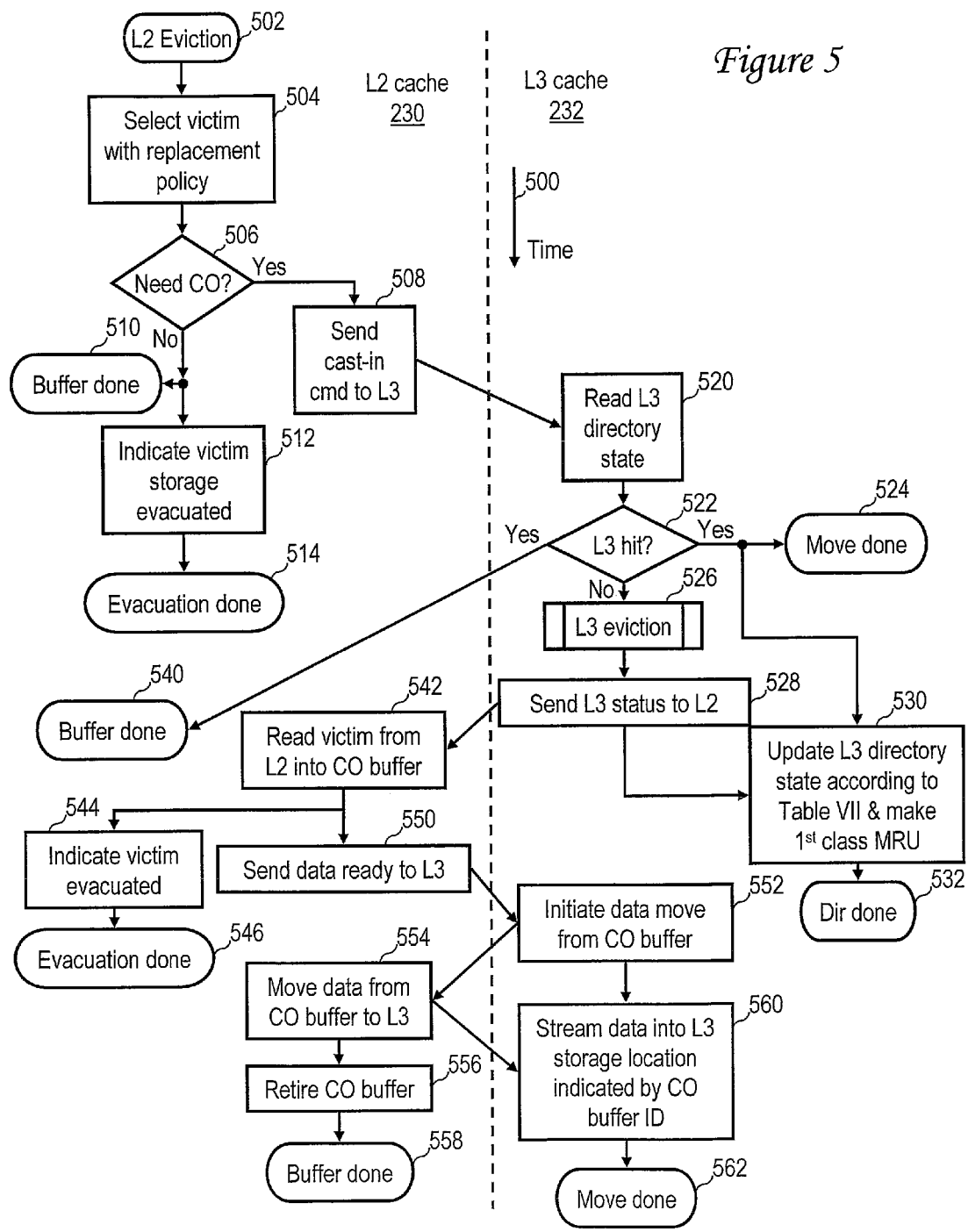
FIG. 5 is a high level flowchart of an exemplary process for performing an L2 eviction and L3 cast-in in accordance with one embodiment.

Referring now to FIG. 5, there is depicted a high level flowchart of a process of performing an L2 eviction and casting-in the victim cache line into an L3 victim cache in accordance with the one embodiment. The steps depicted on the left side of FIG. 5 are those performed by an L2 cache, such as L2 cache 230, and those shown on the right side of FIG. 5 are performed by an L3 victim cache, such as L3 cache 232. Steps are generally shown in chronological order, with time advancing in the direction of arrow 500.

The illustrated process begins at block 502 in response to an L2 cache miss as shown, for example, at block 310 of FIG. 3 or block 410 of FIG. 4. In response to the L2 cache miss, L2 cache 230 allocates a CO buffer 295 to perform an L2 eviction and selects a victim cache line for replacement in accordance with a selected replacement policy (e.g., least recently used or a variant thereof), as shown at block 504. As indicated at block 506, L2 cache 230 (i.e., master 284 of L2 cache 230) then reads cache directory 292 of L2 cache 230 to determine whether or not a castout is to be performed, for example, by determining if the selected victim cache line has a data-valid coherence state (e.g., Mx, Tx or Sx, where the "x" refers to any variant of the base coherence state) or a scope-state indication coherence state, such as Ig or In. If not, then the CO buffer 295 allocated to the L2 eviction is deallocated and assumes the "done" state (block 510). Because the victim cache line contains no valid data that must be preserved, L2 cache 230 can also indicate that the storage location of the victim cache line in the L2 cache array 281 has been evacuated (blocks 512, 514) and can be filled with a new cache line of data (i.e., the target cache line of the request of the processor core).

Returning to block 506, if the L2 cache determines that L2 cache directory 292 indicates that a castout is to be performed, L2 cache 230 does not immediately perform a read of L2 cache array 281, as is performed in a conventional process. Instead, L2 cache 230 transmits a cast-in command to the L3 cache 232 (block 508). The cast-in command may contain or be accompanied by the real address of the victim cache line, the L2 coherence state, and the CO buffer ID of the allocated CO buffer 295.

In response to receipt of the cast-in command, L3 cache 232 reads the coherence state associated with the specified address in its L3 cache directory 292 (block 520). If the L3 cache directory 292 indicates a data-valid coherence state (block 522), then the cast-in data already resides in the L3 cache array 281, and no data update to the L3 cache array 281 is required, as indicated by block 524. Accordingly, L3 cache 232 signals L2 cache 230 to retire the CO buffer 295 allocated to the L2 eviction by issuing an appropriate command specifying the CO buffer ID, as indicated by the arrow connecting block 522 to block 540. In addition, as shown at block 530, L3 cache 232 updates the coherency state of the victim cache line in the L3 cache directory 292 in accordance with Table VII, below (the designation Err in Table VII indicates an error condition). In addition, L3 cache 232 sets the rank and class of the victim cache line inserted into L3 cache 232 to first class MRU. Thereafter, the L3 directory update completes at block 532.

TABLE VII

| Initial | L2 Castout State | | | | | | | | | | |
|---|---|---|---|---|---|---|---|---|---|---|---|
| L3 State | M | Mu | Me | T | Te | Tn | Ten | SL | S | Ig | In |
| M | Err | Err | Err | Err | Err | Err | Err | Err | Err | M | M |
| Mu | Err | Err | Err | Err | Err | Err | Err | Err | Err | Mu | Mu |
| Me | Err | Err | Err | Err | Err | Err | Err | Err | Err | Me | Me |
| T | Err | Err | Err | Err | Err | Err | Err | T | T | T | T |
| Te | Err | Err | Err | Err | Err | Err | Err | Te | Te | Te | Te |
| Tn | Err | Err | Err | Err | Err | Err | Err | Tn | Tn | Tn | Tn |
| Ten | Err | Err | Err | Err | Err | Err | Err | Ten | Ten | Ten | Ten |
| SL | Err | Err | Err | T | Te | Tn | Ten | Err | SL | Ig | SL |
| S | Err | Err | Err | T | Te | Tn | Ten | SL | S | Ig | S |
| Ig | M | Mu | Me | T | Te | Tn | Ten | Ig | Ig | Ig | Ig |
| In | M | Mu | Me | T | Te | Tn | Ten | SL | S | Ig | In |
| I | M | Mu | Me | T | Te | Tn | Ten | SL | S | Ig | In |

Referring again to block 522, if L3 cache 232 determines that the address specified by the cast-in command misses in L3 cache array 281, then L3 cache 232 begins the process of evicting a selected victim cache line from L3 cache array 281 (block 526), as described further below with reference to FIG. 6A. L3 cache 232 then provides to L2 cache 230 a status signal referencing the CO buffer ID, thereby indicating that a data move from L2 cache 230 to L3 cache 232 will be performed (block 528). In addition, as shown at block 530, L3 cache 232 updates the coherency state of the victim cache line in L3 cache directory 292 in accordance with Table VII, above. Thereafter, the L3 directory update completes at block 532. Thus, the directory update can be performed in advance of initiation of the data move.

Referring now to block 542, in response to receipt of the status signal from L3 cache 232 indicating that a data move is to be performed, L2 cache 230 expends the power required to read the selected victim cache line from the L2 cache array 281 into the allocated CO buffer 295. In response to the read of L2 cache array 281, L2 cache 230 can indicate that the storage location of the victim cache line in the L2 array has been evacuated (blocks 544, 546) and can therefore be filled with a new cache line of data. In addition, L2 cache 230 sends to L3 cache 232 a data ready signal specifying the CO buffer ID in order to indicate that the victim cache line has been read into the allocated CO buffer 295 (block 550).

In response to the data ready signal, L3 cache 232 initiates a data move of the cast-in data from the CO buffer 295 of L2 cache 230 to L3 cache 232 by issuing to L2 cache 230 a data move command specifying the relevant CO buffer ID (block 552). In response to receipt of the data move command of L3 cache 232, L2 cache 230 transfers the data in the specified CO buffer 295 to L3 cache 232, as indicated at block 554. In a typical implementation, the victim cache line is transmitted in association with the CO buffer ID. Following the data transfer, L2 cache 230 retires or deallocates the CO buffer 295 allocated to the L2 eviction (block 556), indicating usage of the CO buffer 295 is complete (block 558). In response to receipt of the victim cache line and CO buffer ID, L3 cache 232 places the cast-in data into L3 cache array 281 in the location indicated by the CO buffer ID (block 560), thereby completing the movement of the victim cache line from L2 cache 230 to the cache array of the L3 cache 232 (block 562).

Figure 6A:
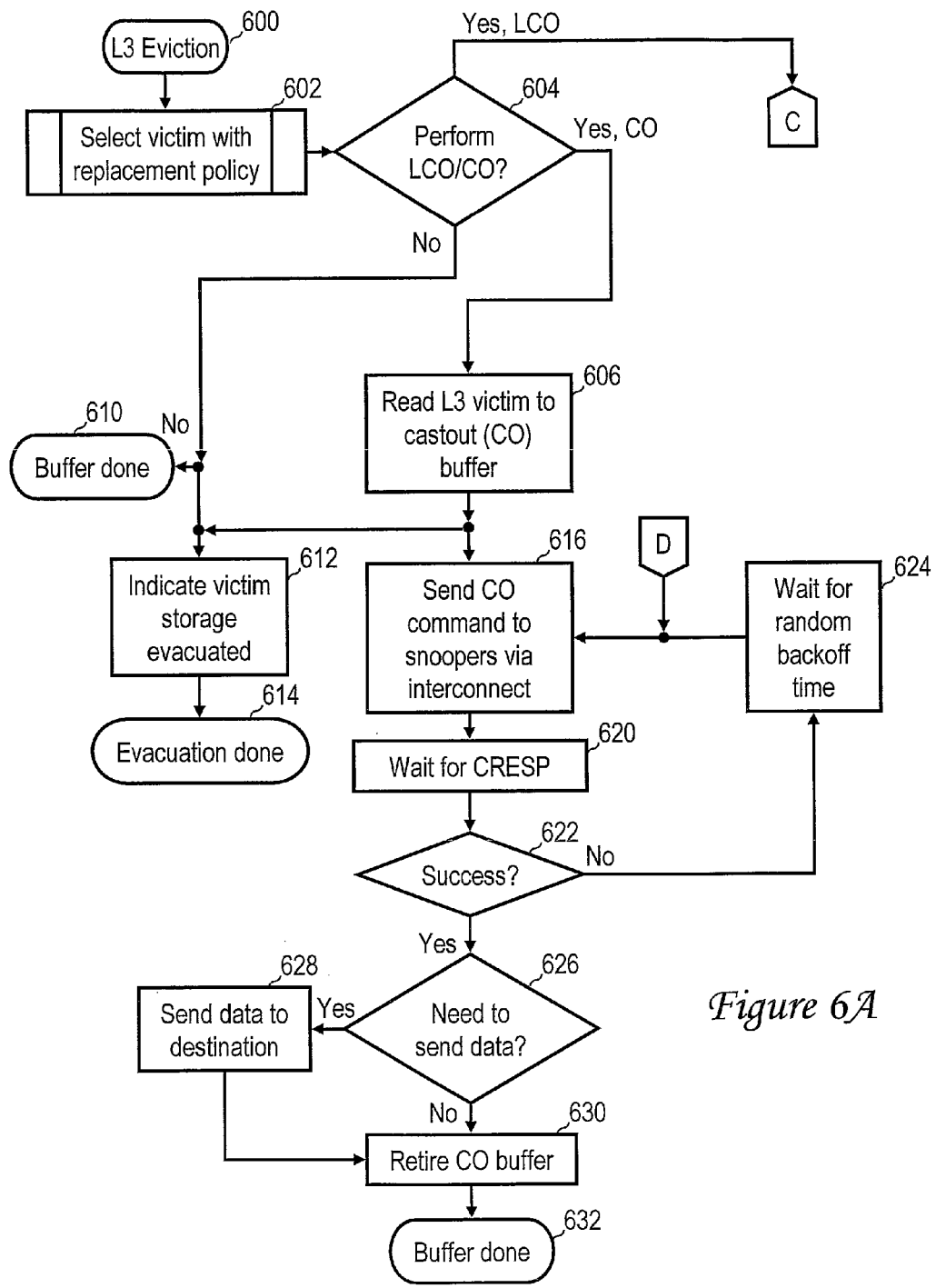
FIGS. 6A-6B together form a high level logical flowchart of an L3 eviction in accordance with one embodiment.

With reference now to FIG. 6A, there is illustrated a high level logical flowchart of an L3 eviction in accordance with one embodiment. The process begins at block 600, for example, in response to initiation of an L3 eviction in response to an L2 cast-in command (as shown at block 526 of FIG. 5) or in response to a leading prefetch (as shown at block 345 of FIG. 3C) or in response to an L3 cast-in (as shown at block 1030 of FIG. 10B or block 1083 of FIG. 10D). In response to initiation of the L3 eviction, L3 cache 232 (i.e., master 284 of L3 cache 232) allocates a CO buffer 295 to the L3 eviction and selects a victim cache line for replacement in accordance with a selected replacement policy, as shown at block 602 and as described further below with reference to FIG. 7A.

As indicated at block 604, L3 cache 232 determines whether to perform castout of the victim cache line, and if so, whether to perform a lateral castout (LCO) to another L3 cache 232 or a traditional castout (CO). In many if not most implementations, it is desirable to perform an LCO (i.e., an L3-to-L3 castout) rather than a traditional CO to system memory 108 if possible in order to provide lower latency access to data and avoid consuming system memory bandwidth and power. An exemplary process for determining whether to perform a castout is depicted in FIG. 7C, which is described below.

In response to a determination at block 603 to perform an LCO, the process proceeds from block 603 through page connector C to block 640 of FIG. 6B, which is described below. If L3 cache 232 decides at block 604 to perform a CO, the process proceeds to block 606, which is described below. Finally, if L3 cache 232 determines at block 604 that no castout is to be performed, then the CO buffer 295 allocated to the L3 eviction is deallocated and assumes the "done" state (block 610). Because the victim cache line contains no valid data that must be preserved, the L3 victim cache can also indicate that the storage location of the victim cache line in the L3 array has been evacuated (blocks 612, 614) and can be filled with a new cache line of data.

Referring now to block 606, if L3 cache 232 determines that a CO is to be performed for the victim cache line, then L3 cache 232 reads the victim cache line from cache array 281 into the allocated castout (CO) buffer 295. L3 cache 232 then indicates that the storage location of the victim cache line in the L3 array has been evacuated (blocks 612, 614). In addition, the L3 cache 232 transmits a CO command 270 on the interconnect fabric via interconnect logic 212 (block 616) and then awaits a combined response (from the process shown in FIG. 6C) providing a system-wide coherency response to the CO command (block 620). The activity of the snoopers (e.g., IMCs 206 and snoopers 286 of L2 caches 230 and L3 caches 232) in response to receipt of the CO command and the generation of the combined response are described below with reference to FIGS. 8-9, respectively.

In response to receipt of the combined response of the CO command, L3 cache 232 determines whether or not the combined response indicates success of the CO command at block 622. If not, L3 victim cache 232 waits for a "backoff" time, which can be selected randomly within a predetermined range in order to reduce deadlocks (block 624). Thereafter, the process returns to block 616, which has been described. Referring again to block 622, if the combined response indicates that the CO command was successful, L3 victim cache 232 determines at block 626 whether the castout entails transmission of the victim cache line. For example, if the victim cache line is in the Ig state, meaning that the data is invalid, then no transmission of the data of the victim cache line is to be performed. If, on the other hand, the victim cache line is in the T state, the L3 victim cache will determine that the victim cache line data are to be transmitted to a snooper. If a determination is made that the victim cache line data are to be transmitted, the L3 victim cache 232 transmits the victim cache line data 264 from the CO buffer to the destination (e.g., an IMC 206) at block 628. Thereafter, L3 victim cache 232 retires the CO buffer allocated to the L3 eviction (block 630), giving the CO buffer a "done" status (block 632). If, however, L3 victim cache 232 determines at block 626 that no transmission of the victim cache line data is to be performed, then the process simply passes from block 626 to blocks 630 and 632, which have been described.

Figure 6B:
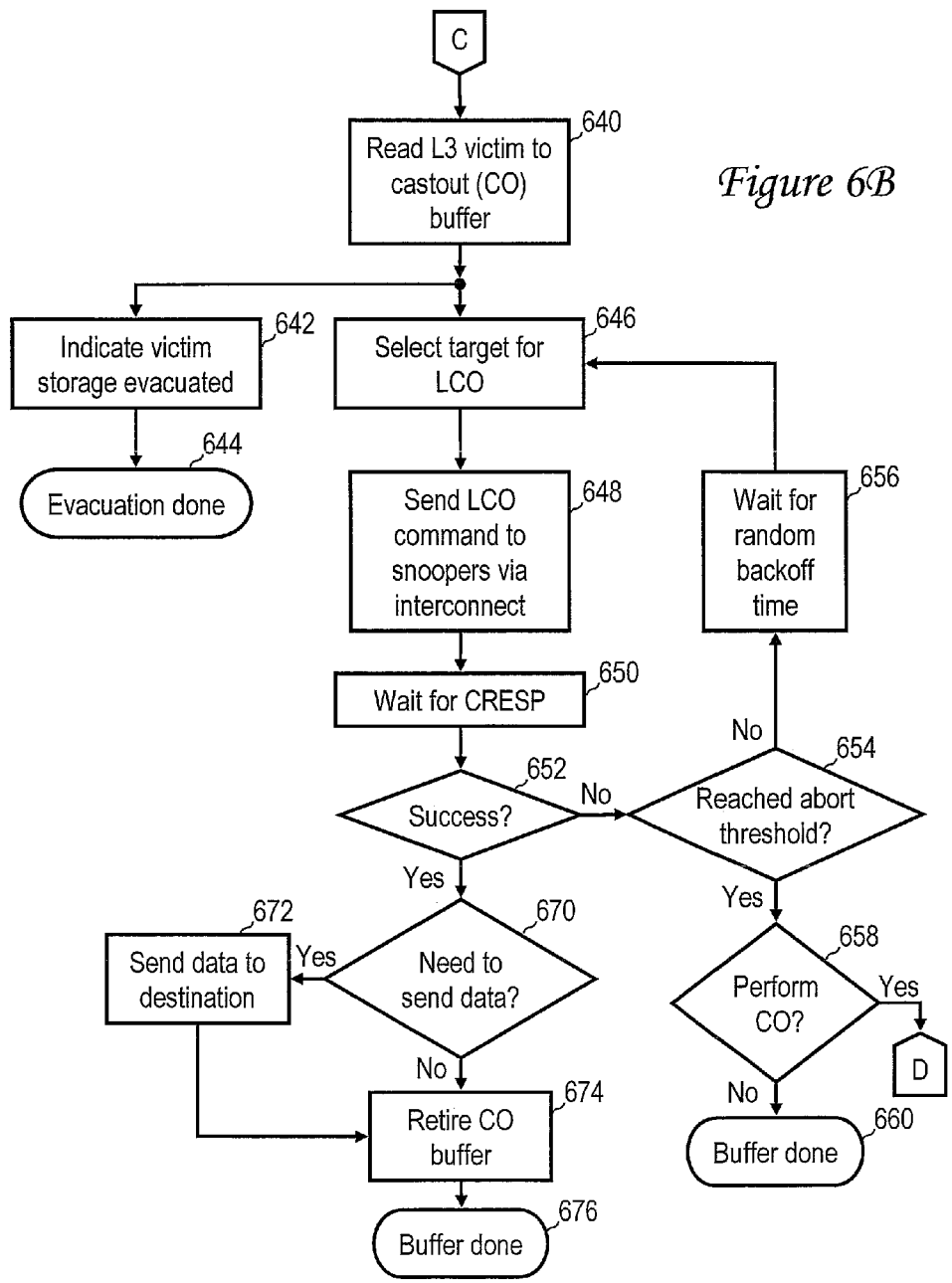

Referring now to block 640 of FIG. 6B, in response to a determination that an LCO of the victim cache line is to be performed, then L3 cache 232 reads the victim cache line from cache array 281 into the allocated castout (CO) buffer 295. L3 cache 232 then indicates that the storage location of the victim cache line in cache array 281 of L3 cache 232 has been evacuated (blocks 642, 644). In addition, L3 cache 232, which can be referred to as the source L3 cache 232, selects a target or destination L3 cache 232 of the LCO that will receive the castout unless a more favorable snooping L3 cache 232 accepts the castout (block 646). For example, in one embodiment, the source L3 cache 232 selects the target L3 cache 232 according to the method depicted in FIG. 7B, which is described below. As shown at block 648, the source L3 cache 232 broadcasts an LCO command 270 (e.g., of a global scope including all processing nodes 102 of data processing system 100) on the interconnect fabric via interconnect logic 212 (block 616), where the LCO command indicates, for example, an address and coherence state of the victim cache line and the identity of the selected target L3 cache 232. The source L3 cache 232 then awaits a combined response (from the process shown in FIG. 13) providing a system-wide coherency response to the LCO command (block 650). The activity of the snoopers (e.g., IMCs 206 and snoopers 286 of L2 caches 230 and L3 caches 232) in response to receipt of the CO command and the generation of the combined response are described below with reference to FIGS. 10A-10D and FIG. 11, respectively.

In response to receipt of the combined response of the LCO command, the source L3 cache 232 determines whether or not the combined response indicates success of the LCO command at block 652. If not, the source L3 victim cache 232 determines if the number of times the LCO has been retried has reached an abort threshold (e.g., a predetermined integer having a value of zero or greater) (block 654). If not, the source L3 cache 232 waits for a "backoff" time, which can be selected randomly within a predetermined range in order to reduce deadlocks (block 656) and retries the LCO command, as indicated by the process returning to block 646 and following blocks, which have been described. Referring again to block 654, if the abort threshold has been reached, the source L3 cache 232 determines whether to perform a CO, for example, by determining if the coherence state of the victim cache line is M, Mu, T, Tn or Ig (block 658). If not, the CO buffer 295 allocated to the victim cache line is retired, and the process ends at block 660. If, however, the source L3 cache 232 determines that a CO is to be performed (e.g., the coherence state of the victim cache line is M, Mu, T, Tn or Ig), the process passes through page connector D to block 616 of FIG. 6A and following blocks, which have been described.

Referring again to block 652, if the combined response indicates that the LCO command was successful, the source L3 cache 232 determines at block 670 whether the combined response indicates that the source L3 cache 232 should transmit the victim cache line data to the target L3 cache 232. For example, if the combined response indicates snooping L3 cache 232 in the LCO broadcast domain holds a valid copy of the victim cache line, then no transmission of the data of the victim cache line is to be performed. If, on the other hand, the combined response indicates that no snooping L3 cache 232 in the LCO broadcast domain holds a valid copy of the victim cache line, the source L3 cache 232 will determine that the victim cache line data are to be transmitted to the target L3 cache 232. If a determination is made that the victim cache line data are to be transmitted, the source L3 victim cache 232 transmits the victim cache line data 264 from the CO buffer 295 to the target L3 cache 232 at block 672. Thereafter, L3 victim cache 232 retires the CO buffer 295 allocated to the L3 eviction (block 674), giving the CO buffer a "done" status (block 676). If, however, the source L3 cache 232 determines at block 670 that no transmission of the victim cache line data is to be performed, then the process simply passes from block 670 to blocks 674 and 676, which have been described.

Figure 7A:
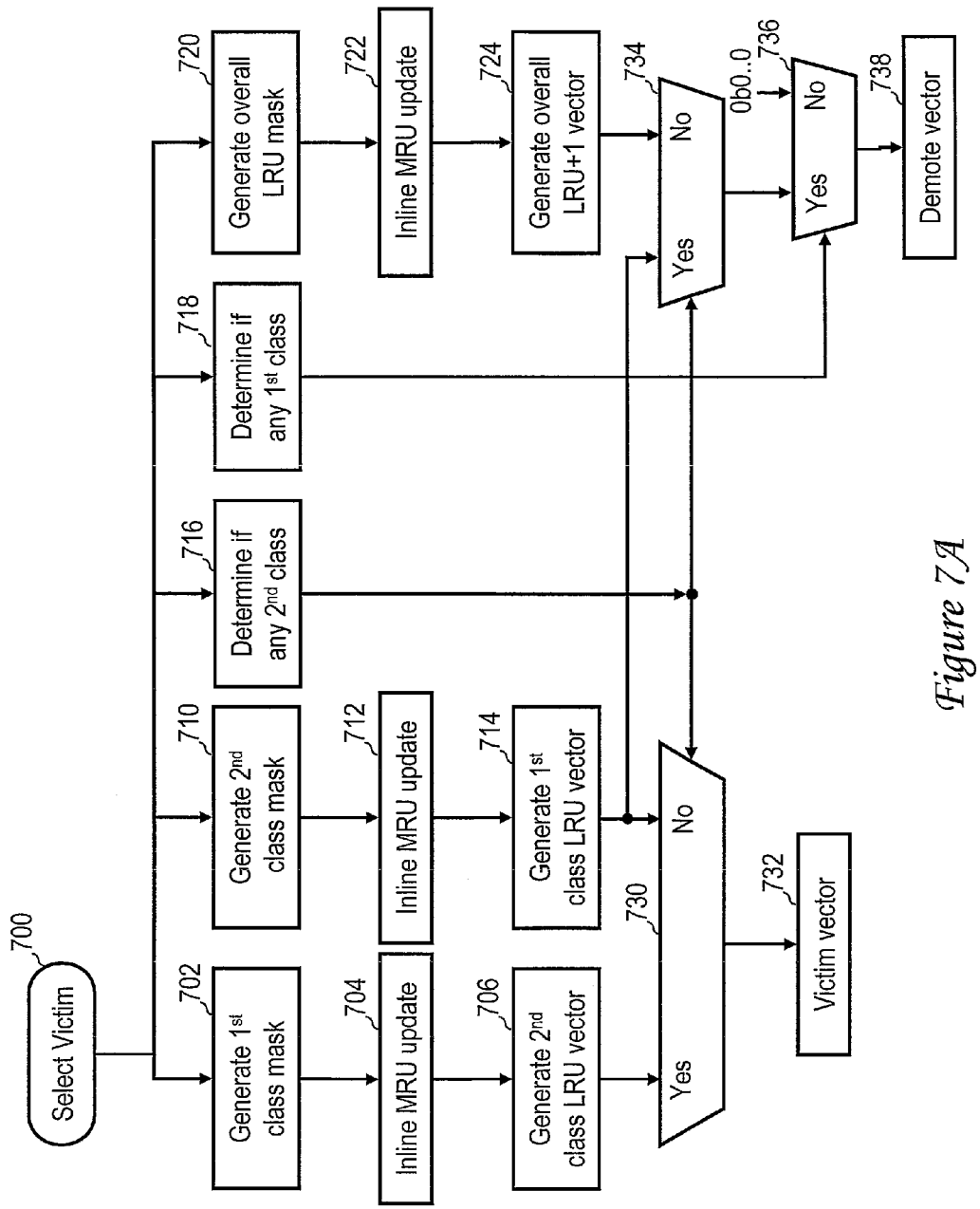
FIG. 7A is a high level logical flow diagram of an exemplary process for selecting a victim cache line for eviction from an L3 cache.

With reference now to FIG. 7A, there is illustrated a data flow diagram of an exemplary technique for selecting an entry from a single ordered group containing multiple entries (e.g., N, where N is an integer) each belonging to a respective one of multiple different classes, where each class can contain M entries (wherein M is an integer between 0 and N inclusive). The illustrated process, which assumes a congruence class containing two classes of entries, can be utilized, for example, by an L3 cache 232 to select a victim cache line for eviction from among a plurality of cache lines in a congruence class having entries that can each belong to one of multiple classes, as depicted at block 602 of FIG. 6A. To accelerate the illustrated process, L3 cache 232 preferably implement the illustrated data flow in hardware.

In general, the exemplary data flow depicted in FIG. 7A selects a second class entry for eviction from a congruence class based upon the access chronology, if a second class entry is present. If no second class entry is present within the congruence class, the exemplary data flow depicted in FIG. 7A selects a first class entry for eviction from the congruence class. Because second class entries are subject to attrition through eviction, the exemplary data flow also selects a first class entry for demotion to second class upon each eviction. Thus, the illustrated data flow generates a victim vector 760 that provides a decoded identification of the victim cache line to be evicted from the congruence class, as well as a demote vector 738 that provides a decoded identification of the cache line in the congruence class that is to be demoted from first class to second class.

The illustrated data flow begins at block 700 and then proceeds in parallel to each of five parallel processes depicted at blocks 702-706, 710-714, 716, 718 and 720-724. Referring first to blocks 702-706, the depicted process selects a victim cache line from among the second class entries, if any, of the congruence class from which a victim is to be selected. To do so, L3 cache 232 generates a first class mask from class subfield 299 to isolate the first class entries of the congruence class (block 702). These first class entries are then subject to an inline update to reflect them all as MRU, meaning that the first class entries are all removed from consideration as LRU candidates (block 704). L3 cache 232 then generates a second class LRU vector that provides a decoded identification of the least recently used second class entry in the congruence class (block 706).

Referring now to blocks 710-714, in parallel with the process depicted at blocks 702-706, the depicted process selects a potential victim cache line from among the first class entries in case the congruence class contains no second class entries from which a victim cache line can be selected. To do so, L3 cache 232 generates a second class mask from class subfield 299 to isolate the second class entry or entries, if any, of the congruence class (block 710). The second class entry or entries, if any, are then subject to an inline update to reflect them all as MRU, meaning that any second class entry or entries are all removed from consideration as LRU candidates (block 712). L3 cache 232 then generates a first class LRU vector that provides a decoded identification of the least recently used first class entry in the congruence class (block 714).

With reference now to blocks 720-724, in parallel with the process depicted at blocks 702-706 and blocks 710-714, the depicted process selects an entry from among the first class entries in the congruence class to demote to second class. To do so, L3 cache 232 generates an overall LRU mask from the chronology vector 297 of the congruence class to identify which of the entries of the congruence class is the LRU entry (block 720). At block 722, L3 cache 232 performs an inline MRU update to the LRU entry to temporarily remove it from consideration. L3 cache 232 then generates an overall LRU+1 vector that provides a decoded identification of the second least recently used entry in the congruence class (block 724).

In parallel with each of the process depicted at blocks 702-706, blocks 710-714 and blocks 720-724, the processes depicted at blocks 716 and 718 respectively determine by reference to class subfields 299 of the congruence class of interest whether or not the congruence class contains any second class entries and whether the congruence class of interest contains any first class entries. As functionally represented by the selector illustrated at reference numeral 730, L3 cache 232 utilizes the outcome of the determination depicted at block 716 to select as victim vector 732 the second class LRU vector, if the congruence class contains at least one second class entry, and otherwise to select the first class LRU vector. As functionally indicated by the selector depicted at reference numeral 734, L3 cache 232 also utilizes the outcome of the determination to select either the first class LRU entry or first class LRU+1 entry, if either exists, for demotion to second class. In particular, if a determination is made at block 716 that at least one second class entry was present in the congruence class, the first class LRU entry, if any, is identified by selector 734 for demotion to second class; otherwise, the first class LRU+1 entry, if any, is identified by selector 734 for demotion to second class.

The output of selector 734 is further qualified by selector 736 utilizing the outcome of the determination depicted at block 718. Thus, if at least one first class entry is present in the congruence class, the vector output of selector 734 is selected by selector 736 as demote vector 738. In the infrequent case that the congruence class contains no first class entries to demote, selector 736 selects a null vector (e.g., all zeros) as demote vector 738.

Thus, the data flow depicted in FIG. 7A rapidly identifies from among a group of entries a first entry containing a victim cache line and an entry subject to class demotion without serializing the identification of these entries with a determination of whether any second class entries are present in the group.

Figure 7B:
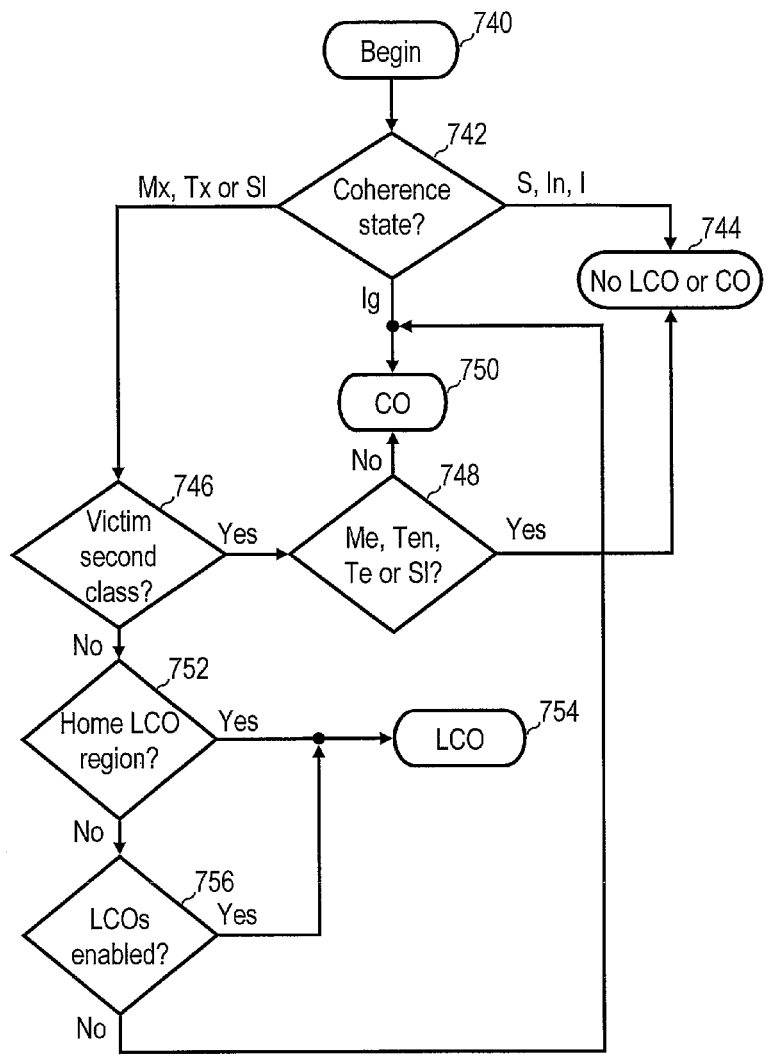
FIG. 7B is a high level logical flow diagram of an exemplary process for determining whether to perform a lateral castout (LCO) or a castout (CO) in accordance with one embodiment.
Figure 7C:
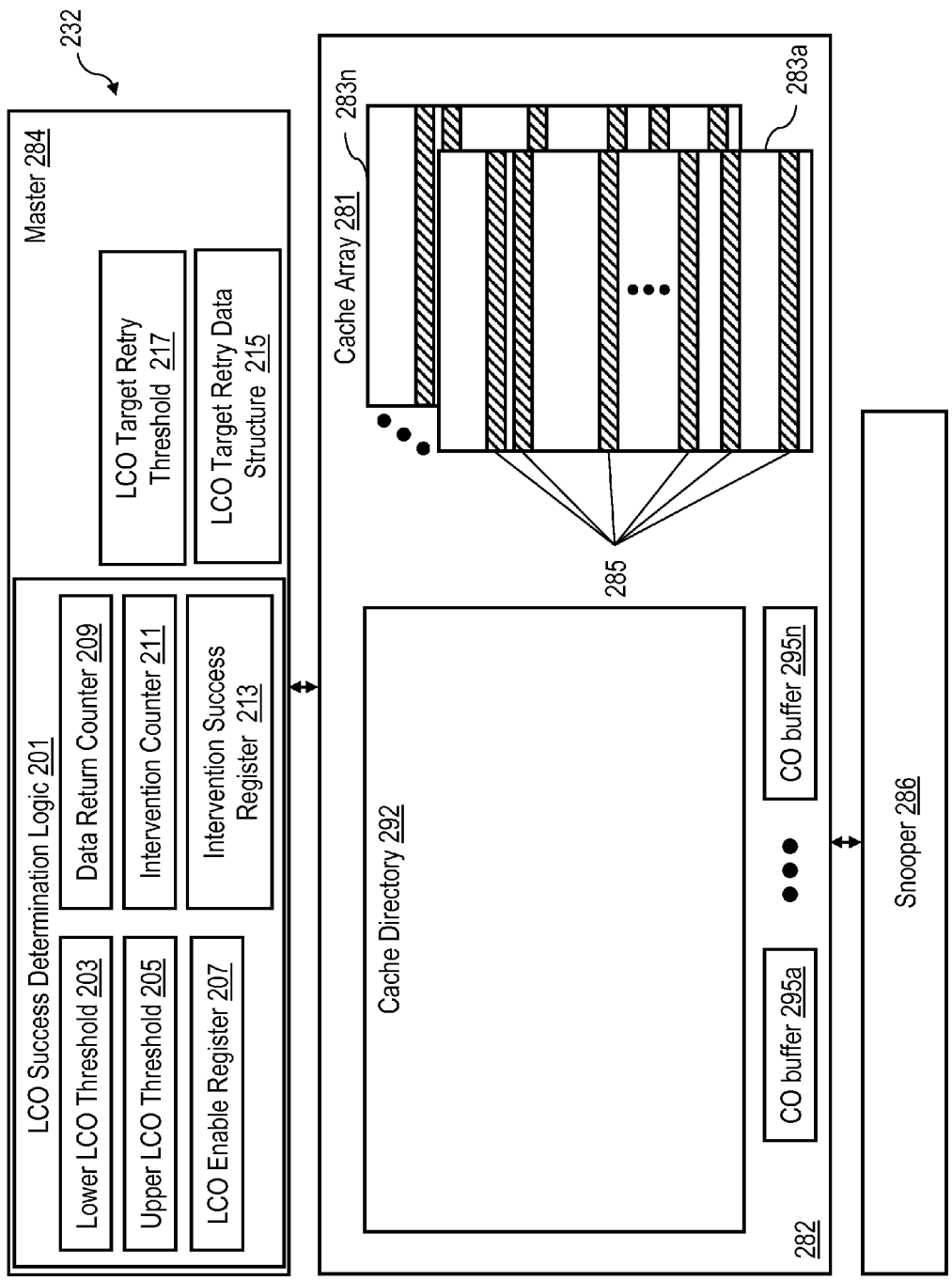
FIG. 7C is a more detailed block diagram of an L3 cache, which illustrates LCO success determination logic.

Referring now to FIG. 7B, there is depicted an exemplary process by which L3 cache 232 determines whether to perform an LCO or CO of the victim cache line in one embodiment. The exemplary process begins at block 740 and then proceeds to block 742, which illustrates L3 cache 232 reading the coherence state and replacement field 298 of the selected victim cache line from L3 cache directory 292. As indicated, if the coherence state is any of the S, In or I coherence states, then L3 cache 232 determines that no LCO or CO will be performed for the victim cache line (block 744). Consequently, the victim L3 cache line can simply be overwritten.

If, however, the coherence state of the victim cache line is Mx or Tx, then the castout determination made by L3 cache 232 is further dependent upon the class of the selected victim entry (block 746). If the victim entry is first class, the process proceeds to block 752, which is described below. On the other hand, if the selected victim entry is second class, L3 cache 232 decides not to perform an LCO or CO if the victim entry is "clean," that is, if the second class victim entry is in one of the Me, Te, Ten and Sl coherence states (blocks 748 and 744). However, if the victim cache line is a second class entry is "dirty" (i.e., modified with respect to system memory 108 as indicated by one of the Mu, M, T, Tn coherence states), then L3 cache 232 decides to perform a CO to system memory 108 rather than an LCO (blocks 748 and 750).

Referring now to block 752, L3 cache 232 next determines whether the victim cache line falls within a home LCO address region of that L3 cache 232. The "home LCO address region" is defined herein as a collection of real memory addresses for which the effectiveness of LCOs sourced by an L3 cache 232 is empirically measured during data processing system operation. In one preferred embodiment illustrated in FIG. 7C, the home LCO address region 285 is individually established for each L3 cache 232 as a collection of distributed addresses corresponding to selected congruence classes in cache array 281 (e.g., 1/8 or 1/16 of the total number of congruence classes) for which LCOs are always performed, assuming that the victim cache line is a first class entry in one of the Mx, Tx or Sl coherence states. It is generally preferred if the selected congruence classes within home LCO address region 285 are randomly rather than regularly distributed to obtain a representative sampling of the effectiveness of LCOs for the L3 cache 232. It is similarly further preferred if different home LCO address regions 285 are defined for the various L3 caches 232.

Home LCO address region 285 can conveniently be defined, for example, by hashing the congruence class address bits of a real memory address utilizing either a predetermined or programmable hash algorithm to obtain a hash of the minimum length to differentiate the home LCO address region 285 from other regions of the cache array 281. In such implementations, the determination of whether the victim cache line is within the home LCO address region 285 can be made by examining a single bit of the hash.

In response to a determination at block 752 of FIG. 7B that the victim cache line falls within the home LCO address region 285 defined for this L3 cache 232, L3 cache 232 decides to perform an LCO of the victim cache line (block 754). As noted above, LCOs are performed for the home LCO address region to obtain a sampling of LCO behavior upon which to judge whether it is productive to perform LCOs for victim cache lines outside the home LCO address region. If, however, a determination is made at block 752 that the victim cache line falls outside home LCO address region 285, L3 cache 232 determines at block 756 whether LCOs are currently enabled for this L3 cache 232. If so, L3 cache 232 decides to perform an LCO for the victim cache line (block 754). If not, L3 cache 232 decides to perform a CO (block 750).

In one embodiment, the determination at block 756 of FIG. 7B of whether LCOs are enabled for victim cache lines falling outside of the home LCO address region 285 is made by determining whether an LCO enable register 207 of the L3 cache 232 (illustrated in FIG. 7C) is set to indicate an LCO should be performed or reset to indicate an LCO should not be performed. In one embodiment, LCO register 207 is dynamically set and reset by software and/or firmware, for example, based upon compiler hints or performance monitoring information. In a further embodiment, the LCO enable register 207 is alternatively or additionally dynamically set and reset by hardware, such as LCO success determination logic 201 within L3 cache 232. An exemplary process by which LCO success determination logic 201 sets and resets LCO enable register 207 is illustrated in FIG. 7D, which is described below with additional reference to FIG. 7C.

Figure 7D:
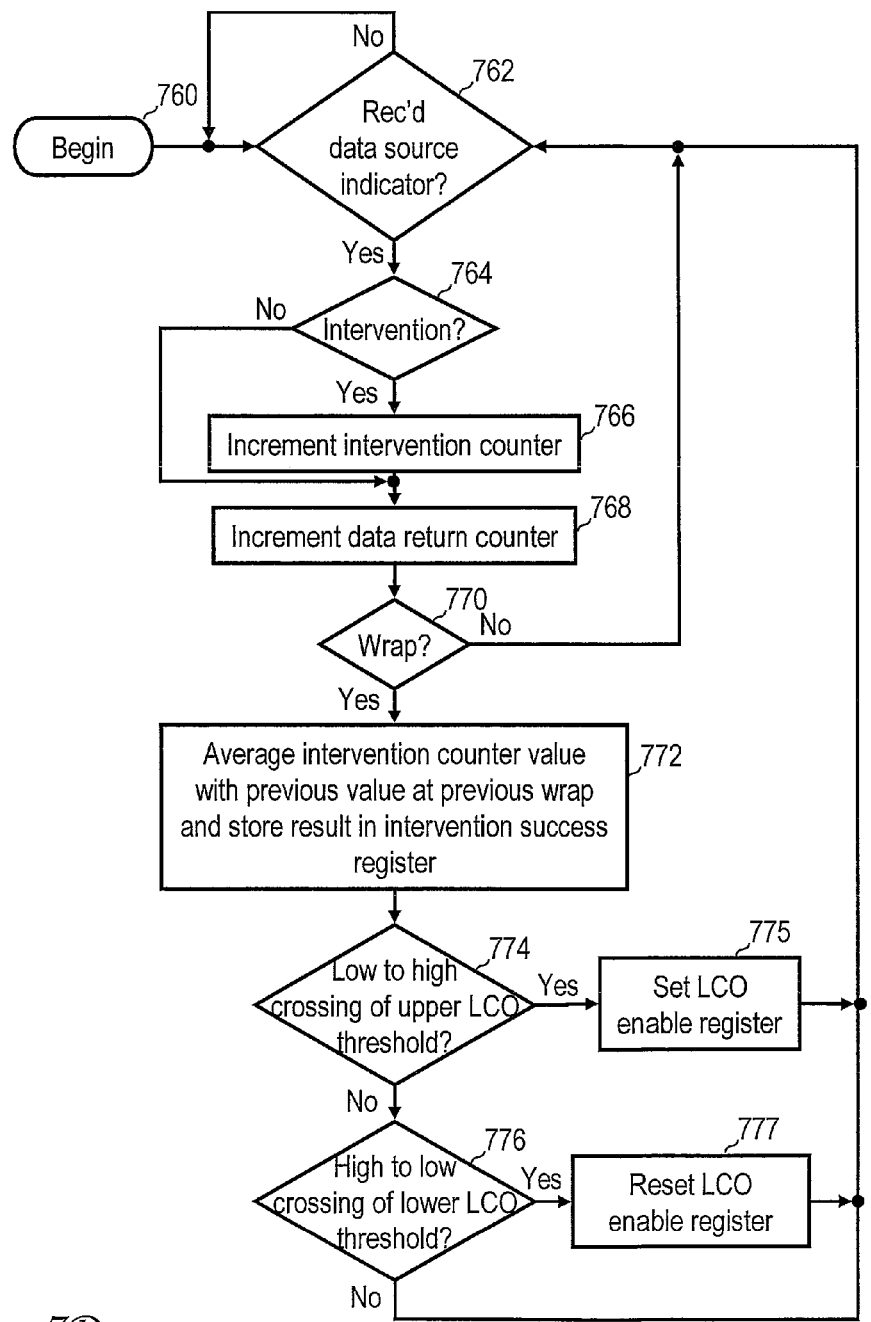
FIG. 7D is a high level logical flow diagram of an exemplary process for determining whether to enable lateral castouts (LCOs) for an L3 cache in accordance with one embodiment.

The exemplary process shown in FIG. 7D begins at block 760 and then proceeds to block 762, which illustrates LCO success determination logic 201 awaiting receipt of a data source indicator from the associated L2 cache 232. In one exemplary embodiment, LCO success determination logic 201 receives from the associated L2 cache 230 a data source indicator indicating whether home LCO region data received by the L2 cache 230 following misses in both L2 cache 230 and L3 cache 232 (e.g., at block 320 of FIG. 3A, block 347 of FIG. 3C, block 370 of FIG. 3D, block 389 of FIG. 3E, or at block 424 of FIG. 4) is provided by intervention from another cache or is retrieved from system memory 108.

In response to receipt of a data source indicator from the associated L2 cache 230, LCO success determination logic 201 increments an intervention counter 211 only if the data source indicator indicates that the home LCO region data was received by intervention (blocks 764 and 766). LCO success determination logic 201 further increments a data return counter 211 in response to each data source indicator to maintain an overall count of home LCO region data received by the L2 cache 230 following misses in both L2 cache 230 and L3 cache 232 (block 768).

At block 770, LCO success determination logic 201 determines whether incrementation of data return counter 211, which may be, for example, an 8-bit counter, to wrap. If not, the process returns to block 762, which has been described. If, however, incrementation of data return counter 211 causes data return counter 211 to wrap, LCO success determination logic 201 averages the current value of intervention counter 211 with the previous value of intervention counter 211 at the last time that data return counter 211 wrapped and stores the resultant average value is stored in intervention success register 213 (block 772).

LCO success determination logic 201 then compares the value of intervention success register 213 with one or more threshold values specified by a lower LCO threshold register 203 and of an upper LCO threshold register 205 (blocks 774 and 776). If the value of intervention success register 213 makes a low-to-high crossing of the upper LCO threshold specified by upper LCO threshold register 205, then LCO success determination logic 201 determines that LCOs should be performed by this L3 cache 232 for cache lines outside home LCO address region 285. Accordingly, LCO success determination logic 201 sets LCO enable register 207 (block 775). If, on the other hand, the value of intervention success register 213 makes a high-to-low crossing of the lower LCO threshold specified by lower LCO threshold register 203, then LCO success determination logic 201 determines that LCOs should not be performed by this L3 cache 232 for cache lines outside home LCO address region 285. Accordingly, LCO success determination logic 201 resets LCO enable register 207 (block 777). Following either of blocks 775 or 777, the process returns to block 762, which has been described.

Figure 7E:
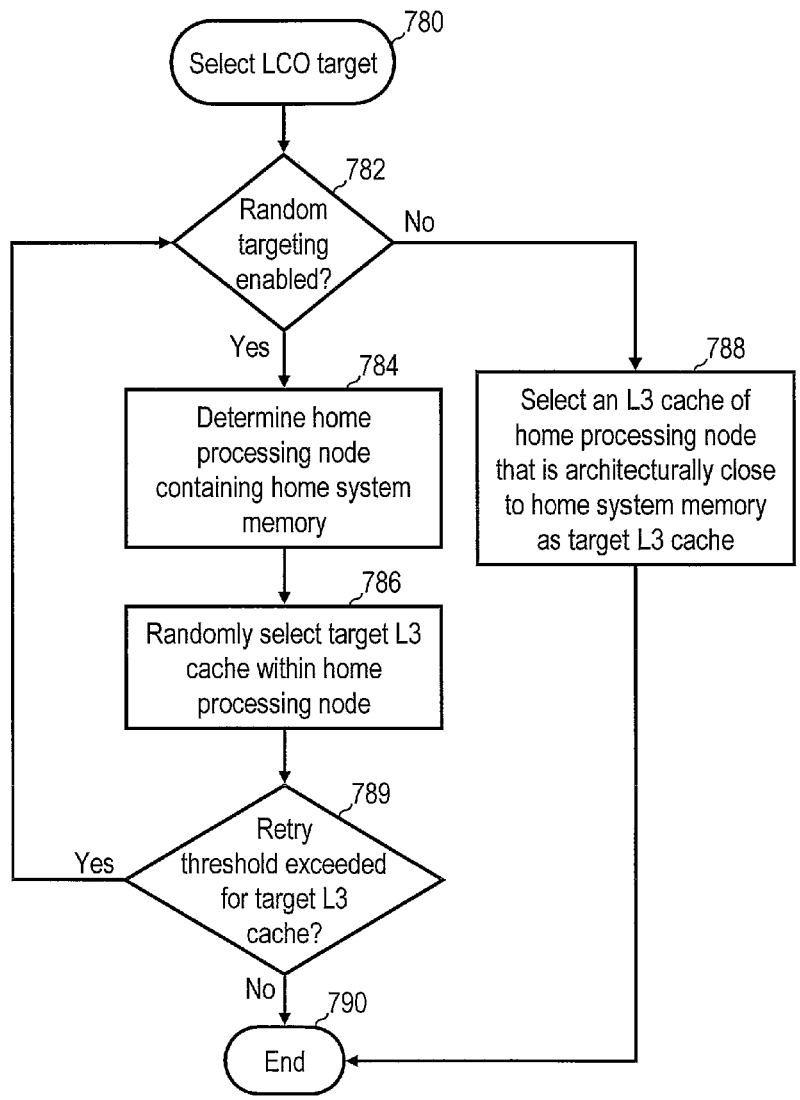
FIG. 7E is a high level logical flowchart of an exemplary process of selecting a target L3 cache of a lateral castout (LCO) in accordance with one embodiment.

With reference now to FIG. 7E, there is depicted a high level logical flowchart of an exemplary process of selecting a target of a lateral castout (LCO) in accordance with one embodiment. The illustrated process is performed, for example, at block 646 at FIG. 6B. In the depicted embodiment, it is assumed that data processing system 100 is processing a workload that exhibits a high degree of data sharing, meaning that there is an equal probability of any processing unit requesting any given cache line of data and any processing unit providing the requested cache line of data. Under such operating conditions, it is preferred if a cache line that is the subject of a lateral castout (LCO) is cast-in to an L3 cache 232 that is architecturally close to the home system memory 108 so that if the cache line is subsequently castout to the home system memory 108 a relatively small amount of system resources (e.g., interconnect bandwidth, SNMs 236 and WIMs 238) would be utilized in that subsequent castout.

The process depicted in FIG. 7E begins at block 780 and then proceeds to block 782, which illustrates the source L3 cache 232 implicitly or explicitly determining, for example, by reference to a hardware setting or a software programmable setting, whether or not random selection of a target L3 cache 232 is enabled. If so, source L3 cache 232 determines, for example, by reference to its BAR facility 235, the home processing node 102 containing the home system memory 108 of the real address of the victim cache line (block 784). The source L3 cache 232 then randomly selects a target L3 cache 232 for the LCO from among the pool of L3 caches 232 (other than the source L3 cache 232) within the home processing node 232 (block 786). The target L3 cache selection process of FIG. 7E thereafter terminates at block 790.

Returning to block 782, if random targeting is not enabled, the process proceeds from block 782 to block 788. Block 788 illustrates the source L3 cache 232 selecting as the target L3 cache 232 an L3 cache 232 within the home processing node 102 that is architecturally "close" to the home system memory 108 in terms of the number of resources utilized in communication between the selected target L3 cache 232 and the home system memory 108. For example, in the exemplary embodiment depicted in FIGS. 1 and 2A-2C, the source L3 cache 232 determines by reference to BAR facility 235 which processing unit 104 contains the IMC 206 that controls the home system memory 108 and selects the L3 cache 232 of that processing unit 104 as the target L3 cache 232 of the LCO.

The source L3 cache 232 then checks an LCO target retry data structure 215 (FIG. 7C) to determine whether or not the number of retries by the selected target L3 cache 232 of LCOs of the source L3 cache 232 exceeds an LCO target retry threshold (block 789). In one embodiment, the number of retries for a particular target L3 cache 232 is incremented each time a retry coherence response is received from that target L3 cache 232 and is reset each time an LCO is received by that target L3 cache 232. The LCO target retry threshold can be static and fixed (e.g., 2) or specified by LCO target retry threshold register 217. If a determination is made at block 789 that the LCO target retry threshold for the selected target L3 cache 232, the process returns to block 782, indicating that the target L3 cache selection process will be repeated to find a target L3 cache 232 for which the LCO target retry threshold has not been exceeded. If, however, the source L3 cache 232 determines at block 789 that the number of retries by the selected target L3 cache 232 of LCOs of the source L3 cache 232 does not exceed an LCO target retry threshold specified by LCO target retry threshold register 217, the selected target L3 cache 232 is retained, and the target L3 cache selection process of FIG. 7B thereafter terminates at block 790.

Figure 8:
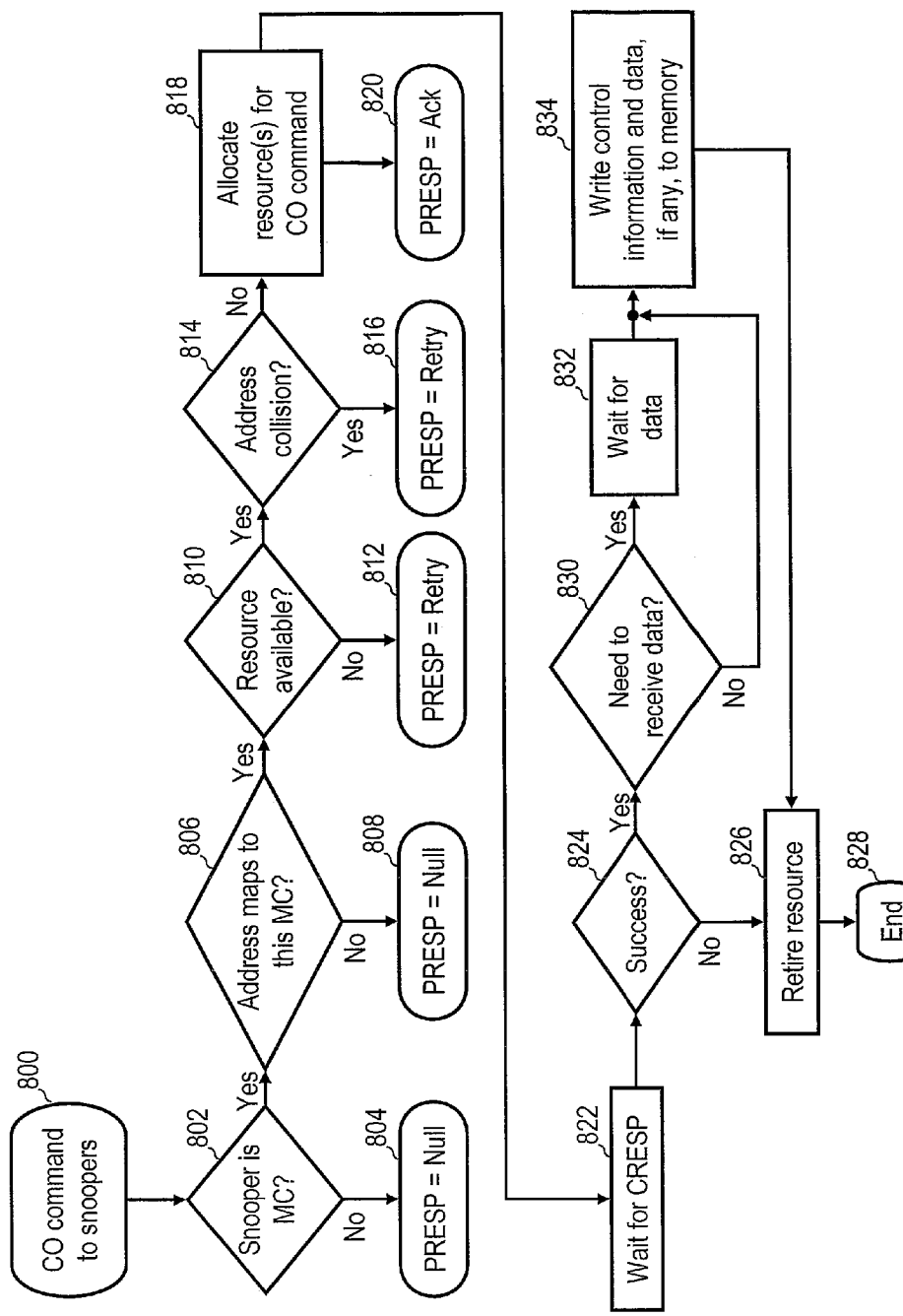
FIG. 8 is a high level logical flowchart of an exemplary process by which a snooper handles a castout (CO) command in accordance with one embodiment.

Referring now to FIG. 8, there is depicted a high level logical flowchart of an exemplary process by which each snooper (e.g., IMC 206 or snooper 286 of an L2 cache 230 or L3 cache 232) receiving a castout (CO) command handles the CO command in accordance with one embodiment. The process begins at block 800 of FIG. 8 and then proceeds to block 802, which illustrates that if the snooper receiving the CO command is not a memory controller, such as an IMC 206, then the snooper provides a Null partial response to the CO command (block 804). The Null partial response indicates that the snooper has no interest in the command or its outcome. If the snooper of the CO command is a memory controller, then the process passes from block 802 to block 806. Block 806 illustrates the memory controller determining whether or not it is assigned the real address specified by the CO command. If not, the memory controller issues a Null partial response (block 808).

If, however, the snooping memory controller determines at block 806 that it is assigned the real address specified by the CO command, then the memory controller determines at block 810 whether or not it has sufficient resources (e.g., a queue entry and an available access cycle) available to currently handle the CO command. If not, the memory controller provides a Retry partial response requesting that the CO command be retried (block 812). If, on the other hand, the snooping memory controller determines that it has sufficient resources currently available to handle the CO command, then the snooping memory controller determines at block 814 whether or not the real address specified by the CO command collides with the address of a pending, previously received command. If so, then the snooping memory controller provides a Retry partial response requesting that the CO command be retried (block 816).

If the snooping memory controller does not detect an address collision at block 814, then the snooping memory controller allocates resource(s) for handling the CO command (block 818) and provides an Ack partial response (block 820), which acknowledges receipt of the CO command by an interested snooper. Thereafter, the snooping memory controller awaits receipt of the combined response (CRESP) generated by the process of FIG. 9 for the CO command (block 822). In response to receipt of the combined response of the CO command, the snooping memory controller determines whether or not the combined response indicates success of the CO command at block 824. If not, the snooping memory controller retires the resource(s) allocated to the CO command (block 826), and the process ends at block 828.

Referring again to block 824, if the combined response indicates that the CO command was successful, the snooping memory controller determines at block 830 whether the combined response indicates that the castout entails transmission of the victim cache line to the snooper. If not, the process proceeds to block 834, which is described below. If, however, the combined response indicates that the castout entails transmission of the victim cache line to the snooper, the snooping memory controller awaits receipt of the victim cache line data at block 832. Thereafter, at block 834, the snooping memory controller updates system memory 108 with control information (e.g., the scope information represented by certain of the coherence states) and the victim cache line data, if any. Thereafter, the process passes to block 826 and 828, which have been described.

Figure 9:
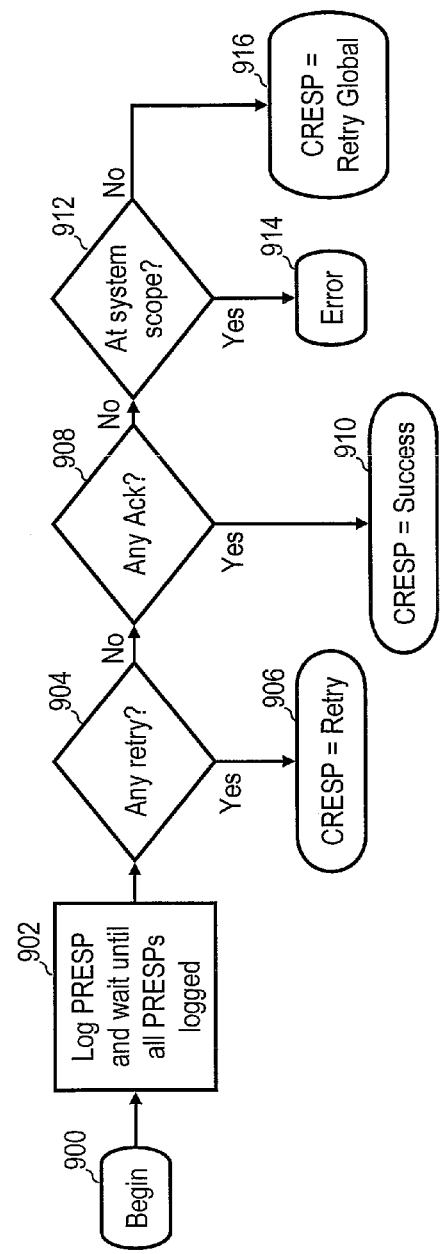
FIG. 9 is a high level logical flowchart of the processing of the coherence responses of a castout (CO) command in accordance with one embodiment.

With reference now to FIG. 9 is a high level logical flowchart of an exemplary process by which the partial responses of a castout (CO) command are utilized to generate a combined response in accordance with one embodiment. The illustrated process may be performed, for example, by a predetermined instance of coherence management logic 210, such as the instance of coherence management logic 210 located in the processing unit 104 of the L3 cache 232 initiating the castout.

The illustrated process begins at block 831 in response to receipt by coherence management logic 210 of a partial response of a snooper to a CO command of an L3 cache 232 and then proceeds to block 833. Block 833 depicts coherence management logic 210 logging the partial response of the CO command and waiting until all such partial responses have been received and logged. Coherence management logic 210 next determines at block 835 whether any of the partial responses were Retry partial responses. If so, coherence management logic 210 generates and provides to all participants a Retry combined response (block 836). If none of the partial responses were Retry partial responses, then coherence management logic 210 provides a Success combined response if the partial responses include an Ack partial response (blocks 838 and 840).

If no Retry or Ack partial response was received for the CO command, coherence management logic 210 determines at block 912 whether the CO command was issued on the interconnect fabric with a global scope including all processing nodes 102. If so, the process ends with an error condition at block 914 in that no memory controller responded to the CO command as responsible for the real address specified by the CO command. If, however, coherence management logic 210 determines at block 912 that the CO command was issued with a more restricted scope than a global scope including all processing nodes 102, then coherence management logic 210 generates and provides to all participants a Retry Global combined response indicating that the L3 cache 232 that issued the CO command should retry the CO command with a global scope including all processing nodes 102 of data processing system 100 (block 916).

Figures 10A, 10B:
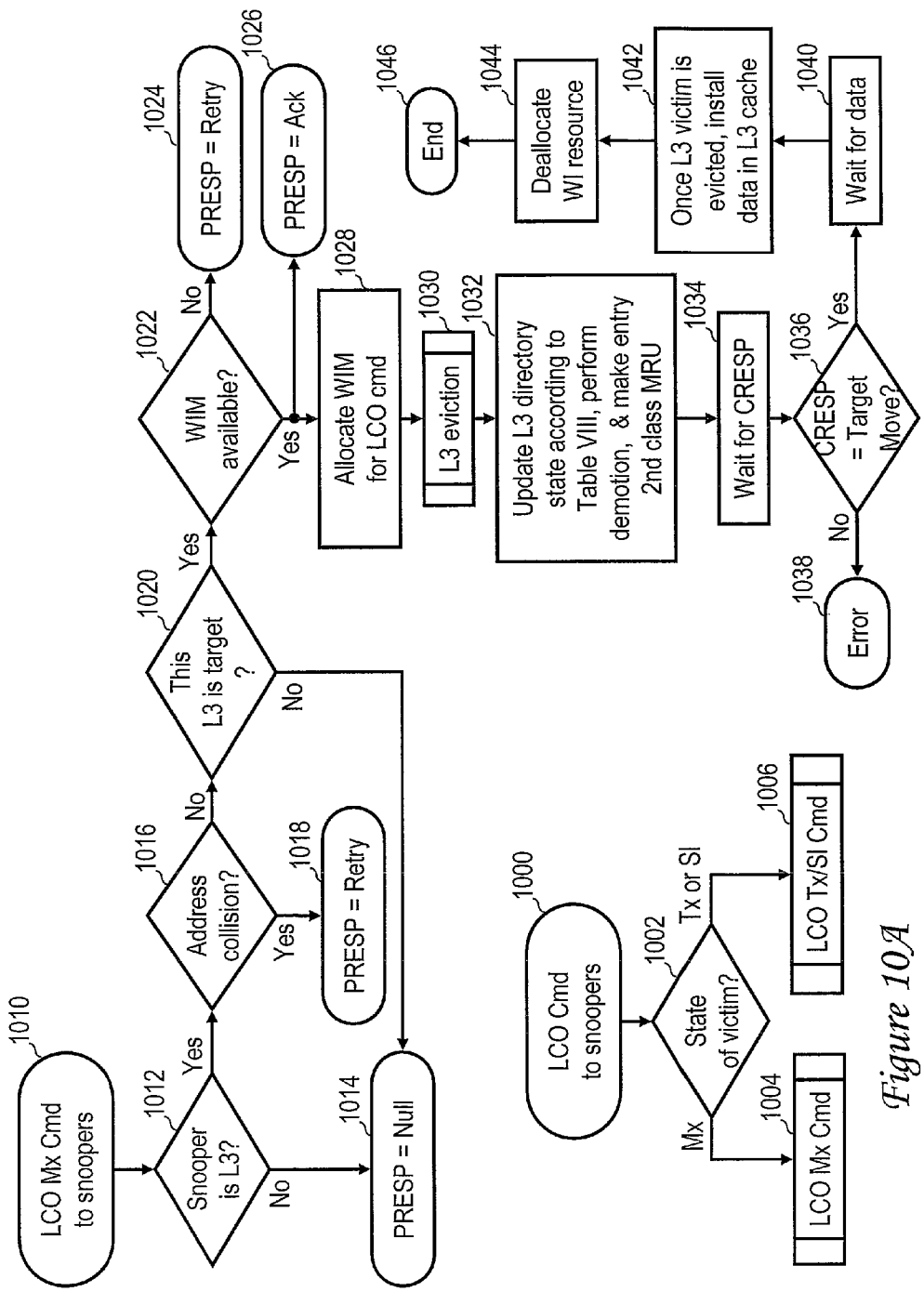
FIG. 10A is a high level logical flowchart of an exemplary process by which a snooper handles a lateral castout (LCO) command in accordance with one embodiment.
FIG. 10B is a high level logical flowchart of an exemplary process by which a snooper handles a lateral castout (LCO) of a modified cache line in accordance with one embodiment.

Referring now to FIG. 10A, there is depicted a high level logical flowchart of an exemplary process by which a snooper (e.g., IMC 206 or snooper 286 of an L2 cache 230 or L3 cache 232) receiving a lateral castout (LCO) command handles the LCO command in accordance with one embodiment. The process begins at block 1000 and then proceeds to block 1002, which depicts the snooper determining what state the LCO command indicates for the victim cache line. If the LCO command indicates an Mx victim cache line (where x represents any of the variation of the base coherence state), the process proceeds to block 1004, which represents the handling of an LCO Mx command as described further below with reference to FIG. 10B. If, on the other hand, the LCO command indicates a Tx or Sl coherence state for the victim cache line, the process proceeds to block 1006, which depicts the handling of the LCO Tx/Sl command as described further below with reference to FIGS. 10C-10D.

Figure 11:
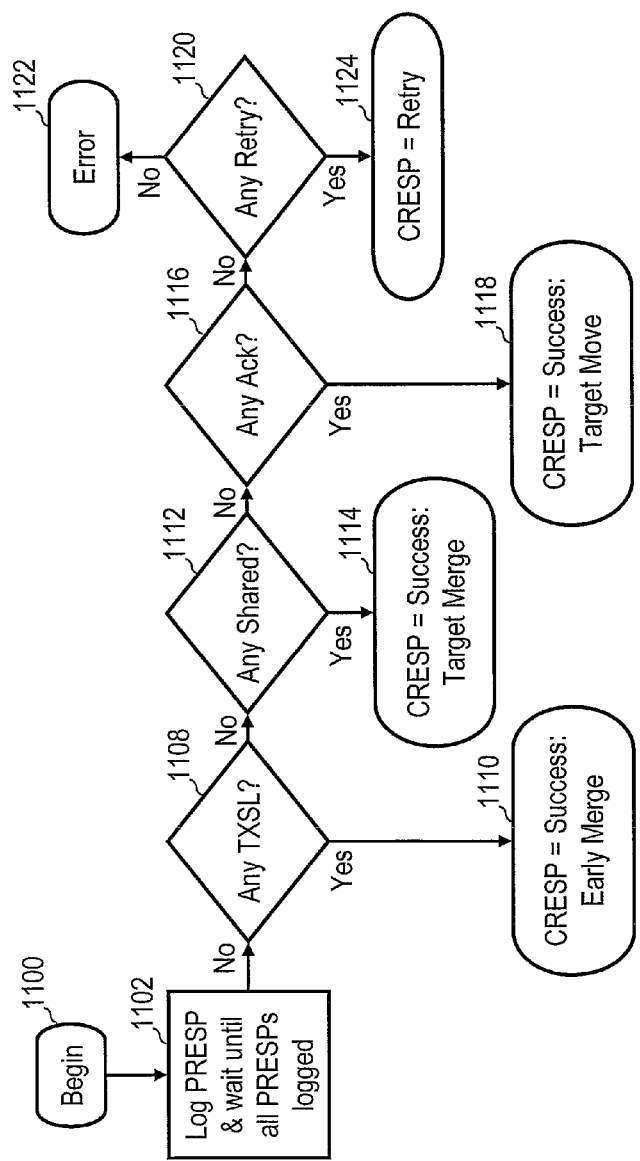
FIG. 11 is a high level logical flowchart of the processing of the coherence responses of a lateral castout (LCO) command in accordance with one embodiment.

With reference now to FIG. 10B, there is illustrated a high level logical flowchart of an exemplary process by which a snooper (e.g., IMC 206 or snooper 286 of an L2 cache 230 or L3 cache 232) coupled to the interconnect fabric handles a lateral castout (LCO) of a modified (i.e., Mx) victim cache line in accordance with one embodiment. The illustrated process begins at block 1010, which represents receipt by a snooper of an LCO command on the interconnect fabric. As indicated at blocks 1012 and 1014, any snooper other than an L3 cache 232 (e.g., an L2 cache 230 or IMC 206) provides a Null partial response (PRESP) to the LCO command because LCO commands target only lateral caches (in this embodiment, other L3 caches 232). Assuming that the snooper is an L3 cache 232, the snooping L3 cache 232 determines at block 1016 if the address of the victim cache line specified by the LCO command collides with (i.e., matches) an address of a previously received command still being processed by the snooping L3 cache 232. If so, the snooping L3 cache 232 provides a Retry PRESP (block 1018), which will be handled by combining logic as shown in FIG. 11.

The snooping L3 cache 232 also determines at block 1020 if it is the target L3 cache 232 identified in the LCO command. If not, the snooping L3 cache 232 provides a Null PRESP to the LCO command (block 1014), regardless of whether it may associate the victim cache line address with an Ig or In coherence state. Assuming now that the snooping L3 cache 232 is the target L3 cache 232 of the Mx LCO command, the target L3 cache 232 determines at block 1022 whether or not a WIM 238 is available within the target L3 cache 232 to handle the Mx LCO command. If not, the target L3 cache 232 provides a Retry PRESP (block 1024).

If the target L3 cache 232 determines at block 1022 that a WIM 238 is available to handle the Mx LCO command, the target L3 cache 232 provides an Ack (Acknowledge) PRESP confirming its ability to service the Mx LCO command (block 1026) and allocates an available WIM 238 to handle the Mx LCO command (block 1028). The allocated WIM 238 initiates an L3 eviction as depicted in FIGS. 6A-6B in anticipation of receiving the data of the modified victim cache line (block 1030). In addition, the allocated WIM 238 updates the cache directory 292 for the victim cache line in accordance with Table VIII below, applies the demote vector 738 obtained by the process of FIG. 7A, and marks the victim cache line in replacement field 298 as second class and MRU (block 1032). As a result, the entry demoted to second class by demote vector 738 is effectively made MRU-1.

TABLE VIII

| | LCO Castout State | | |
|---|---|---|---|
| Initial L3 State | M | Mu | Me |
| Ig | M | Mu | Me |
| In | M | Mu | Me |
| I (miss) | M | Mu | Me |

The allocated WIM 238 in the target L3 cache 232 then awaits the CRESP for the Mx LCO command, as illustrated at block 1034, and examines the CRESP upon receipt as indicated at block 1036. If the CRESP does not indicate Success: Target Move, the process terminates with an error at block 1038. If, however, the CRESP indicates Success: Target Move, the process proceeds from block 1036 to block 1040, which illustrates the allocated WIM 238 awaiting receipt of the data of the victim cache line from the source L3 cache 232 via the interconnect fabric (block 1040). Following receipt of the data of the victim cache line, the allocated WIM 238 installs the victim cache line in its cache array 281 once the L3 eviction depicted at block 1030 is complete (block 1042). Thereafter, the allocated WIM 238 is deallocated, as shown at block 1044. The process then terminates at block 1046.

Figure 10C:
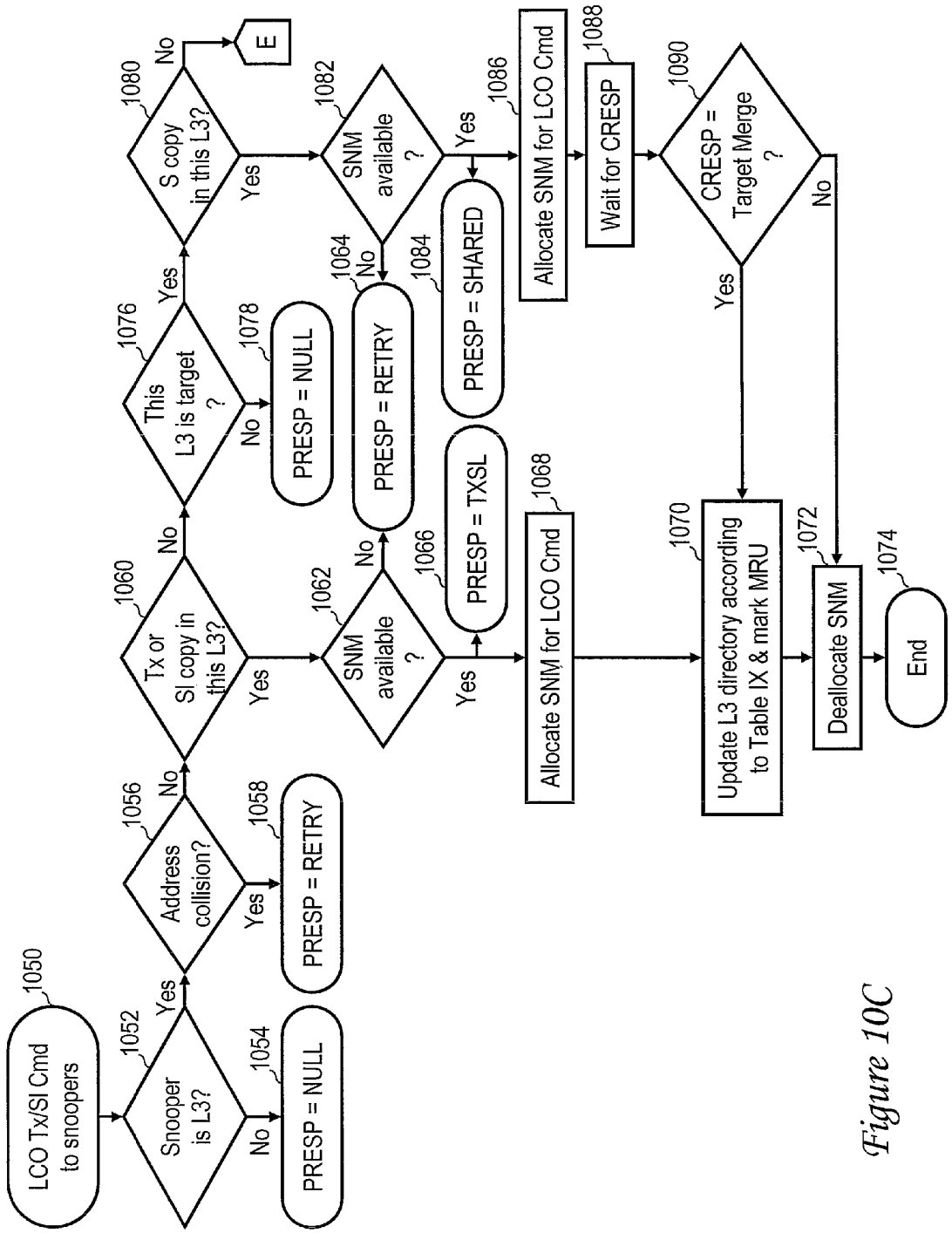
FIGS. 10C-10D together form a high level logical flowchart of an exemplary process by which a snooper handles a lateral castout (LCO) of a possibly shared cache line in accordance with one embodiment.
Figure 10D:
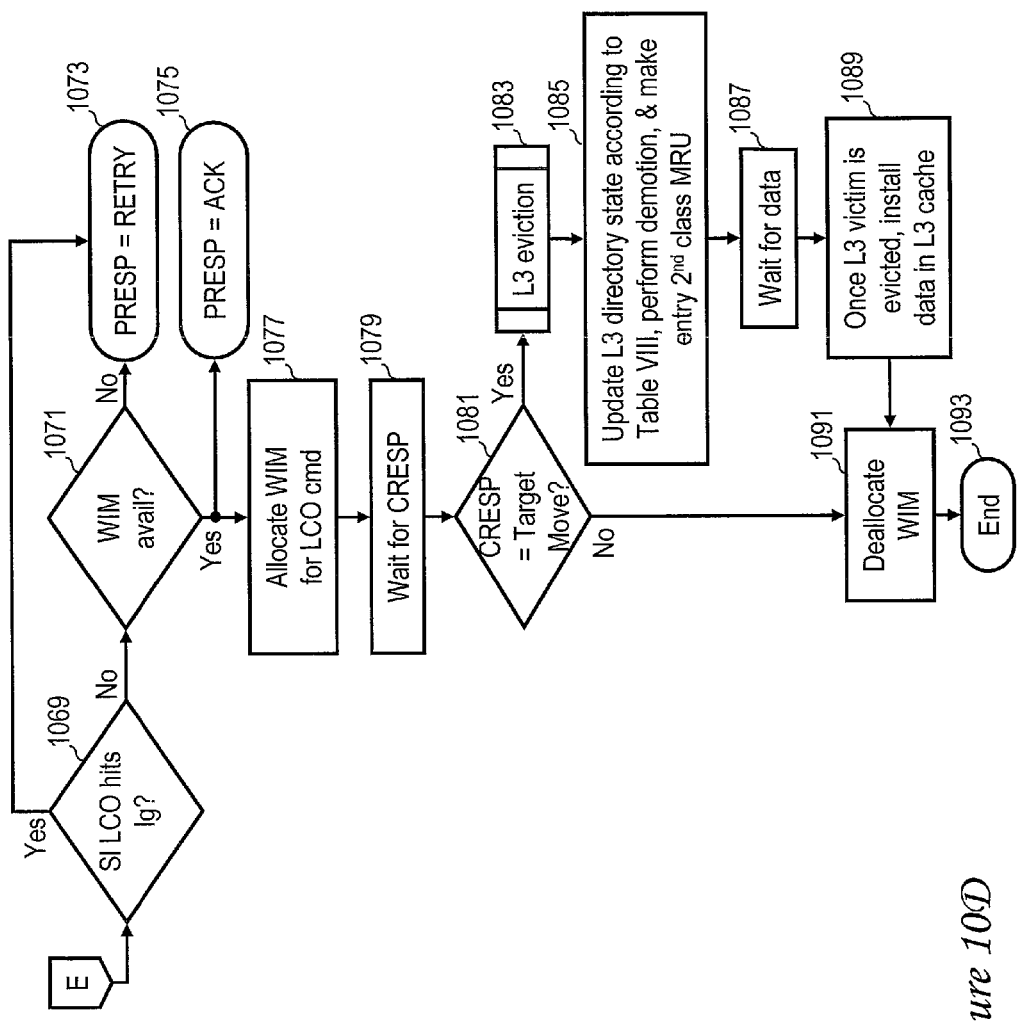

Referring now to FIGS. 10C-10D, there is depicted a high level logical flowchart of an exemplary process by which a snooper (e.g., IMC 206 or snooper 286 of an L2 cache 230 or L3 cache 232) handles a lateral castout (LCO) of a possibly shared victim cache line in accordance with one embodiment. The illustrated process begins at block 1050, which represents receipt by a snooper of an LCO command on the interconnect fabric. As indicated at blocks 1052 and 1054, any snooper other than an L3 cache 232 (e.g., an L2 cache 230 or IMC 206) provides a Null partial response (PRESP) to the LCO command because LCO commands target only lateral caches (in this embodiment, other L3 caches 232). Assuming that the snooper is an L3 cache 232, the snooping L3 cache 232 determines at block 1056 if the address of the victim cache line specified by the LCO command collides with (i.e., matches) an address of a previously received command still being processed by the snooping L3 cache 232. If so, the snooping L3 cache 232 provides a Retry PRESP (block 1058).

The snooping L3 cache 232 also determines at block 1060 if the address of the victim cache line specified by the LCO command hits in its cache directory 292 in a Tx or Sl coherence state. If not, the process proceeds to block 1076, which is described below. If, however, the address of the victim cache line hits in cache directory 292 of the snooping L3 cache 232 in a Tx or Sl coherence state, then the snooping L3 cache 232 is preferred as a recipient of the LCO regardless of whether the snooping L3 cache 232 is designated by the LCO command as the target L3 cache 232. If an affirmative determination is made at block 1060, the process passes to block 1062, which illustrates the snooping L3 cache 232 determining whether or not it has a snoop machine (SNM) 236 available to handle the LCO command. If not, the snooping L3 cache 232 provides a Retry PRESP (block 1064). If a SNM 236 is available for allocation to the LCO command, the snooping L3 cache 232 provides a TXSL PRESP to indicate the presence of another copy of the victim cache line and that it will act as the recipient of the castout (block 1066) and allocates a available SNM 236 to handle the LCO command (block 1068).

The allocated SNM 236 updates the entry in cache directory 292 for the address of the victim cache line in accordance with Table IX below and marks the entry as MRU, leaving the class of the entry unchanged (block 1070). Thereafter, the snooping L3 cache 232 deallocates the allocated SNM 236 (block 1072) and the process terminates at that snooping L3 cache 232 (block 1074). Thus, in this case, the LCO command is serviced prior to CRESP and without transmission of the victim cache line data by a snooping L3 cache 232 self-selected by coherence state independently of the target L3 cache 232 specified by the LCO command.

TABLE IX

| Initial | LCO Castout State | | | | |
|---|---|---|---|---|---|
| L3 State | T | Te | Tn | Ten | SL |
| T | Err | Err | Err | Err | T |
| Te | Err | Err | Err | Err | Te |
| Tn | Err | Err | Err | Err | Tn |
| Ten | Err | Err | Err | Err | Ten |
| SL | T | Te | Tn | Ten | Err |
| S | T | Te | Tn | Ten | SL |

Referring now to block 1076, the snooping L3 cache 232 determines whether or not it is the target L3 cache 232 identified in the LCO command. If not, the snooping L3 cache 232 provides a Null PRESP to the LCO command (block 1078), regardless of whether it may associate the victim cache line address with an Ig, In or S coherence state. Assuming now that the snooping L3 cache 232 is the target L3 cache 232 of the LCO command, the target L3 cache 232 determines at block 1080 whether or not its cache directory 292 indicates that it holds an S copy of the victim cache line. If not, the process proceeds through page connector E to block 1069 of FIG. 10D, which is described below. If, however, the target L3 cache 232 determines at block 1080 that it holds a copy of the victim cache line in the S coherence state, the target L3 cache 232 determines at block 1082 whether or not a SNM 236 is available within the target L3 cache 232 to handle the LCO command. If not, the target L3 cache 232 provides a Retry PRESP (block 1064).

If the target L3 cache 232 determines at block 1082 that a SNM 236 is available to handle the LCO command, the target L3 cache 232 provides a Shared PRESP confirming its ability to service the LCO command (in the absence of an available snooping L3 cache 232 holding the victim cache line in the Tx or Sl coherence state) and indicating existence of a shared copy of the victim cache line (block 1084). In addition, the target L3 cache 232 allocates an available SNM 236 to handle the LCO command (block 1086). The allocated SNM 236 in the target L3 cache 232 then awaits the CRESP for the LCO command, as illustrated at block 1088, and examines the CRESP upon receipt to determine if it is the recipient of the castout as indicated at block 1090. If the CRESP does not indicate Success: Target Merge, no coherence update (or data movement) is required at the target L3 cache 232. Thus, the target L3 cache 232 deallocates the SNM 236 allocated to handle the LCO command (block 1072), and the process terminates at block 1074. If, however, the CRESP indicates Success: Target Merge, the process proceeds from block 1090 to block 1070 and following blocks, which illustrate the handling of the castout at the target L3 cache 232 in the manner previously described.

With reference now to block 1069 of FIG. 10D, the target L3 cache 232 determines whether the coherence state of the victim cache line specified by the LCO command is Sl and the coherence state specified for the victim cache line address in the cache directory 292 of the snooping L3 cache 232 is Ig. If so, the Ig coherence state is preferably retained in the target L3 cache 232, and in the depicted embodiment the target L3 cache 232 accordingly provides a Retry PRESP (block 1073). In other embodiments, the target L3 cache 232 may alternatively permit the LCO command to proceed without retry, but simply discard the data of the victim cache line so that no directory update is made.

In response to a negative determination at block 1069, the target L3 cache 232 determines at block 1071 whether a WIM 238 is available to handle the LCO command. If not, the target L3 cache 232 provides a Retry PRESP (block 1073). If the target L3 cache 232 determines at block 1071 that a WIM 238 is available to handle the LCO command, the target L3 cache 232 provides an Ack PRESP confirming its ability to service the LCO command in the absence of availability of a more preferred snooping L3 cache 232 (block 1075) and allocates an available WIM 238 to handle the LCO command (block 1077). The allocated WIM 238 in the target L3 cache 232 then awaits the CRESP for the LCO command, as illustrated at block 1079, and examines the CRESP upon receipt to determine if it is the recipient of the castout, as indicated at block 1081.

If the CRESP does not indicate Success: Target Move, the LCO command will not complete in the target L3 cache 232 but may complete in a different snooping L3 cache 232, as previously described. Consequently, the target L3 cache 232 deallocates the WIM 238, and the process terminates at block 1093. If, however, the CRESP indicates Success: Target Move, the process proceeds from block 1081 to block 1083, which illustrates the allocated WIM 238 in the target L3 cache 232 initiating an L3 eviction as depicted in FIGS. 6A-6B in anticipation of receiving the data of the victim cache line (block 1083). In addition, the allocated WIM 238 updates the entry in cache directory 292 for the victim cache line in accordance with Table VIII above, applies the demote vector 738 obtained by the process of FIG. 7A, and marks the victim cache line in replacement field 298 as second class and MRU (block 1085). As a result, the entry demoted to second class by demote vector 738 is effectively made MRU-1.

The WIM 238 in the target L3 cache 232 then awaits receipt of the data of the victim cache line from the source L3 cache 232 via the interconnect fabric (block 1087). Following receipt of the data of the victim cache line, the allocated WIM 238 installs the victim cache line in its cache array 281 of the target L3 cache 232 once the L3 eviction depicted at block 1083 is complete (block 1089). Thereafter, the allocated WIM 238 is deallocated, as shown at block 1091. The process then terminates at block 1093.

FIG. 11 is a high level logical flowchart of the processing of the coherence responses of a lateral castout (LCO) command in accordance with one embodiment. The illustrated process may be performed, for example, by a predetermined instance of coherence management logic 210, such as the instance of coherence management logic 210 located in the processing unit 104 of the source L3 cache 232 initiating the LCO.

The illustrated process begins at block 1100 in response to receipt by coherence management logic 210 of a partial response of a snooper to an LCO command of a source L3 cache 232 and then proceeds to block 1102. Block 1102 depicts coherence management logic 210 logging the partial response of the LCO command and waiting until all such partial responses have been received and logged.

Coherence management logic 210 then determines at block 1108 whether any TXSL PRESP has been received. If so, coherence management logic 210 generates and provides to all participants a Success: Early Merge combined response indicating that the LCO command completed successfully prior to combined response without data movement (block 1110).

If no TXSL PRESP has been received, coherence management logic 210 determines at block 1112 whether any Shared PRESP has been received. If so, coherence management logic 210 generates and provides to all participants a Success: Target Merge combined response indicating that the LCO command is to be completed at the target L3 cache 232 by a coherence state update and without transmission of the victim cache line data by the source L3 cache 232 (block 1114).

If no Shared PRESP has been received, coherence management logic 210 determines at block 1116 whether any Ack PRESP has been received. If so, coherence management logic 210 generates and provides to all participants a Success: Target Move combined response indicating that the LCO command is to be completed at the target L3 cache 232 by an update to the coherence state in the cache directory 292 and, following transmission of the victim cache line data by the source L3 cache 232, by installation of the victim cache line in cache array 281 (block 1118).

If no Ack PRESP has been received, coherence management logic 210 determines at block 1120 if any Retry PRESP was received. If so, coherence management logic 210 generates and provides to all participants a Retry combined response that causes the LCO command to be retried or aborted (block 1124). If a determination is made at block 1120 that no TXSL, Shared, Ack or Retry partial response has been received, then coherence management logic 210 signals that an error has occurred (block 1122).

As has been described herein, in one embodiment a data processing system includes a plurality of processing units including a first processing unit and a second processing unit coupled by an interconnect fabric. The first processing unit has a first processor core and associated first upper and first lower level caches, and the second processing unit has a second processor core and associated second upper and lower level caches. In such a system, in response to a data request, a victim cache line is selected to be castout from the first lower level cache. The first processing unit accordingly issues a lateral castout (LCO) command on the interconnect fabric, where the LCO command identifies the victim cache line to be castout from the first lower level cache and indicates that a lower level cache is an intended destination of the victim cache line. In response to a coherence response to the LCO command indicating success of the LCO command, the victim cache line is removed from the first lower level cache and held in the second lower level cache.

In at least one embodiment, the LCO command specifies a particular target lower level cache that will accept the castout if the broadcast of the LCO command does not discover a more preferred recipient. If, however, the broadcast of the LCO command opportunistically discovers a more preferred lower level cache that permits the castout to be performed without data movement, that castout indicated by the LCO command is handled by the more preferred lower level cache, thus avoiding displacement of an existing cache line by the castout and preserving storage capacity in the more preferred lower level cache. In at least one embodiment, the target lower level cache is selected on the basis of architectural proximity to the home system memory assigned the real address of the victim cache line to be castout by the LCO command. In various embodiments, the selection of the target lower level cache can either directly select a particular target lower level cache based on architectural proximity to the home system memory or can identify of pool of lower level caches that are architecturally proximate to the home system memory and then further select the target lower level cache from the pool. The selection can further be qualified by a number of LCO retry responses received from a prospective target lower level cache of an LCO.

In at least one embodiment, the issuance of LCO commands can be dynamically controlled by a lower level cache of a processing unit based upon empirical success of the associated upper level cache of the processing unit in obtaining requested data by intervention from cache memories of other processing units rather than the system memory. If the LCO commands have been empirically successful, an LCO of a victim cache line to a lower level cache of one of the plurality of processing units is performed by issuing a LCO command on the interconnect fabric. If, on the other hand, LCO commands have not been empirically successful, a castout (CO) of the victim cache line to the system memory is performed.

In at least one embodiment, the LCO command and its associated coherence responses are broadcast via the same interconnect fabric utilized to transmit memory access requests (and associated coherence responses) of like broadcast scope.

The described castout behavior utilizing LCOs can promote performance in a multiprocessor data processing system operating under a variety of workloads. For example, if many processor cores are operating on a shared data set, the behavior of the lower level caches adapts to approximate that of a large shared cache so that data movement and redundant storage of particular cache lines are reduced. Alternatively, if one processor core is operating under a heavy workload and other nearby processor cores have relatively light workloads, the processor core operating under a heavy workload gradually consumes capacity of lower level caches of other processor cores, providing in effect another level of cache memory for the heavily loaded processor core. Further, in the case where each processor core is operating on its own data set, a dynamic equilibrium is achieved in the utilization of each lower level cache by the associated processor core and the other processor cores.

In at least one embodiment, cache management in a victim cache in a cache hierarchy of a processor core is performed by receiving a castout command identifying a victim cache line castout from another cache memory and thereafter holding the victim cache line in a cache array of the victim cache. If the other cache memory is a higher level cache in the cache hierarchy of the processor core, the victim cache line is marked in the victim cache so that it is less likely to be evicted by a replacement policy of the victim cache; otherwise, the victim cache line is marked in the victim cache so that it is more likely to be evicted by the replacement policy of the victim cache.

In at least one embodiment, cache management is enhanced by an enhanced multi-class victim selection technique in which a victim cache line is selected from among a plurality of cache lines in a congruence class of a cache memory for replacement, where each of the cache lines belongs to one of multiple classes including at least a first class and a second class. According to the disclosed technique, if the congruence class contains a cache line belonging to the second class, a cache line of the congruence class belonging to the second class is preferentially selected as a victim cache line based upon access order. If the congruence class contains no cache line belonging to the second class, a cache line belonging to the first class is selected as the victim cache line based upon access order. The selected victim cache line is then evicted from the cache memory.

While one or more embodiments have been particularly shown and described, it will be understood by those skilled in the art that various changes in form and detail may be made therein without departing from the spirit and scope of the invention. For example, although aspects of the present invention have been described with respect to data processing system hardware, it should be understood that one or more embodiments of the present invention may alternatively be implemented as a program product for use with a data processing system. Such program product(s) include(s) a computer readable medium that stores or encodes program code that directs the functions of the present invention. The computer readable medium may be implemented, for example, as a tangible storage medium (e.g., CD-ROM, DVD, diskette or hard disk, system memory, flash memory, etc.) or communication media, such as digital and analog networks.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system including a plurality of lower level caches and a plurality of architecturally distributed system memories coupled by an interconnect fabric, wherein the plurality of lower level caches includes first, second and third lower level caches, wherein the first lower level cache is associated with a first processing unit having a first processor core and an associated first upper level cache and the second lower level cache is associated with a second processing unit having a second processor core and an associated second upper level cache, said method comprising:
in response to a data request, the first processing unit:
selecting a victim cache line to be castout from the first lower level cache;
selecting a target lower level cache among the plurality of lower level caches, wherein said selecting a target lower level cache comprises selecting a target lower level cache based upon architectural proximity of the target lower level cache to a home system memory among the plurality of system memories to which an address of the victim cache line is assigned;
the first processing unit thereafter issuing a lateral castout (LCO) command on the interconnect fabric, wherein the LCO command identifies the victim cache line to be castout from the first lower level cache and indicates that the target lower level cache is a single intended destination of the victim cache line among the plurality of lower level caches; and
in response to a coherence response to the LCO command indicating success of the LCO command, removing the victim cache line from the first lower level cache and holding the victim cache line in the second lower level cache.

2. The method of claim 1, wherein the first and second lower level caches are victim caches.

3. The method of claim 1, wherein said lateral castout command identifies the second lower level cache as the target lower level cache.

4. The method of claim 3, wherein:
the victim cache line is a first victim cache line; and
the method further comprises evicting a second victim cache line from the second lower level cache to make room for the first victim cache line in the second lower level cache.

5. The method of claim 1, and further comprising:
in response to a coherence response to the lateral castout (LCO) command indicating success of the LCO command, the first processing unit transmitting the victim cache line to the second lower level cache.

6. The method of claim 1, and further comprising determining whether the selected target lower level cache has provided more than a threshold number of retry responses to lateral castout (LCO) commands of the first lower level cache, and if so, selecting a different target lower level cache.

7. The method of claim 1, wherein selecting a target lower level cache comprises:
determining a pool containing multiple lower level caches architecturally proximate to the home system memory; and
selecting the target lower level cache from the pool.

8. The method of claim 1, wherein selecting a target lower level cache comprises:
selecting the target lower level cache utilizing a base address register facility.

9. A data processing system, comprising:
an interconnect fabric;
a plurality of processing units coupled to the interconnect fabric, wherein the plurality of processing units are supported by a plurality of lower level caches including first, second and third lower level caches, wherein the first lower level cache is associated with a first processing unit having a first processor core and an associated first upper level cache and the second lower level cache is associated with a second processing unit having a second processor core and an associated second upper level cache; and
a plurality of architecturally distributed system memories coupled to the interconnect fabric, wherein the plurality of architecturally distributed system memories includes a home system memory that is assigned a plurality of addresses including an address;

wherein the first processing unit, in response to a data request, selects a victim cache line associated with the address to be castout from the first lower level cache, selects a target lower level cache among the plurality of lower level caches based upon architectural proximity of the target lower level cache to the home system memory to which the address of the victim cache line is assigned, and thereafter issues a lateral castout (LCO) command on the interconnect fabric, the LCO command identifying the victim cache line to be castout from the first lower level cache and indicating that the target lower level cache is a single intended destination of the victim cache line among the plurality of lower level caches; and wherein responsive to a coherence response to the LCO command indicating success of the LCO command, the first processing unit removes the victim cache line from the first lower level cache and the second lower level cache holds the victim cache line.

10. The data processing system of claim 9, wherein the first and second lower level caches are victim caches.

11. The data processing system of claim 9, wherein said lateral castout command identifies the second lower level cache as the target lower level cache.

12. The data processing system of claim 11, wherein:
the victim cache line is a first victim cache line; and
the second lower level cache evicts a second victim cache line to make room for the first victim cache line in the second lower level cache.

13. The data processing system of claim 9, wherein the first processing unit transmits the victim cache line to the second lower level cache in response to a coherence response to the lateral castout (LCO) command indicating success of the LCO command.

14. The data processing system of claim 9, wherein the first processing unit, prior to issuing the LCO command, determines whether the selected target lower level cache has provided more than a threshold number of retry responses to lateral castout (LCO) commands of the first lower level cache, and if so, selects a different target lower level cache.

15. The data processing system of claim 9, wherein the first processing unit selects the target lower level cache by determining a pool containing multiple lower level caches architecturally proximate to the home system memory and selecting the target lower level cache from the pool.

16. The data processing system of claim 9, wherein the first processing unit includes a base address register facility and select the target lower level cache utilizing the base address register facility.

17. A processing unit for a data processing system including a plurality of architecturally distributed system memories including a home system memory, a plurality of processing units coupled by an interconnect fabric, and a plurality of lower level caches supporting the plurality of processing units, wherein the home system memory is assigned a plurality of addresses including an address, the processing unit comprising:
the processing unit has a first processor core and associated first upper and first lower level caches;
wherein the processing unit, in response to a data request, selects a victim cache line associated with the address to be castout from the first lower level cache, selects a target lower level cache among the plurality of lower level caches based upon architectural proximity of the target lower level cache to the home system memory to which the address of the victim cache line is assigned, and thereafter issues a lateral castout (LCO) command on the interconnect fabric, the LCO command identifying the victim cache line to be castout from the first lower level cache and indicating that the target lower level cache is a single intended destination of the victim cache line among the plurality of lower level caches; and
wherein responsive to a coherence response to the LCO command indicating success of the LCO command, the first processing unit removes the victim cache line from the first lower level cache for storage in a second lower level cache.

18. The processing unit of claim 17, wherein the first and second lower level caches are victim caches.

19. The processing unit of claim 17, wherein said lateral castout command identifies the second lower level cache as the target lower level cache.

20. The processing unit of claim 17, wherein the first processing unit transmits the victim cache line to the second lower level cache in response to a coherence response to the LCO command indicating success of the LCO command.

21. The processing unit of claim 17, wherein the first processing unit, prior to issuing the LCO command, determines whether the selected target lower level cache has provided more than a threshold number of retry responses to lateral castout (LCO) commands of the first lower level cache, and if so, selects a different target lower level cache.

22. The processing unit of claim 17, wherein the processing unit selects the target lower level cache by determining a pool containing multiple lower level caches of the data processing system that are architecturally proximate to the home system memory and selecting the target lower level cache from the pool.

23. The processing system of claim 17, wherein the processing unit includes a base address register facility and select the target lower level cache utilizing the base address register facility.

24. A method of data processing in a data processing system including a plurality of processing units and a system memory coupled by an interconnect fabric, wherein each of the plurality of processing units includes a processor core and associated upper and lower level caches, said method comprising:
in response to a data request of the processor core of a first processing unit among the plurality of processing units, selecting a victim cache line to be removed from the lower level cache of the first processing unit;
selecting among a lateral castout (LCO) from the lower level cache of the first processing unit to another lower level cache and a castout (CO) from the lower level cache of the first processing unit to the system memory, wherein the selecting comprises selecting based upon empirical success of the upper level cache of the first processing unit in obtaining requested data by intervention from cache memories of other of the plurality of processing units rather than the system memory;
in response to selecting an LCO, performing an LCO of the victim cache line to a lower level cache of one of the plurality of processing units by issuing a LCO command on the interconnect fabric; and
in response to selecting a CO, performing a CO of the victim cache line to the system memory.

25. The method of claim 24, wherein:
selecting among the LCO and the CO comprises preferentially selecting LCOs for victim cache lines in a home LCO address region of the lower level cache of the first processing unit, wherein the home LCO address region spans multiple congruence classes of the lower level cache;

the method further comprises:
- empirically measuring success of the upper level cache of the first processing unit in obtaining requested data within the home LCO address region by intervention from cache memories of other of the plurality of processing units rather than the system memory; and
- disabling LCOs for victim caches line outside the home LCO address region of the lower level cache based upon lack of success of the upper level cache of the first processing unit in obtaining requested data within the home LCO address region by intervention from cache memories of other of the plurality of processing units rather than the system memory.

26. The method of claim 25, wherein empirically measuring success comprises comparing to at least one threshold a metric indicative of success of the upper level cache of the first processing unit in obtaining requested data within the home LCO address region by intervention from cache memories of other of the plurality of processing units rather than the system memory.

27. The method of claim 26, wherein said at least one threshold comprises a lower LCO threshold and an upper LCO threshold.

28. The method of claim 25, wherein empirically measuring success comprises computing an average amount of data requests of the first processing unit in the home LCO address region satisfied by cache-to-cache intervention.

29. The method of claim 24, wherein the LCO command identifies the victim cache line to be castout from the lower level cache of the first processing unit and indicates a target lower level cache is an intended destination of the victim cache line; and
- in response to a coherence response to the LCO command indicating success of the LCO command, removing the victim cache line from the lower level cache of the first processing unit and holding the victim cache line in a lower level cache of another of the plurality of processing units.

30. The method of claim 24, wherein the lower level cache in each of the plurality of processing units is a victim cache.

31. A data processing system, comprising:
- a plurality of processing units and a system memory coupled by an interconnect fabric, wherein each of the plurality of processing units includes a processor core and associated upper and lower level caches, said plurality of processing units including a first processing unit;
- wherein the lower level cache of the first processing unit, responsive to a data request of the processor core of a first processing unit, selects a victim cache line to be removed from the lower level cache of the first processing unit and selects among a lateral castout (LCO) to another lower level cache and a castout (CO) to the system memory, wherein the lower level cache of the first processing unit selects either the LCO or CO based upon empirical success of the upper level cache of the first processing unit in obtaining requested data by intervention from cache memories of other of the plurality of processing units rather than the system memory; and
- wherein the lower level cache of the first processing unit, responsive to selecting an LCO, performs an LCO of the victim cache line to a lower level cache of one of the plurality of processing units by issuing a LCO command on the interconnect fabric and, responsive to selecting a CO, performs a CO of the victim cache line to the system memory.

32. The data processing system of claim 31, wherein:
- the lower level cache of the first processing unit preferentially selects LCOs for victim cache lines in a home LCO address region of the lower level cache of the first processing unit, wherein the home LCO address region spans multiple congruence classes of the lower level cache;
- the lower level cache of the first processing unit empirically measures success of the upper level cache of the first processing unit in obtaining requested data within the home LCO address region by intervention from cache memories of other of the plurality of processing units rather than the system memory; and
- the lower level cache of the first processing unit disables LCOs for victim cache line outside the home LCO address region of the lower level cache based upon lack of success of the upper level cache of the first processing unit in obtaining requested data within the home LCO address region by intervention from cache memories of other of the plurality of processing units rather than the system memory.

33. The data processing system of claim 32, wherein the lower level cache of the first processing unit empirically measures success by comparing to at least one threshold a metric indicative of success of the upper level cache of the first processing unit in obtaining requested data within the home LCO address region by intervention from cache memories of other of the plurality of processing units rather than the system memory.

34. The data processing system of claim 33, wherein said at least one threshold comprises a lower LCO threshold and an upper LCO threshold.

35. The data processing system of claim 32, wherein the lower level cache of the first processing unit empirically measuring success by computing an average amount of data requests of the first processing unit in the home LCO address region satisfied by cache-to-cache intervention.

36. The data processing system of claim 31, wherein:
- the LCO command identifies the victim cache line to be castout from the lower level cache of the first processing unit and indicates a target lower level cache is an intended destination of the victim cache line; and
- the lower level cache of the first processing unit, responsive to a coherence response to the LCO command indicating success of the LCO command, removes the victim cache line from the lower level cache of the first processing unit.

37. The data processing system of claim 31, wherein the lower level cache in each of the plurality of processing units is a victim cache.

38. A processing unit for a data processing system having a plurality of processing units and a system memory coupled by an interconnect fabric, wherein each of the plurality of processing units includes a processor core and associated upper and lower level caches, said processing unit comprising:
- a processor core;
- an upper level cache coupled to the processor core; and
- a lower level cache coupled to the upper level cache;
- wherein the lower level cache, responsive to a data request of the processor core, selects a victim cache line to be removed from the lower level cache and selects among a lateral castout (LCO) to another lower level cache and a castout (CO) to the system memory, wherein the lower level cache selects either the LCO or CO based upon empirical success of the upper level cache in obtaining requested data by intervention from cache memories of other of the plurality of processing units rather than the system memory; and wherein the lower level cache, responsive to selecting an LCO, performs an LCO of the victim cache line to a lower level cache of one of the plurality of processing units by issuing a LCO command on the interconnect fabric and, responsive to selecting a CO, performs a CO of the victim cache line to the system memory.

39. The data processing system of claim 38, wherein:

the lower level cache preferentially selects LCOs for victim cache lines in a home LCO address region of the lower level cache, wherein the home LCO address region spans multiple congruence classes;

the lower level cache empirically measures success of the upper level cache in obtaining requested data within the home LCO address region by intervention from cache memories of other of the plurality of processing units rather than the system memory; and the lower level cache disables LCOs for victim cache line outside the home LCO address region of the lower level cache based upon lack of success of the upper level cache in obtaining requested data within the home LCO address region by intervention from cache memories of other of the plurality of processing units rather than the system memory.

40. The data processing system of claim 39, wherein the lower level cache empirically measures success by comparing to at least one threshold a metric indicative of success of the upper level cache in obtaining requested data within the home LCO address region by intervention from cache memories of other of the plurality of processing units rather than the system memory.

41. The data processing system of claim 40, wherein said at least one threshold comprises a lower LCO threshold and an upper LCO threshold.

42. The data processing system of claim 39, wherein the lower level cache empirically measuring success by computing an average amount of data requests in the home LCO address region satisfied by cache-to-cache intervention.

43. The data processing system of claim 38, wherein:

the LCO command identifies the victim cache line to be castout from the lower level cache and indicates a target lower level cache is an intended destination of the victim cache line; and the lower level cache, responsive to a coherence response to the LCO command indicating success of the LCO command, removes the victim cache line from the lower level cache.

44. The data processing system of claim 38, wherein the lower level cache in each of the plurality of processing units is a victim cache.

* * * * *